(12) United States Patent
Dey et al.

(10) Patent No.: US 9,756,142 B2
(45) Date of Patent: Sep. 5, 2017

(54) SYSTEM AND METHOD FOR DELIVERING VIDEO DATA FROM A SERVER IN A WIRELESS NETWORK BY CACHING THE VIDEO DATA

(71) Applicant: The Regents of the University of California, Oakland, CA (US)

(72) Inventors: Sujit Dey, San Diego, CA (US); Hasti Ahlehagh, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 331 days.

(21) Appl. No.: 14/214,578

(22) Filed: Mar. 14, 2014

(65) Prior Publication Data

US 2014/0280679 A1 Sep. 18, 2014

Related U.S. Application Data

(60) Provisional application No. 61/782,262, filed on Mar. 14, 2013.

(51) Int. Cl.
  *G06F 13/00* (2006.01)
  *H04L 29/08* (2006.01)
  *H04L 29/06* (2006.01)

(52) U.S. Cl.
  CPC ...... *H04L 67/2842* (2013.01); *H04L 65/4084* (2013.01); *H04L 65/80* (2013.01); *H04L 67/2847* (2013.01); *H04L 67/306* (2013.01); *H04L 67/322* (2013.01)

(58) Field of Classification Search
  CPC ......... G06F 17/30902; H04L 29/08072; H04L 29/06; H04L 29/08549; H04L 29/08144; H04L 5/0007; H04L 65/80; H04L 65/4084; H04L 67/306; H04L 67/322; H04L 67/2842; H04L 67/2847; H04W 28/04; H04W 72/04; H04W 72/042; H04W 88/08
  USPC .......................................... 709/213; 711/113
  See application file for complete search history.

(56) References Cited

U.S. PATENT DOCUMENTS

2008/0133830 A1* 6/2008 Nitta ....................... G06F 3/061
                                                             711/113

OTHER PUBLICATIONS

Masi, D.M. B. et al., "Video frame size distribution analysis", Telecommunication Review, vol. 19, Sep. 2008, pp. 7-86.
Rudd, S., "Closing the backhaul gap," Strategy Analytics, Feb. 21, 2013, 5 pages.

(Continued)

*Primary Examiner* — Robert B Harrell
(74) *Attorney, Agent, or Firm* — Greer, Burns & Crain, Ltd.; Steven P. Fallon

(57) ABSTRACT

A method for delivering video data from a server in a content delivery network (CDN). Video preferences of active users of a cell are determined. Video data is cached at one or more base station nodes disposed in a radio access network (RAN), wherein the video data is cached in one or more micro-caches according to a caching policy that is based on the determined video preferences. A request is received for video data. If the cached video data includes the requested video data, the cached video data is served from the RAN cache. If the cached video data does not include the requested video data, the requested video is fetched from the CDN according to a scheduling approach that considers Quality of Experience (QoE).

12 Claims, 52 Drawing Sheets

(56) References Cited

OTHER PUBLICATIONS

Ahlehagh, H., et al., "Enhancing Mobile Video Capacity Using Rate Adaptation, RAN Caching and Processing", University of California San Diego, Jacobs School of Engineering Research Expo, Apr. 17, 2014, 14 pages.

Ahlehagh, H., et al., "Video caching in radio access network: Impact on delay and capacity," in Proceedings of the 2012 IEEE Wireless Communications and Networking Conference, Apr. 1-4, 2012, pp. 2276-2281.

Ahlehagh, H. et al., "Video Aware Scheduling and Caching in the Radio Access Network", IEEE Transactions on Networking, vol. PP. Issue 99, Jan. 9, 2014, 1 page.

Ahlehagh, H., et al., "Adaptive bit rate capable video caching and scheduling", 2013 IEEE Wireless Communications and Networking Conference (WCNC): Networks, Apr. 2013, pp. 1357-1362.

Akhshabi, S., et. al., "An experimental evaluation of rate-adaptation algorithms in adaptive streaming over http", ACM Multimedia Systems, MMSys'11, Feb. 23-25, 2011, 12 pages.

Ameigeiras, P., et al., "Traffic models impact on OFDMA scheduling design", EURASIP J. on Wireless Communications and Networking 2012, vol. 61, 2012, (2012), 13 pages.

Amram, N., et al., "QoE-based transport optimization for video delivery over next generation cellular networks", Proceedings of IEEE Symposium on Computer and Communications, SCC 2011, (2011), 6 pages.

Balachandran, A., et al., "Developing a predictive model of quality of experience for internet video", SIGCOMM 2013, Hong Kong, China, Aug. 12-16, 2013, 12 pages.

Balamash, A., et al., "An Overview of Web Caching Replacement Algorithms", IEEE Communications Surveys and Tutorials, vol. 6, No. 2, Second Quarter 2004, pp. 44-56.

Berry, R.A., et al., "Cross-layer wireless resource allocation", IEEE Signal Processing Magazine, vol. 21, No. 5, pp. 59-68, Sep. 2004, pp. 59-68.

Boyer, V., et al., "Solution of multidimensional knapsack problems via cooperation of dynamic programming and branch and bound", European J. of Industrial Engineering, vol. 4, No. 4, (2010), pp. 434-449.

Cermak, G., et al., "The Relationship Among Video Quality, Screen Resolution, and Bit Rate", IEEE Transactions on Broadcasting, vol. 57, No. 2, Jun. 2011, pp. 258-262.

Cha, M. et al., "Analyzing the Video Popularity Characteristics of Large-Scale User Generated Content Systems", IEEE/ACM Transactions on Networking, vol. 17, No. 5, Oct. 2009, pp. 1357-1370.

Chen, Hui, et al., "Cache Access and Replacement for Future Wireless Internet", IEEE Communications Magazine, May 2006, pp. 113-123.

Cheng, X., et al., "Statistics and social networking of YouTube videos", Proc. IEEE ACM/IEEE 16th International Symposium on Quality of Service, Jun. 2-4, 2008, pp. 229-238.

Cherniack, Mitch, et al., "Profile driven cache management", Proceedings of the 19th International Conference on Data Engineering (ICDE'03), (2003), pp. 645-656.

Dua, A. et al., "Channel, deadline, and distortion (CD ) aware scheduling for video streams over wireless", IEEE Transactions on Wireless Communications., vol. 9, No. 3, Mar. 11, 2010, pp. 1001-1011.

Dyaberi, J., et al., "Scholastic Streaming; Rethinking Mobile Video-On-Demand in a Campus Environment", Proceedings of the 3rd workshop on Mobile video delivery, MoViD'10, Oct. 2010, pp. 51-56.

Erman, J., et al., "To cache or not to cache: The 3G case", Internet Computing, IEEE, vol. 15, issue 2, Mar. 17, 2011, pp. 27-34.

Golrezaei, N., et al. "FemtoCaching: Wireless video content delivery through distributed caching helpers", INFOCOM, 2012 Proceedings IEEE, Mar. 25-30, 2012, pp. 1107-1115.

Hennessy, J.L., et al., "Computer Architecture: A Quantitative Approach", Fourth Edition, Morgan Kaufmann Publishers, (2007), 705 pages; ISBN 0-12-370490-1.

Kelly, F.P, et al., "Rate control for communication networks: Shadow prices, proportional fairness and stability", The Journal of the Operational Research Society, vol. 49, No. 3, Mar. 1998, pp. 237-252.

Krishnappa, S. et al., "On the feasibility of prefetching and caching for online TV services: A measurement study on Hulu", Passive and Active Measurement: Proceedings of 12th International Conference, PAM 2011, Mar. 20-22, 2011, pp. 72-80.

Kwan, R, et al., "A survey of scheduling and interference mitigation in LTE,", Journal of Electrical and Computer Engineering, vol. 10, (2010), 10 pages.

Lau, W..H.O., et al., "A Cooperative cache architecture in support of caching multimedia objects in MANETs", WOWMOM '02 Proceedings of the 5th ACM international workshop on Wireless mobile multimedia, (2002), pp. 56-63.

Laoutaris, N., "A closed-form method for LRU replacement under generalized power-law demand", roceedings of CoRR. 2007, (2007), 25 pages.

Lee, D., et al., "LRFU: A spectrum of policies that subsumes the least recently used and least frequently used policies", IEEE Transactions on Computers, vol. 50, issue 12, Dec. 2001, pp. 1352-1361.

Liu, C., et. al., "Rate adaptation for adaptive HTTP streaming", Proceedings of the second annual ACM conference on Multimedia systems, (2011), pp. 169-174.

Lozano, A., et al., "Optimum power allocation for multiuser OFDM with arbitrary signal constellations", IEEE Transactions on Communications, vol. 56, No. 5, May 2008, pp. 828-837.

Marinca, D., et al., "Cache management using temporal pattern based solicitation for content delivery", 19th International Conference on Telecommunications (ICT), 2012, Apr. 23-25, 2012, pp. 1-6.

Martin, J., et al., "Characterizing Netflix bandwidth consumption", 2013 IEEE Consumer Communications and Networking Conference (CCNC), Jan. 11-14, 2013, pp. 230-235.

Moorthy, A. K., et. al., "Video Quality Assessment on Mobile Devices: Subjective, Behavioral and Objective Studies", IEEE Journal of selected topics in signal processing, vol. 6, No. 6, Oct. 2012, pp. 652-671.

Nair, G., et. al., "A rank based replacement policy for multimedia server cache using Zipf-like law", Journal of Computing, vol. 2, issue 3, Mar. 2010, pp. 14-22.

Pallis, G., et al., "Insight and perspectives for content delivery networks", Communications of the ACM, vol. 49, No. 1, Jan. 2006, pp. 101-106.

Palomar, D. P., et al., "Practical algorithms for a family of waterfilling solution", IEEE Trans. on Signal Process., vol. 53, No. 2, Feb. 2005, pp. 686-695.

Pathan, M., et al., "A Taxonomy of CDNs, Content Delivery Networks", Lecture Notes Electrical Engineering, vol. 9, (2008), pp. 33-77.

Qiu, F., et al., "Automatic identification of user interest for personalized search", WWW '06 Proceedings of the 15th international conference on World Wide Web, (2006), pp. 727-736.

Ribas-Corbera, J., et al., "A generalized hypothetical reference decoder for H.264/AVC", IEEE Transactions on Circuits and Systems for Video Technology, vol. 13, No. 7, Jul. 2003, pp. 674-687.

Schwarz, S., et al., "Low complexity approximate maximum throughput scheduling for LTE", 2010 Conference Record of the Forty Fourth Asilomar Conference on Signals, Systems and Computers (ASILOMAR), Nov. 7-10, 2010, pp. 1563-1569.

Sen, S., et al., "Proxy prefix caching for multimedia streams", INFOCOM '99. Eighteenth Annual Joint Conference of the IEEE Computer and Communications Societies. Proceedings. IEEE, vol. 3, Mar. 21-25, 1999, pp. 1310-1319.

Shehada, M., et al., "QoE-based cross-layer optimization for video delivery in long term evolution mobile networks", 2011 14th International Symposium on Wireless Personal Multimedia Communications (WPMC), Oct. 3-7, 2011, pp. 1-5.

(56) References Cited

OTHER PUBLICATIONS

Singh, S., et al., "Video capacity and QoE enhancements over LTE", 2012 IEEE International Conference on Communications (ICC), Jun. 10-15, 2012, pp. 7071-7076.

Suehring, K., "JM codec," [Online]. Available: http://iphome.hhi.de/suehring/tml/, 90 pages.

Tarbox, B., et al., "Complexity Considerations for Centralized Packaging vs. Remote Packaging", 2012 Spring Technical Forum Proceedings, (2012), 12 pages.

Tian, G., et al.,, "Towards Agile and Smooth Video Adaptation in Dynamic HTTP Streaming", CoNEXT '12 Proceedings of the 8th international conference on Emerging networking experiments and technologies, (2012), pp. 109-120.

Wakamiya, N., et al., "Video Streaming Systems with Cooperative Caching Mechanisms", Proc. SPIE 4862, Internet Multimedia Management Systems III, 305 (Jul. 3, 2002), 10 pages.

Wang, D., et al., "Efficient cross-layer resource allocation for H.264/SVC video transmission over downlink of an LTE system", 2012 IEEE International Symposium on a World of Wireless, Mobile and Multimedia Networks (WoWMoM), Jun. 25-28, 2012, pp. 1-6.

Wang, J. Z., et al., "Network Cache Model for Wireless Proxy Caching", Modeling, Analysis, and Simulation of Computer and Telecommunication Systems, 2005. 13th IEEE International Symposium onModeling, Analysis, and Simulation of Computer and Telecommunication Systems, 2005, Sep. 27-29, 2005, pp. 311-314.

Wang, X., et al., "Cloud-assisted adaptive video streaming and social aware video prefetching for mobile users", IEEE Wireless Communications, vol. 20, issue 3, Jul. 1, 2013, pp. 72-79.

Wierzbicki, A., "Internet Cache Location and Design of Content Delivery Networks", Web Engineering and Peer-to-Peer Computing, Lecture Notes in Computer Science, vol. 2376, (2002), pp. 69-82.

Wright-Riley, Patrick, et al., "Intelligent Caching in an ABR Multi-Format CDN World", 2012 Spring Technical Forum Proceedings, (2012), 9 pages.

Zhang, W., et al., "Qoe-driven cache management for HTTP adaptive bit rate streaming over wireless networks", IEEE Transactions on Multimedia, vol. 15, issue 6, Feb. 15, 2013, pp. 1431-1445.

Zink, Michael, et al., "Watch Global, Cache Local: YouTube Network Traces at a Campus Network—Measurements and Implications", Proc. SPIE 6818, Multimedia Computing and Networking 2008, 681805 (Jan. 28, 2008), 13 pages.

3GPP, "TR36.814 v9.0.0: 3rd Generation Partnership Project; Technical Specification Group Radio Access Network; Evolved universal terrestrial radio access (E-UTRA); Further advancements for E-UTRA physical layer aspects," 2009 [Online]. Available: http://www.3gpp.org, 104 pages.

3GPP, "TS36.101 v11.3.0, LTE; Evolved universal terrestrial radio access (E-UTRA), User equipment (UE) radio transmission and reception," 2013 [Online]. Available: http://www.3gpp.org, 36 pages.

Arizona State University, Phoenix, AZ, USA, "YUV video sequences," [Online]. Available: http://trace.eas.asu.edu/yuv/, 7 pages.

White Paper, "Cisco Visual Networking Index: Global Mobile Data Traffic Forecast Update, 2010-2015", (2011), 27 pages.

Zambelli, Alex, "Smooth Streaming Technical Overview", Microsoft Corporation, Mar. 2009, 17 pages.

Wikipedia, http://en.wikipedia.org/wiki/Adaptive_bitrate_streaming, 8 pages.

\* cited by examiner

Optimization based Scheduler

$F_j$: set of already scheduled video requests
$F_k$: set of newly arriving video requests without assigned rate 1. New video requests to select $R_{min}^{(i)}$, min required rate for $i^{th}$ video, using LBP
2. If $F_k \neq \emptyset$ or any download completed
3. Allocate $b_i$ for $\forall i \in (F_j \cup F_k)$ s.t. for $\forall i$ $b_i = R_{min}^{(i)}$
4. If $\sum_{i \in F_k} R_{min}^{(i)} + \sum_{i \in F_j} R_{min}^{(i)} \geq C_1$
5. Start blocking new users until $\sum_{i \in F_k} b_i \leq C_1 - \sum_{i \in F_j} b_i$
6. End
7. Move scheduled videos from $F_k$ to $F_j$. Clear $F_k$.
8. End
9. Distribute remaining bandwidth to maximize:
$$f(b_i) = \sum_{i \in F_j} \log(b_i - R_{min}^{(i)}) \text{ for } \forall i \in F_j.$$

FIG. 5

Video Aware Wireless Channel Scheduler (VAWS)
$List_{buffer}$: List of video requests that are in buffering mode
$List_{playback}$: List of video requests that are in playback mode
$List_b$: List of videos that have been removed from the minimum rate allocation list in a specific scheduling interval; this might be because the user temporarily experiences a bad channel condition // For new video request $V_i$ and all the videos in playback or buffering mode, that have data ready for transmission in the (e)NodeB buffer, follow the algorithm below

Execute the following part at fixed intervals
1. Initialize per-sub-carrier power to $\bar{P}/N$

Phase 1: Subcarrier Assignment
2. Assign subcarrier to satisfy $R_{min}$ of each download, assuming known per-user per-subcarrier power assignement using eq. (6); starting with the video request with the best channel condition.
3. Assign remaining subcarriers using Round Robin

Phase 2: Power Assignment
4. Reallocate power, first to ensure $R_{min}$ of each user given subcarrier assignment from previous step using eq. (7)
5. Calculate $P' = \bar{P} - \sum_{j=1}^{N} P_{min}^{(j)}$; $N = |List_{playback}| + |List_{buffer}|$
6. If $P' > 0$
7. Allocate $P'$ using waterfilling algorithm among $N$ ongoing video sessions
8. End If

Refinement Step
9. Repeat Phase 1 assuming per subcarrier power allocation derived from phase 2
10. Repeat Phase 2 assuming new subcarrier allocation from step 9
11. For all the video downloads calculate resulting rates, $R_{inst}^i$ 12. For all videos from $List_{buffer}$
13.  Let $T_{init}^i$ be the time spent to achieve initial buffer fullness for video $i$ according to the LBP
14.  If $T_{init}^i > T_c$
15.   Block the video request and remove it from $List_{buffer}$
16.  Else
17.   Add the video request to $List_{playback}$
18. End If, End For
19. For each ongoing video, $V_i \in List_{playback}$
20.  Let $R_{avg}^i = (1-\alpha)R_{avg}^i + \alpha R_{inst}^i$
21.  If $R_{avg}^i \leq \beta_1 R_{min}^i$
22.   Add $V_i$ to the list of videos that experience blocking
23. End If
24. If $R_{avg}^i \geq \beta_2 R_{min}^i$ & $|List_b| \neq 0$
25.  Remove $i$ from subcarrier and power allocation during next scheduling interval
26. End if, End For

FIG. 6

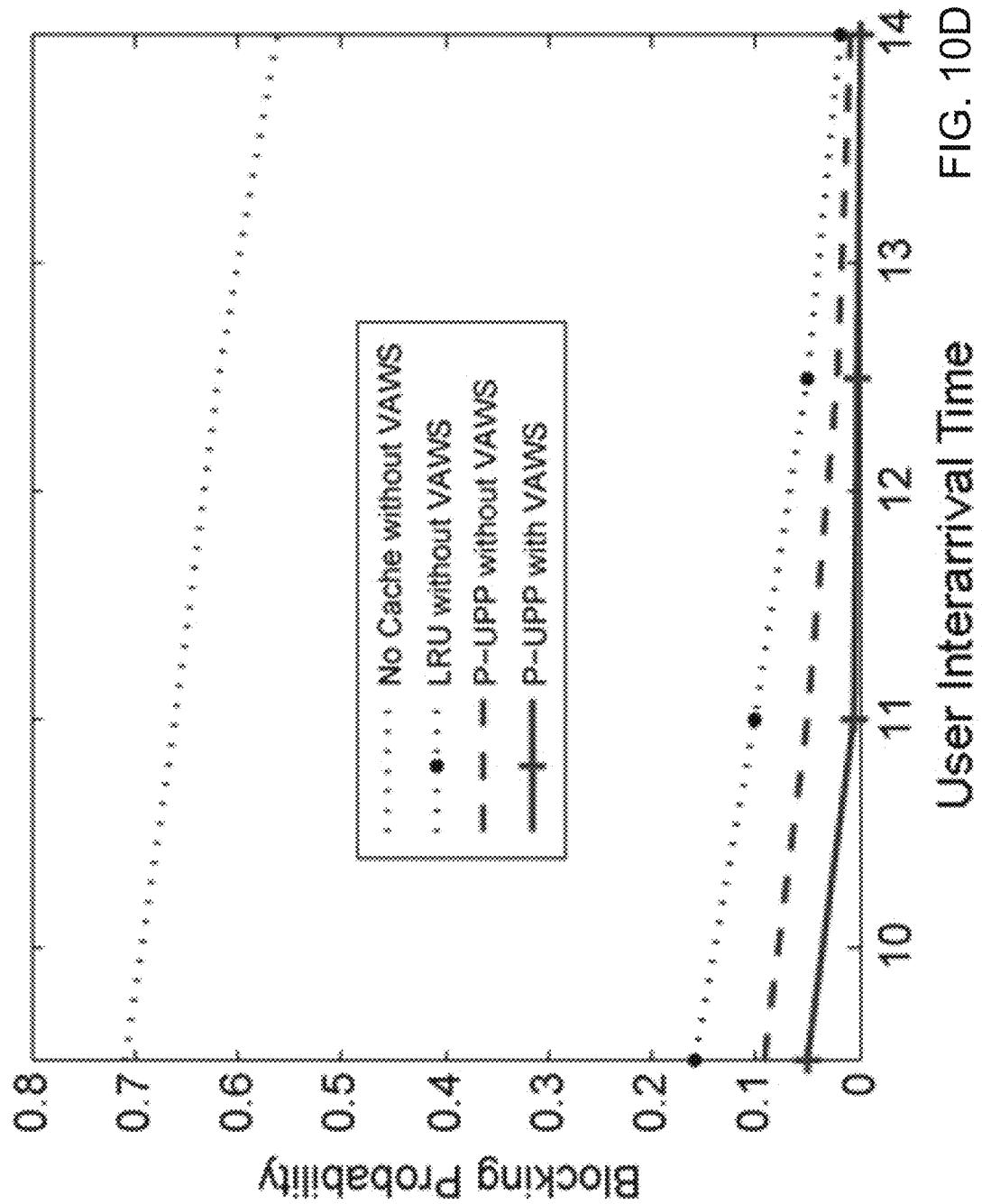

Hierarchical R-UPP
For each new request for Video (V) to $L_{z,j}$, the cache of the $j^{th}$ eNodeB:
Initialize Counter to zero
For $i=1$ to $n$ (each layer in the cache hierarchy)
    If $V \subseteq L_{i,i_2,j}$
        Counter = $i$
End If, End For
If Counter==0 (V was not found in any cache)
    Schedule download of V from the Internet CDN
    Counter = $n+1$
End If
If download scheduling was successful For $i$=Counter-1 down to 1
    Schedule download of V from $L_{i,i_2,j}$
    If there is space in cache $L_{i,i_2,j}$
        Update cache $L_{i,i_2,j}$ by V
    Else
        Find UPP for cache $L_{i,i_2,j}$ based on $AUS(L_{i,i_2,j})$
        Calculate $P_R$ for V and the cached videos in $L_{i,i_2,j}$ and generate $LLR_i$
        If $P_R(LLR_i) > P_R(V)$
            Do not cache V
        Else
            Cache = Cache + V − {$LLR_i$}
    End If, End If, End For, End If

FIG. 13

Hierarchical P-UPP

Cache Update:
If AUS changed for the $i^{th}$ (e)nodeB, $L_{1,i}$
   Find UPP of the $L_{1,i}$ cache and any higher layer cache in the path to $L_{1,i}$
   Calculate request probability $P_R$ based on $UPP\left(AUS\left(L_{i,L_{1,i}}\right)\right)$ $\forall i = 1,..,n$
   Calculate $MLR_{i,L_{1,i}}$ and $LLR_{i,L_{1,i}}$ based on $UPP\left(AUS\left(L_{i,L_{1,i}}\right)\right)$ $\forall i = 1,..,n$
   for each video $k$ in sorted list of $MLR_{i,L_{1,i}}$ set, $MLR_{i,L_{1,i}}(k)$
     $LLR_{i,L_{1,i}}(t)$: subset of LLR videos with least $P_R$ that has to be evicted
from cache to fit $MLR_{i,L_{1,i}}$
     if $P_R\left(MLR_{i,L_{1,i}}(k)\right) - \sum P_R\left(LLR_{i,L_{1,i}}(t)\right) > Threshold$
       Update the cache with $MLR_{i,L_{1,i}}(k)$ and evict $LLR_{i,L_{1,i}}(t)$; update
$MLR_{i,L_{1,i}}$ and $LLR_{i,L_{1,i}}$
End If, End For, End If

Video Request:
Initialize "*Counter*", "*i*" to zero
If new Video Request, V, to the cache of the $j^{th}$ (e)NodeB, $L_{1,j}$
For $i = 1$ to $n$ (each layer in the cache hierarchy)
If V □ $i^{th}$ Layer Cache associated with cache $L_{1,j}$, $L_{i,L_{1,j}}$
   Download V from $L_{i,L_{1,j}}$
   *Counter = i*
   Return V, *Counter*
End If, End For
If V was not found in any cache, *Counter* > n
   download V from the Internet CDN
End If

FIG. 14

E-LBP based Adaptive Rate Algorithm

1. For each new video request $V_q$
2. Using E-LBP, select the transmission rate ($R_t$) equal to $R_{min}$ that results in an initial buffering delay $T_{init}$ (max acceptable initial delay), assuming a default starting video bit rate.
3. Reset timer $t = 0$, $T_{Bre} = \frac{T_{init}}{N}$, $T_{Adapt} = 0$, $k = 0$
4. While download is ongoing
5.   If video client is in initial buffering phase
6.     If $t > T_{Bre}$
7.       Calculate expected minimum buffer level ($B_e$) at $T_{Bre}$ and achieved buffer level ($B_r$)
8.       If $B_r \geq B_e$ (no indication of underflow)
9.         $T_{Bre} = T_{Bre} + \frac{T_{init}}{N}$
10.       Else
11.         Video client may not be able to start the playback on time
12.         $T_{Bre} = T_{Bre} + \frac{T_{init}}{N^2}$
13.         If $k \geq 1$
14.           Calculate achieved rate: $R_a = B_r/t$
15.           $T_{remain} = T_{init} - t$
16.           Given $R_a$ and $T_{remain}$ find the highest video bit rate, $R'_v$, from E-LBP table such that new transmission rate $R'_t \leq R_a$ and $T'_{init} \leq T_{remain}$
17.           If $R'_v \neq \emptyset$
18.             Change the video bit Rate: set $R_v = R'_v$, $R_t = R'_t$, $T_{init} = T'_{init}$, $T_{Adapt} = t$
19.           Else
20.             Cancel download, block request
21.           End If; End If;
22.         k=k+1
23.     End If; End If;
24.   Else If video client in playback phase
25.     $T_B = B_c/R_v$ ($B_c$: current Buffer Fullness)
26.     If $(T_B < D_{min} || T_B > D_{max}) \cap (t - T_{Adapt} > D_{min})$
27.       Use $D_{min}$ to select an $R_v$ with $T'_{init} \leq T_B$ as follows:
28.       Calculate achieved rate: $R_a$ (Bits Received/Time passed)
29.       Given $R_a$ and $T_B$ find new video bit rate from E-LBP table such that new transmission rate $R'_t \leq R_a$ and $T'_{init} \leq T_B$
30.       If $R'_v \neq \emptyset$
31.         Request new $R_v = R'_v$, $R_t = R'_t$, $T_{init} = T'_{init}$, $T_{Adapt} = t$
32.       Else If $R'_v = \emptyset \cap$ video in stall for more than 10s
33.         Block the video
34.       End If; End If; End If
35.   Increment time, $t$
36. End While, End For

FIG. 19

Resource Allocation Algorithm

$F_j$: set of scheduled video requests assigned to backhaul or processing;
$F_{j1}$: video requests assigned to backhaul;
$F_{j2}$: video requests assigned to transrating;
$F_k$: set of all newly arrived video requests.

1. Calculate backhaul and transrating utilization ($U_{bk}$ and $U_{tr}$) based on $R_{min}$ of currently admitted requests to each resource;
   $0 \le U_{bk} \le 1; 0 \le U_{tr} \le 1;$
2. Calculate $\alpha = w_{bk}(1 - U_{bk})$, $\beta = w_{tr}(1 - U_{tr})$; $w_{tr} \ge w_{bk}$
3. For $\forall A \in F_k: |F_k| = K$
4. Solve maximize($\alpha \sum_{i=1}^{k} b_i x_i + \beta \sum_{i=1}^{k} p_i y_i$) for $x_i$ and $y_i$;
   while $\sum_i b_i x_i \le BW_{bk} - \sum_{j \in F_{j1}} R_{min}^{(j)}$ and
   $\sum_i p_i x_i \le BW_{tr} - \sum_{j \in F_{j2}} R_{min}^{(j)}$
5. If $\exists i$ s.t. $p_i = 0 \& b_i = 0$ (video request is not admitted)
6. Solve the optimization across all the video requests: $F_j \cup F_k$
7. If better solution is achieved by solving for all video requests;
8. Select the new solution and reassign resources accordingly
9. End If; End If; End For

FIG. 20

ABR-LRU-P caching policy

1. For each new video request $V_{(j)}$ (either a new request or rate change)
2. $c_k = 0$ (current chunk of $V_{(j)}$)
3. S: UE's buffer at (e)NodeB that contains video chunks that are pending transfer to UE
4. While exists chunk $c_k$ that needs to be transferred to UE
5. If chunk $c_k$ is a cache hit or is in S
6. Transfer chunk $c_k$ from S or cache to the UE
7. If transfer from cache, update the access time of the chunk according to LRU policy
8. Else If chunks of higher video rate in the cache or S
9. Use resource allocation algorithm (Figure 5) to decide whether to transrate or use backhaul
10. If transrating
11. update the access time of the video found in the cache
12. do not cache the transrated video
13. Else If using backhaul
14. follow LRU eviction policy and cache $c_k$
15. End If
16. $c_k = c_k + 1$
17. Else If enough backhaul bandwidth available
18. Bring chunk $c_k$ from the backhaul with the requested rate
19. Follow LRU caching policy for eviction
20. Cache chunk $c_k$
21. $c_k = c_k + 1$
22. Else
23. Client's buffer is in danger of underflow. BITRaS algorithm will possibly trigger a rate change.
24. End If, End While, End For

FIG. 22

ABR-PUPP-P caching policy
1. At each time interval $t$, calculate $R(t,j)$ (eq. 3) by executing the Request Rate Prediction algorithm
2. If there is a change in AUS OR Request Rate Change > Threshold
3.   If there is change in AUS
4.     Find cell site UPP based on AUS
5.     Calculate request probability $P_R(v_{ij})$ based on new cell site UPP
6.   End If
7.   Calculate $P_R(v_{ij}) = R(j) \times P_R(v_i)$
8.   Construct and Solve LP problem formulation (eq. 7)
9.   Calculate MLR and LLR based on the result of LP problem.
10.   For each video $i$ in sorted list of MLR set, $MLR_i$
11.     $LLR_k$ subset of LLR videos with least $\alpha_{ij}$ that has to be evicted from cache to fit $MLR_i$
12.     If $\alpha_{ij}(MLR_i) - \sum \alpha_{kj}(LLR_k) > T_o$
13.     Update the cache with $MLR_i$ and evict $LLR_k$;
14.   End If, End For, End IF

User Request Handling
1. Request for video $v_{ij}$
2. If $v_{ij} \in Cache$
3.   Lock the access to video $v_{ij}$ for all the chunks associated with the current download and onward
4.   Move the lock forward as chunks being downloaded
5.   Download $v_{ij}$ from Cache
6. Else If $\exists v_{ik} \in Cache, k > j \cap BW_{tr}(v_{ik}) = BW_{tr\_remaining}$
7.   Use Resource Allocation Algorithm (Fig. 5) to decide whether to satisfy request by either transrating or bringing through the backhaul
8. Else
9.   Bring the video through the backhaul
10. End If

FIG. 23

Rounding ILP solutions to Integer Values

1. Sort $\alpha_{ij,k} \neq 0$ and $\beta_{ij} \neq 0$ in a list in descending order. Lists $L_\alpha$ and $L_\beta$
2. Start from the first item is the sorted list $L_\alpha : \alpha_{ijk}$
3. While $\exists \alpha_{ijk} \in L_\alpha \cap$ cache $\neq$ full
4.    If $\exists \beta_{ij} \in L_\beta$
5.      $\omega_{ijk} = \sum \beta_{ij}$
6.    End If
7.    If $\omega_{ijk} > 0$
8.      Cache $\alpha_{ijk}$
9.    Else
10.      Add $\alpha_{ijk}$ to CList (candidate List)
11.      For $\alpha_{i,l} \in$ CList
12.        If $||\alpha_{i,l} - \alpha_{ijk}|| > T_{c,1}$
13.          Cache $\alpha_{i,l}$
14.        End If, End For, End If, End While

FIG. 24

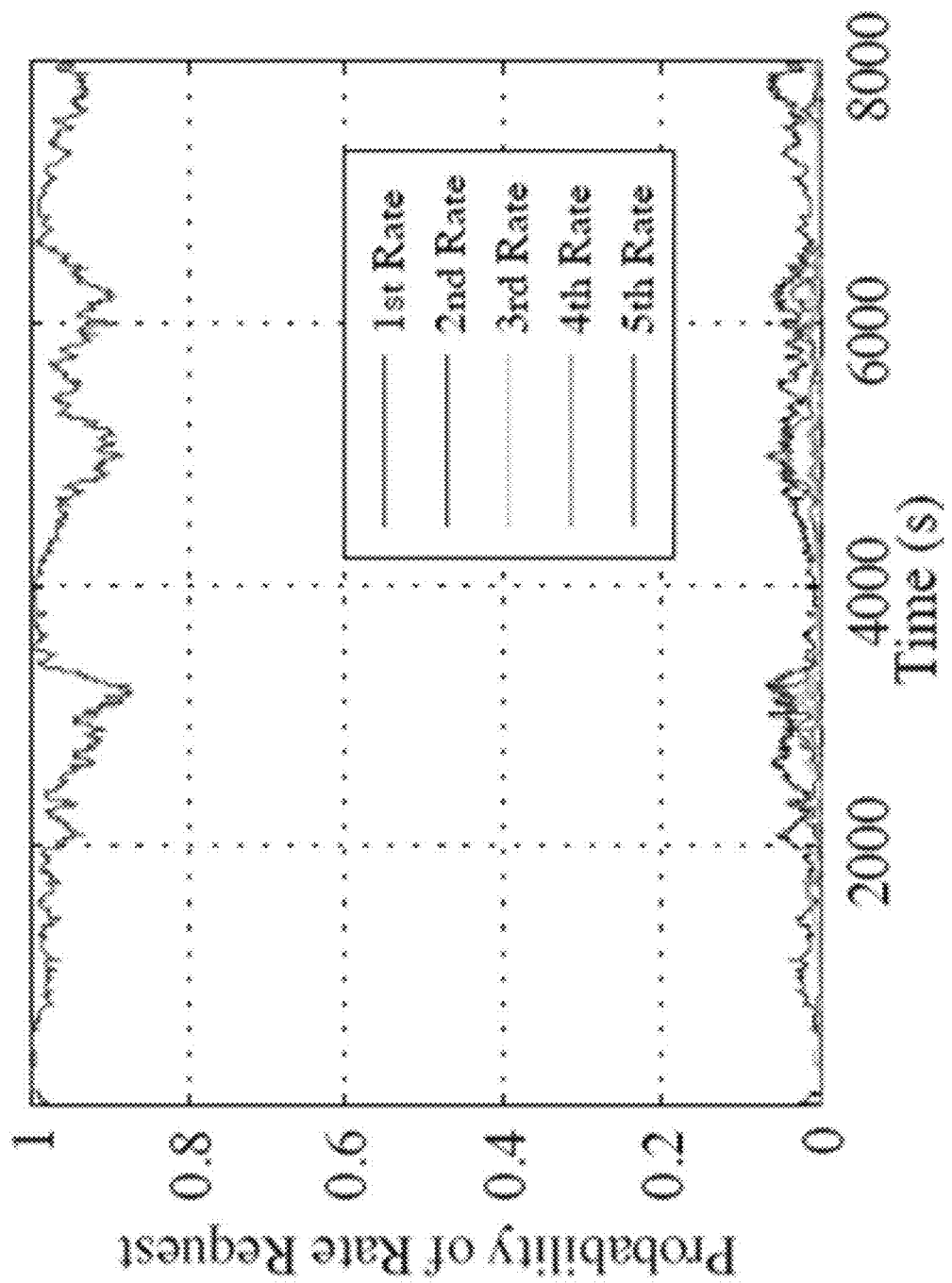

SYSTEM AND METHOD FOR DELIVERING VIDEO DATA FROM A SERVER IN A WIRELESS NETWORK BY CACHING THE VIDEO DATA

PRIORITY CLAIM AND REFERENCE TO RELATED APPLICATION

This application claims priority of U.S. Provisional Application Ser. No. 61/782,262, filed Mar. 14, 2013, under 35 U.S.C. §119, and which is incorporated in its entirety by reference herein.

FIELD OF THE INVENTION

Fields of the invention include telecommunications, networking, wireless communication, and video transmission. Example applications of the invention include video scheduling for wireless networks.

BACKGROUND OF THE INVENTION

With the world-wide growth in the adoption of mobile devices such as, but not limited to, smart phones and tablets, access to Internet video and video applications from these mobile devices is projected to grow very significantly. When Internet video is accessed by a mobile device, the video has to be fetched from the server of a content delivery network (CDN). CDNs help reduce Internet bandwidth consumption and associated delay/jitter, but the video must additionally travel through the wireless carrier Core Network (CN) and Radio Access Network (RAN) before reaching the mobile device. Besides adding to video latency, bringing each requested video from the Internet CDNs can put significant strain on the carrier's CN and RAN backhaul, leading to congestion, significant delay, and constraint on the network's capacity to serve large numbers of concurrent video requests. Internet CDNs, and caching at Internet CDNs, do not address the problems of latency and capacity for video delivery in wireless networks.

SUMMARY OF THE INVENTION

Embodiments of the invention provide, in a wireless network comprising a wireless carrier core network (CN), and a radio access network (RAN), a method for delivering video data from a server in the CDN. Video preferences of active users of a cell are determined. Video data is cached at one or more base station nodes disposed in the RAN, wherein the video data is cached in one or more micro-caches according to a caching policy that is based on the determined video preferences. A request is received for video data. If the cached video data includes the requested video data, the cached video data is served from the RAN cache. If the cached video data does not include the requested video data, the requested video is fetched from the CDN according to a scheduling approach that considers Quality of Experience (QoE).

BRIEF DESCRIPTION OF THE DRAWINGS

FIG. 5 shows an example optimization based schedule, according to an embodiment of the invention;

FIG. 6 shows an example video-aware channel scheduler (VAWS) method, according to an embodiment of the invention;

FIGS. 7A-7F shows performance of example caching policies, wherein FIG. 7A shows cache hit ratio vs. cache size, FIG. 7B shows mean backhaul bandwidth required vs. cache size, FIG. 7C shows blocking probability vs. cache size, FIG. 7D shows CDN of the delay of scheduled video requests when cache size=200 Gbits, FIG. 7E shows capacity vs. cache size, and FIG. 7F shows capacity vs. delay when cache size=100 Gbits (making probability=0.01);

FIG. 8A shows cache hit ratio vs. cache size (base scenario), FIG. 8B shows mean backhaul bandwidth required vs. cache size (base scenario), FIG. 8C shows cache hit ratio vs. cache size (Zipf parameter scenario, α=0.6), FIG. 8D shows mean backhaul bandwidth required vs. cache size (Zipf parameter scenario, α=0.6), FIG. 8E shows cache hit ratio vs. cache size (UPP distribution scenario, uniform UPP distribution), FIG. 8F shows mean backhaul bandwidth required vs. cache size (UPP distribution scenario, uniform UPP distribution), FIG. 8G shows cache hit ratio vs. cache size (user dynamics scenario, high dynamics), and FIG. 8H shows mean backhaul bandwidth required vs. cache size (user dynamics scenario, high dynamics);

FIGS. 10A-10D show performance of video-aware wireless channel schedulers, include end-to-end capacity vs. cache size (FIG. 10A), CDF of delay of all videos at UE (FIG. 10B), complementary CDF of stall duration (FIG. 10C), and blocking probability (FIG. 10D) for UMa wireless channel model;

FIG. 13 shows a hierarchical R-UPP method, according to an embodiment of the invention;

FIG. 14 shows a hierarchical P-UPP method, according to an embodiment of the invention;

FIG. 19 shows an E-LBP based adaptive rate method, according to an embodiment of the invention;

FIG. 20 shows an example resource allocation method, according to an embodiment of the invention;

FIG. 22 shows an example ABR-LRU-P caching policy, according to an embodiment of the invention;

FIG. 23 shows an example ABR-P-UPP-P caching policy, according to an embodiment of the invention;

FIG. 24 shows an example method for rounding ILP solutions to integer values;

FIGS. 25A-25D show average channel gain (FIG. 25A), average channel gain in scheduling interval (FIG. 25B), video rate distribution in a wireless channel with Doppler frequency of 3 Hz (FIG. 25C), and video rate distribution in a wireless channel with Doppler frequency of 3 Hz and 92 Hz (FIG. 25D)

DETAILED DESCRIPTION

Figure 1:
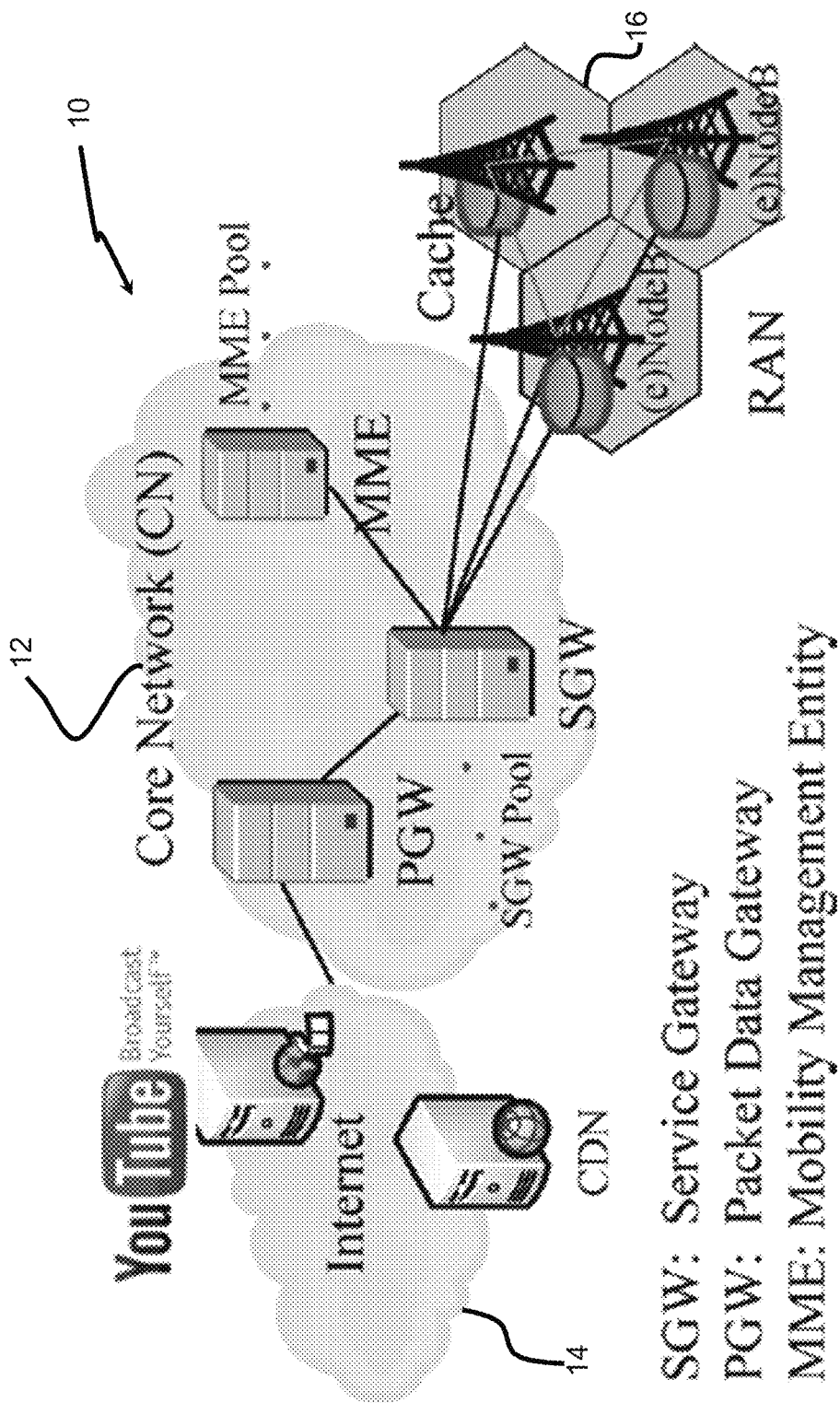
FIG. 1 shows an example wireless network, including video micro-caches disposed at an edge of a radio access network (RAN), according to an embodiment of the invention.

An embodiment of the invention is a system and method for video caching for wireless networks. Such systems and methods can provide a video wireless cloud, where the base stations in the Radio Access Network (RAN) have video caches. These video caches in example embodiments have caching policies that are aware of the video performance of users in cell sites.

Generally, a wireless network ("wireless network" as used herein can include a combination of wireless and non-wireless communications) includes a wireless carrier core network (CN), and a radio access network (RAN) including one or more base station nodes. Alternatively, the CN and RAN can itself be considered a "wireless network." To cache videos at the edge of the wireless network (e.g., (e)NodeBs), video preferences of users of a cell, for instance active users, are determined. Video data from the server is cached in one or more base station nodes, such as (e)NodeBs, in the RAN, and preferably at an edge of the RAN, according to a caching policy that is based on the determined video preferences. Example caching policies are provided herein, and can be either reactive or proactive.

Because the RAN video caching takes place on nodes such as (e)NodeBs, the caches are much smaller sized than the caches used in typical Internet CDNs, and accordingly the RAN caches are referred to as "micro-caches" herein. An example micro-cache can store thousands of videos, as opposed to the millions of videos that can be stored in CDNs. While the invention is not intended to be limited to a certain cache capacity, it should be appreciated that such micro-caches would have significantly smaller capacity than CDN storage capacity.

Upon receiving a request for video data (e.g., from a mobile device), the node can serve the cached video data from the RAN cache if it is available. If not, the video can be requested from the CDN. In example embodiments, the video requests are scheduled according to a scheduling approach that considers Quality of Experience (QoE), though the invention is not intended to be limited in all embodiments to a particular scheduling approach.

In other embodiments, video data is cached both in the RAN nodes and in one or more caches (or cache layers) of a wireless carrier core network (CN). This caching is performed according to a hierarchical hybrid and partially distributed method which, as with the methods described above is at least partially based on determined video preferences. In this latter method, however, video preferences for all active users for a plurality of cells connected to the CN preferably are also considered. Examples of this determination, and hierarchical caching methods, are disclosed herein.

The CN cache provides a higher level cache, and the RAN node caches provide lower level caches. When video data is requested, the video data can be searched for first in the lower level cache (at the cell). If it is not available, the higher level, CN cache can be searched. If video data is not found, the video data can be fetched according to a scheduling approach that considers wait times, etc.

In still other embodiments of the invention, methods and apparatuses are provided that account for adaptive bit rates. Example methods can be performed by clients, mobile devices, or other places within the wireless network. In some example methods, nodes at the RAN, such as (e)NodeBs, are provided with caches and processing ability for transrating videos from higher bitrate versions and storing videos according scheduling and caching approaches that improve capacity for users and account for quality of experience (QoE).

The present invention can be embodied in a wireless network, part of a wireless network, a particular network node, a network component, a configured processor, etc., that is configured to perform methods of the invention. A non-limiting example node includes a suitably configured processor ("processor" can be any suitable processing device or system for performing example methods), memory, and a cache coupled to the processor for storing video data. The cache can be any suitable storage device that provides sufficient capabilities for storing and retrieving video data according to embodiments of the invention. Wireless nodes can also include an antenna suitably coupled to the processor for communicating with other nodes, CNs, etc. Devices may include individual devices or combinations of multiple devices. Example network devices and systems are disclosed herein. Embodiments of the invention can also be embodied in suitably configured hardware, or in hardware instructions, firmware instructions, and/or instructions stored on a non-transitory medium or media that when executed cause a device, system, node, processor, etc. to perform methods according to the invention.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

Video Caching in Radio Access Networks (RAN)

FIG. 1 shows an example wireless network 10 for communication with a content delivery network (CDN), which can reside in the Internet. The example wireless network is a Long Term Evolution (LTE) network, which provides a wireless video cloud for delivery of video data according to an example embodiment. However, the invention is not to be limited to LTE networks, and other wireless networks, such as 3G networks, or other 4G networks, can be provided. A wireless carrier core network (CN) 12 includes a packet data gateway (PGW) with Internet access to communicate with the CDN 14 for fetching data. A service gateway (SGW) pool in the CN 12 includes at least one service gateway (SGW) that communicates with the PGW. A mobility management entity (MME) pool in the CN 12 including at least one mobility management entity communicates with the SGW pool. One or more SGWs in the SGW pool communicates wirelessly with a radio access network (RAN) 16 having one or more cells for communicating with user equipment (UE) or through X2 interface. The RAN cells include one or more nodes (as shown, evolved Node Bs (eNodeBs)) including an antenna for wirelessly communicating with UE, and a cache.

To facilitate the tremendous growth of mobile video consumption without the associated problems of congestion, delay, and lack of capacity, caching of videos in an example embodiment is moved to the edge of the wireless networks, e.g., by providing caching at nodes such as evolved NodeBs ((e)NodeBs) at the edge of the Radio Access Network (RAN), as shown in FIG. 1, such that most video requests can be served from the RAN caches, instead of having to be fetched from the Internet CDNs.

Because this example approach can lead to (for example) thousands of caches, with each (e)NodeB in the carrier RAN having a cache (and may be Access Points in Wi-Fi hot spots), example embodiments use much smaller sized "micro-caches" for RAN caching, such that the micro-caches are capable of storing, e.g., on the order of thousands of videos, compared to the much larger sized caches used in Internet CDNs capable of holding on the order of millions of videos.

It is desirable to provide a high cache hit ratio for the RAN micro-caches. That is, it is desirable for the RAN micro-caches to include the requested data for a large amount of requests so that the request does not need to be filled instead at a higher level of the wireless network, which conventionally would be the CDN (e.g., via an Internet backhaul). To address the issue of enabling high cache hit ratio for the RAN micro-caches, which otherwise may erode the benefits of caching at the edge of the wireless network, novel caching policies are provided in example embodiments.

Example caching policies are based on concepts such as the preference of current video users in a cell and what videos are least likely and most likely to be watched by the cell users. For those video requests that cannot be found in RAN caches, and hence need to be fetched from a higher level such as Internet CDNs, a video scheduling approach is provided in example embodiments that allocates the RAN backhaul resources to the video requests such that the overall capacity of the network in terms of the number of concurrent video requests can be enhanced, while satisfying video Quality of Experience (QoE). QoE is a metric used in example embodiments for measuring whether an approach meets an initial delay and ensures no stalling during playback. Numerical results from simulations run based on example methods show that RAN caching with example embodiment caching policies can lead to significant improvements in terms of video delay and system capacity.

Internet CDNs, and caching at Internet CDNs, do not address the problems of delay and capacity for video delivery in wireless networks. While some approaches have proposed caching web content in wireless networks, such proposals have not considered the challenges of video caching and delivery. Caching techniques have been also developed for ad-hoc networks, but have not been applied to video caching and delivery over cellular networks. Recently, carriers have started caching online video content as a way to address the delay and capacity problems arising from growing video consumption from mobile devices. However, video caching is not believed to have yet been attempted in the RANs. Similarly, RAN video caching and delivery, including caching policies aware of the preferences of users in a RAN cell, and scheduling of videos to maximize video capacity while satisfying QoE are believed to be unique.

Studies performed on the popularity of online videos has shown that video popularity follows a Zipf distribution. Particularly, 10% of the online videos account for nearly 80% of the views, while the remaining 90% of the videos account for only a total of 20% of views. Further, it has been shown that national video popularity does not reflect local video popularity, so the video popularity in different cell sites may be different from each other and the national popularity distribution. Additionally, it has been shown that users may have strong preferences towards specific video categories. For example, popular video categories such as "Auto" and "Entertainment" have a 90 days average cumulative views number that is 10 times more than less popular video categories such as Travel, revealing a strong bias towards some video categories. Example embodiments of the present invention attempt to define and identify video preferences of the active users in a particular cell in terms of video categories that they prefer to watch.

To understand local video popularity in a cell site, an Active User Set (AUS) of a cell is defined as a set of mobile users in the cell who either have an active video session, or have watched and are likely to again watch video when present in the cell. AUS changes as users enter or leave the cell site. For example, in long term evolution (LTE) networks, (e)NodeBs know the location of the user equipment (UEs) in connected mode, or the general location of UEs in idle mode. One associates a User Preference Profile (UPP) with each individual user, which is defined as the probability that the user, $u_k$, requests videos of a specific video category $vc_j$, $p(vc_j|u_k)$, for all available video categories. The probability that a video belonging to video category $vc_j$ is requested by the active users in a cell, AUS, is the sum of probabilities that $vc_j$ is being selected by each user in the AUS, and is given by:

$$p_{AUS}(vc_j) = \sum_{k=1}^{|U|} p(u_k) p(vc_j | u_k) \qquad (1)$$

In the above equation, |U| is the cardinality of AUS, and $p(u_k)$ is the probability that user, $u_k$, generates a video request. Following this definition, one defines the UPP of an AUS as the selection probability of each available video category by the AUS: $\{p_{AUS}(vc_j) | \forall j=1:|VC|\}$. It is assumed in this example that all users are equally likely to generate a video request, so equation (1) can be rewritten as:

$$p_{AUS}(vc_j) = \frac{1}{|U|} \sum_{k=1}^{|U|} p(vc_j | u_k)$$

Next, given the overall video popularity distribution, and the category of each video, one identifies the video popularity distribution within each category. In general, a video can belong to multiple video categories, but for convenience of notation, it is assumed that a video belongs to one video category. Let $p(v_i)$ be the overall popularity of video $v_i$ across all videos and video categories. Let $p_{vc_j}(v_i)=p(v_i)$ if $v_i$ belongs to category $vc_j$, else $p_{vc_j}(v_i)=0$. One can then express popularity of video $v_i$ within video category, $vc_j$, by:

$$p(v_{i,j}) = \frac{p_{vc_j}(v_i)}{\sum_{i=1}^{|V|} p_{vc_j}(v_i)} \quad (2)$$

where $|V|$ is the total number of videos, and the denominator is the sum of the probabilities of all videos belonging to $vc_j$. Note that video popularity distribution may be available for each category. For example, video popularity can be determined by a method such as disclosed in M. Cha et al., "Analyzing the Video Popularity Characteristics of Large-Scale User Generated Content Systems," IEEE/ACM Transactions on Networking, Vol. 17, No. 5, October 2009. Otherwise, it can be calculated using equation (2). Knowing the probability of request of different video categories in a cell corresponding to the current AUS (Equation (1)), and the popularity of videos in each category, one can now derive $P_R(v_i)$, which is the probability that video $v_i$ is requested given the AUS of the cell, as:

$$P_R(v_i) = \sum_{j=1}^{|VC|} p(v_{i,j}) p_{AUS}(vc_j) \quad (3)$$

Two sets are defined that are used for example UPP-based caching policies: Most Likely Requested (MLR) and Least Likely Requested (LLR) sets. MLR is a subset of videos with $P_R$ values greater than a threshold, and LLR is a subset of videos from the cache with the least $P_R$ value.

For illustration, four different caching methods are shown below: two that are conventionally used by Internet CDNs, MPV and LRU, and two methods according to present example embodiments based on preferences of active users in the cell, P-UPP and R-UPP.

MPV is a proactive caching policy, which caches the "most popular videos" using nation-wide video popularity distribution. MPV neither updates the caches based on the user requests nor implements any cache replacement policy. The only changes that require cache update are changes in the video popularity distribution. Since the number of videos that are cached depends on the cache size, the performance of MPV in terms of cache hit ratio can be high if implemented for large caches possible for Internet CDNs. However, for RAN micro-caches, which are limited in size, and because videos requested by active users of a cell may be very different from nation-wide "most popular videos," the cache hit ratio achieved by MPV policy may not be high when used for RAN micro-caches.

This implementation of MPV requires retrieval and availability of the (nationwide) video popularity distribution. Alternatively, the cache can infer video popularity locally by tracking the number of requests to each video after it is first requested. As local MPV retrieves popularity information locally by keeping track of the number of requests to a video and evicting Least Frequently Used (LFU) videos, it is termed LFU. Simply evicting the LFU videos has some drawbacks. For instance, if a video becomes very popular over a short period of time only to be quickly forgotten, it will take a long time for the video to be superseded by enough other videos to evict it from the cache, despite the fact that there is very little interest in the video going forward. Thus, an example implementation of LFU caching policy according to example embodiments keeps track of the number of requests to a video, and also maintains a request counter that is incremented each time a request is made to any video in the cache. Thus, when evicting a video from the cache instead of simply evicting the video with the least number of requests, the video is evicted that has the lowest ratio between the requests to the video and the number of requests to any video for the duration the video has been cached.

LRU is described in N. Laoutaris, "A Closed-Form Method for LRU Replacement under Generalized Power-Law Demand," presented at CoRR, 2007. The LRU method is a reactive caching policy, which fetches the video from the Internet CDN and caches it if there is a cache miss. If the cache is full, LRU replaces the video in the cache that has been least recently used. The cache hit ratio of a micro-cache associated with a cell that uses LRU policy depends on the overlap of the video requests of the active users in the cell, and is influenced by the degree of overlap of their UPP. The backhaul bandwidth and delay needed to bring videos to the cache will depend on the cache hit ratio, since there is no pre-fetching bandwidth.

Example caching methods are based on preferences of active users in the cell. Particular example caching methods are referred to as reactive user preference profile (R-UPP) and proactive user preference profile (P-UPP).

Figure 2:
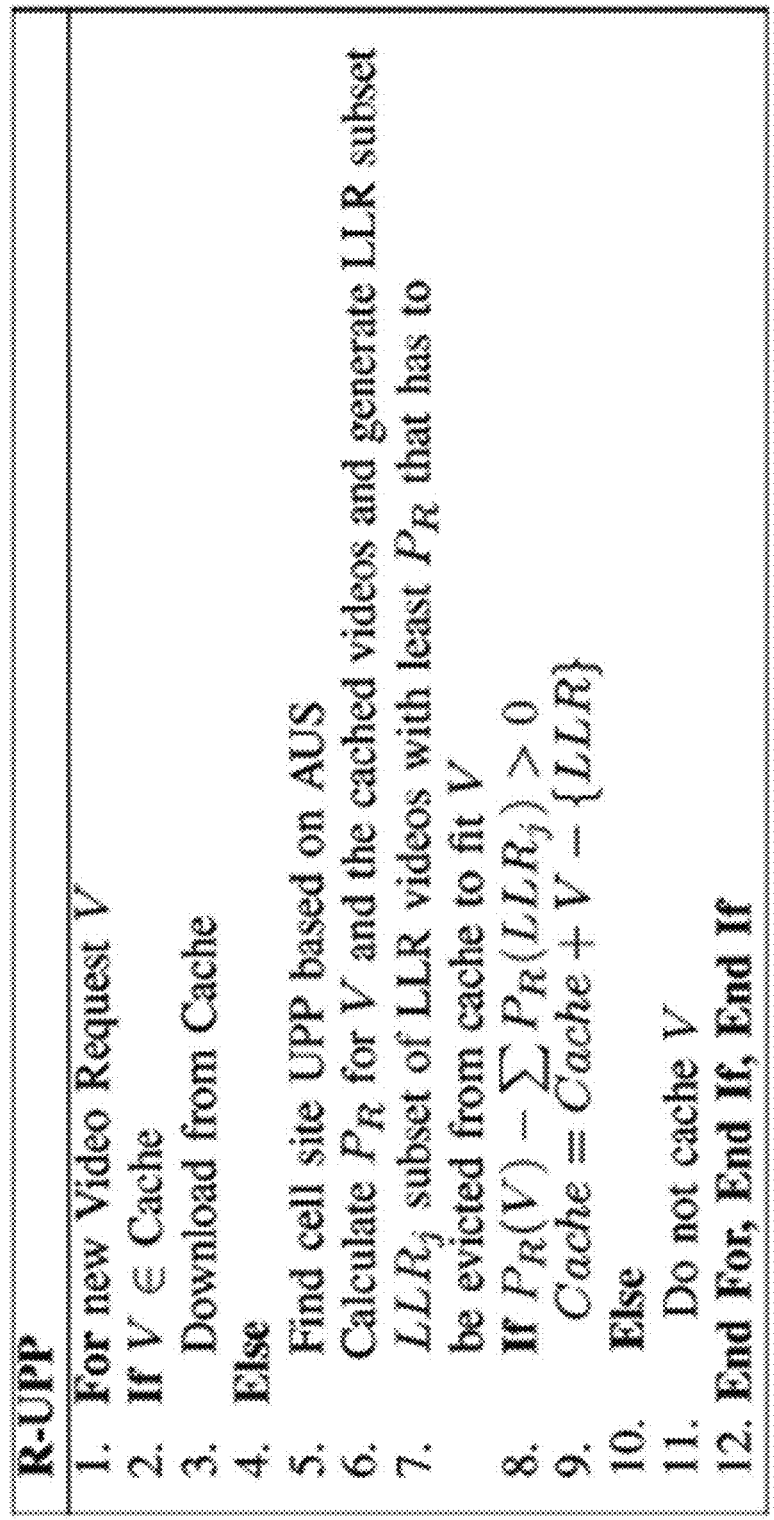
FIG. 2 shows an example reactive user preference profile-based method (R-UPP), according to an embodiment of the invention.

An example R-UPP method is shown in FIG. 2. According to a particular example embodiment of the present invention, R-UPP is provided as a reactive caching policy based on the UPPs of the active users in a cell. If the requested video V is present in the cache, providing a cache hit (V ∈ Cache), it can be downloaded from the cache. For a video requested that is not present in the cache, R-UPP fetches the video from the Internet CDN and caches it. If the cache is full, R-UPP replaces videos in the cache depending on the UPP of the active users using the LLR set disclosed above, and in case of ties can be according to an LRU replacement policy. It is contemplated that policies other than LRU can be used in case of ties.

In the R-UPP method, when there is a cache miss, the request probabilities of the videos in the cache and the requested video are calculated by finding the cell site UPP based on AUS, as described above. Video request probability PR is calculated for V and the cached videos, and those with the least $P_R$ values form a least likely requested (LLR) subset ($LLR_j$) (lines 5 and 6). The LLR video or videos of the cache are replaced with the requested video V in this example method (Cache=Cache+V−{LLR}) only if the newly requested video is not the one with the least $P_R$. If the newly requested video is the one with the least $P_R$ (if LLR=V) then the video is not cached. Alternatively, the difference is calculated between the newly requested video probability and the request probability of the subset of LLR videos from the cache with the least $P_R$ values that need to be evicted. If the difference is greater than zero, the cache is updated with the new video V (lines 8 and 9).

If there are multiple videos that have the same minimum $P_R$ value in the LLR (|LLR|>1), the LRU policy or other policy can be used to select the one to be replaced (LLR=LRU(LLR)). This example approach ensures that the cached videos have the highest probability of being requested again by the current active users of the cell.

Figure 3:
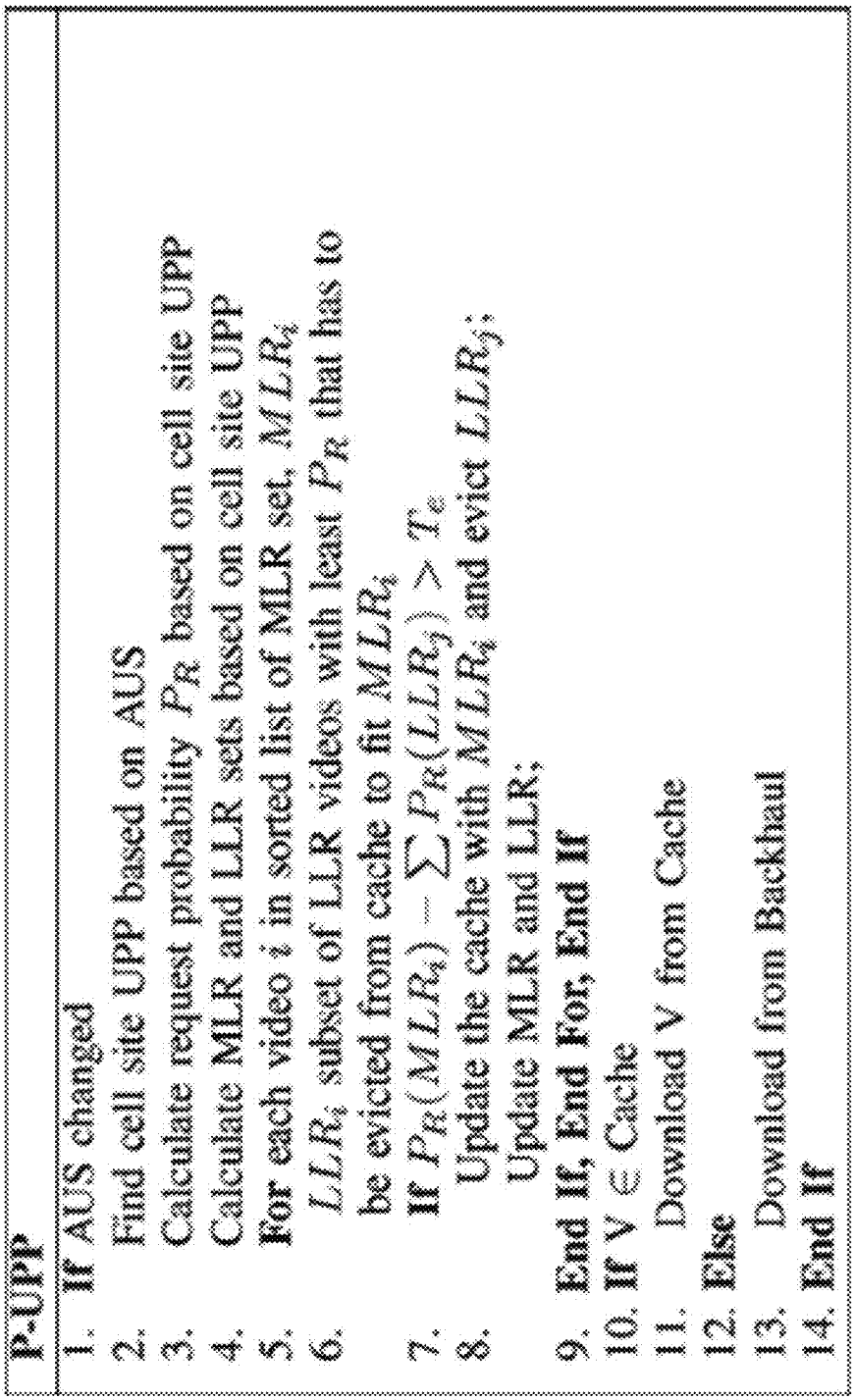
FIG. 3 shows an example proactive user preference profile-based method (P-UPP), according to an embodiment of the invention.

Another example method, proactive user preference profile (P-UPP), is shown in FIG. 3. P-UPP provides a proactive caching policy, which preloads the cache with videos that are most likely to be requested, based on the UPP of the active users of the cell. At the beginning, and preferably every time the AUS changes due to user arrival or departure, video request probabilities $P_R$ are calculated using the example equation (3), and Most Likely Requested (MLR) and Least likely Requested (LLR) sets are calculated. Videos belonging to the set MLR are loaded in the cache (lines 2-5).

If the AUS changes frequently, the proactive policy may lead to high computational complexity, and more importantly, high backhaul bandwidth. An example method addresses this by providing a hybrid solution, where the cache is only updated if the expected cache hit ratio improvement due to replacement exceeds a preset threshold. More specifically, for each video i from the sorted list of the MLR set ($MLR_i$) to be added to the cache, an example embodiment calculates the difference between the video's request probability $P_R$ and the request probability $P_R$ of the subset of LLR videos (LLR) from the cache with the least $P_R$ values that need to be evicted to free up space for the new video. If (preferably only if) the difference is greater than a threshold $T_e$, the cache update is effectuated (lines 5-8).

With the cache preloaded, for a video request V, if the video is in the cache, the missed video is downloaded from the cache. If not, the video is downloaded from the backhaul.

In an alternative embodiment, user requests are allowed to temporarily reassign bandwidth that was previously assigned to the cache maintenance downloads. In addition, to ensure that enough bandwidth is allocated to the video session, a maintenance session is promoted to a user download if the associated video is being requested by a user while being downloaded for the cache. If, on the other hand, the cache wants to download a video that is already being downloaded by a video client, it will be copied to the cache as well as the downloading user.

While the example UPP-based cache policies, R-UPP and P-UPP, can result in higher cache hit ratios than some conventional policies, still all videos not found in the cell cache may need to be brought from the Internet CDNs, traversing through the core and backhaul network. Additional example methods provide a scheduling approach that coordinates with requesting video clients and allocates backhaul resources in a way that can increase the overall capacity of a system.

For example, for each video request that results in a cache miss, the corresponding video may need to be fetched from an Internet CDN. For example proactive policies such as P-UPP, bringing the missed videos is in addition to bringing the videos that need to be fetched proactively to the cache. Depending on the number of concurrent video requests, the number of cache misses, and the number of proactively fetched videos and frequency of pre-fetching, the backhaul bandwidth may not be sufficient for all the videos that need to be brought through the backhaul.

Further, all of the videos, whether they are served from the cache or the CDN, need to traverse through the wireless channel. Thus, the successful scheduling of the video request depends on both backhaul and wireless channel bandwidth availability, of which the latter is dependent on the fading state of all users' wireless channels. Furthermore, a joint scheduling of the backhaul and wireless channel resources is needed so that once a video session is scheduled on the wireless channel, the backhaul has put enough data in the (e)NodeB buffer to support a seamless data transfer to the user over the wireless channel.

There can be various possible ways of scheduling the video fetches and allocating the backhaul bandwidth. One approach is to satisfy all the pending fetches, which may result in some fetches getting significantly delayed, resulting in unacceptable video playback delay. Example embodiments of the invention take an alternative scheduling approach, which aims to maximize the number of videos that can be served, while preferably ensuring each served video meets certain quality of experience (QoE) requirements, including initial delay. Example methods address video QoE for scheduled users by using video Leaky Bucket Parameters (LBPs) to determine and meet whenever possible minimum data rates that will satisfy initial delay requirements and minimize stalling, and by jointly scheduling RAN and RAN backhaul resources, in the context of RAN cache misses, to increase end-to-end video capacity.

In example embodiments, video QoE is considered to include two aspects: 1) the initial delay the player has to wait before it can start playing; and 2) the number of stalls during the video session. The initial delay is needed to fill the client buffer to a certain level so to absorb any variations in the network's data transmission rate, and the decoding process can proceed smoothly without any stalls once playback has started.

An example embodiment method uses LBPs to determine the initial delay requirement. In most video coding standards, a compliant bit stream must be decoded by a HRD (Hypothetical Reference Decoder) connected to the output of the encoder emulating a decode buffer, a decoder and a display unit. The HRD generates LBPs that consist of N 3-tuples (R, B, F) corresponding to N sets of transmission rates and buffer size parameters for a given bit stream. An LBP tuple guarantees that as long as the average transmission rate is maintained at R bits/second, the client has a buffer size of B bits, and the buffer is initially filled with F bits before video playback starts, the video session will proceed without any stalling or buffer overflow. Consequently, F/R is the initial delay that the decoder needs to wait to guarantee a stall free playback. R is the minimum rate required at which the constant bit rate video should be delivered to the user. If a lower R is chosen while the video playback rate remains constant, more video bits must be buffered (higher F) before playback can start in order to guarantee playback without stalling, and therefore the buffer size requirement increases. B is the minimum buffer size needed to contain a bit stream without the danger of decoder buffer overflow. Some example embodiments assume that B is not a constraint and is large enough even for data rate as low as, say, 10 kb/s and the longest video sequences encountered.

Figure 4:
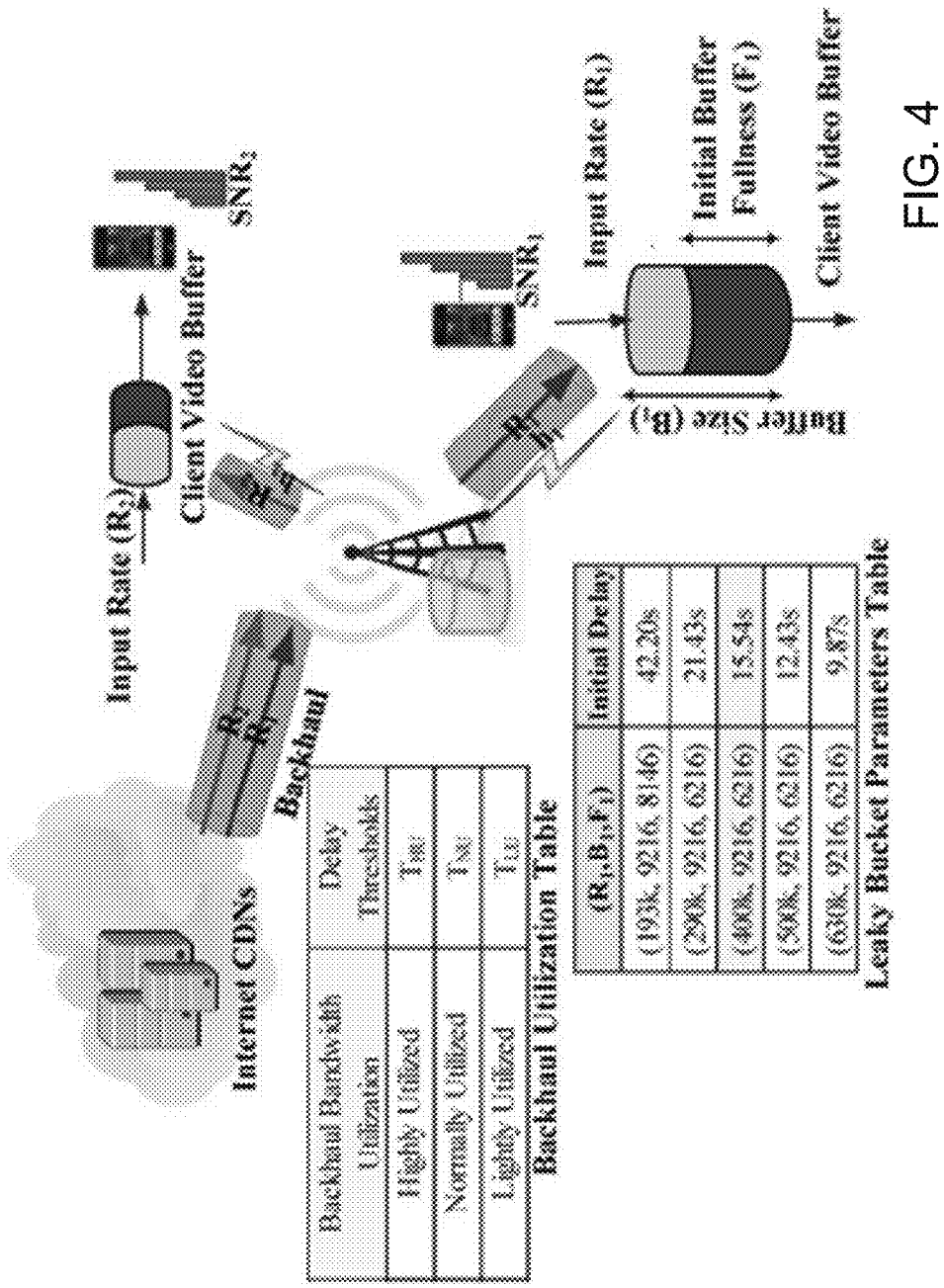
FIG. 4 shows example scheduling scenarios, according to an embodiment of the invention.

FIG. 4 shows an example wireless network for delivering video data illustrating LBPs. The wireless network includes a node ((e)NodeB) with a video cache. The node fetches video data from Internet CDNs over a RAN backhaul and delivers video data to a client video buffer. Example LBPs are shown in a table associated with the client video buffer, and the resulting initial delays. For example, if the transmission rate is 400 Kbps, the initial delay is 15.54 seconds. The LBP values shown in FIG. 4 are specific to one video, and they differ depending on the characteristics of the video (e.g., low motion versus high motion, duration of the video, etc.). It can be inferred that as the initial delay increases, the data rate required for transmission increases.

A video client, at the beginning of a video session, can use the LBPs for the requested video to request a data rate, and select the corresponding initial delay. As shown in FIG. 4, the higher the data rate requested, the less the initial delay. However, if all the video clients greedily select the highest data rates, there may be more congestion in the RAN backhaul, leading to fewer requests that can be served.

Consequently, a scheduler is provided in example embodiments to allocate the data rates judiciously. Given a RAN backhaul bandwidth constraint, and a distribution of video requests, capacity can be defined as the number of concurrent requests that can be served while meeting each request's QoE requirement (maximum acceptable initial delay, and no stalling). The example scheduling approach aims to maximize capacity by allocating to each requesting video client the lowest valid LBP bit rate that satisfies its maximum acceptable initial delay, and hence also ensuring no or minimal stalling during the video session.

Ideally, a video playback session without stalling is desired. However, the LBP's minimum rate through the wireless channel cannot be guaranteed during a video session, because dynamics in the user's wireless channel condition may make it impossible to achieve the minimum rate and as a result eliminate stalling. As acceptable initial delay decreases (and user QoE requirement increases), the data rate required to meet the QoE requirement increases, and as a result, the blocking probability may increase and capacity decrease. If the total number of concurrent video requests is low, an increase in the users' QoE may not result in blocking probability.

If a video request is a cache miss, the video should be fetched from the CDN and traverse through the backhaul to reach the (e)NodeB buffer. Thus, for ensuring the video client's QoE, joint scheduling between backhaul and wireless channel is desired. Scheduling of the video through the backhaul is done using the backhaul scheduler, which ultimately delivers the data to the (e)NodeB buffer. The example wireless channel scheduler schedules users and transfers the data from the (e)NodeB buffer through the wireless channel. Therefore, though an example method does not guarantee that no stalling will occur in the wireless channel, it can continue to enforce the no-stalling requirement for scheduling of videos through the backhaul to guarantee that if the wireless channel can schedule the users, there are enough data available in the (e)NodeB buffer to transmit through the channel.

The goal of an example backhaul scheduling approach is to support as many concurrent videos served as possible while ensuring initial delay below an acceptable threshold. One example approach provides a collaborative client and backhaul scheduler method, where the scheduler recommends an initial delay and video clients request a rate accordingly using LBP.

An example collaborative client and backhaul scheduler method will now be described. In a simple approach, the client can look up the data rate corresponding to, or right below, the maximum delay that it can tolerate and communicate it to the backhaul scheduler, and the backhaul scheduler can try to grant the requested rate. However, this approach would deprive the client of lower initial delays when the backhaul has spare bandwidth. The example collaborative method facilitates better initial delays to the clients when backhaul is lightly utilized, while providing higher capacity in highly utilized conditions.

Three backhaul utilization states are defined: not congested (lightly utilized), normal congested (normally utilized), and highly congested (highly utilized), and a maximum delay is associated to each of these states: $T_{HU}$, $T_{NU}$, $T_{LU}$. At any given time, the backhaul is in one of the above utilization states, depending on the number of videos that need to be fetched through the backhaul (including videos that need to be prefetched by proactive caches).

The maximum delay associated with each utilization state is the backhaul scheduler's estimate of initial delays that it can offer to its clients depending on the utilization state. $T_{HU}$ is set to the maximum acceptable initial delay for the users, as successfully scheduling a video request should amount to satisfying the initial delay requirements. On the other hand, in normally utilized and lightly utilized states, the backhaul scheduler would like to offer lower possible initial delays to the requesting clients. Thus, $T_{NU}$ is set to a lower value than $T_{HU}$, and $T_{LU}$ is set to an even lower value than $T_{NU}$. $T_{LU}$ is set to the delay that results in an average data rate that matches the network expectation of the highest supportable rate. For instance, using analysis of the LBP tables of a representative set of videos, the example scheduler can come up with the delay and rate association of the videos. Using empirical association with network QoE and the expected number of potential video requests in the network, the example scheduler can predict the data rate required to support the desired QoE. To come up with this empirical association, it is useful to consider the video popularity distribution and come up with the adjusted weighted average data rate depending on the video request probability. $T_{NU}$ value is set to somewhere between $T_{HU}$ and $T_{LU}$ to provide an intermediate step. In general, more than three utilization states can be defined and used, with corresponding maximum delay thresholds.

When a video is requested, the backhaul scheduler offers to the client the delay associated with its utilization state. The client chooses a delay from the LBP just below the smaller of the maximum delay offered by the backhaul scheduler and the clients' individual delay requirement and requests the corresponding bit rate. If the backhaul is in a lightly utilized condition, the client may end up choosing a delay much lower than its initial delay requirements, and thus a more aggressive data rate than the simple approach described above. If the backhaul scheduler cannot grant the requested rate, it notifies the client. Subsequently, the client reverts to selecting a delay at or lower than its maximum acceptable delay, and the corresponding data rate lower than its previous request; if this rate also cannot be granted, the backhaul scheduler blocks the request.

FIG. 4 shows an example of backhaul utilization states and associated delays. In an example method, for a video request which results in a cache miss, depending on the current utilization state, the example scheduler sends the corresponding maximum delay as part of the initial handshaking to the client. From the LBPs available, the client selects a transmission bit rate R that results in an initial delay F/R just below the backhaul delay threshold, and communicates it back to the scheduler. Subsequently, the scheduler allocates the RAN backhaul resource at the transmission rate selected by the client, only if enough space bandwidth is available.

For example, consider a scenario where the backhaul is in normal utilization state and a video request needs to be served which has an acceptable initial delay threshold $T_{HU}$ of 30 seconds (minimum QoE requirement), as any delay below 30 s does not satisfy the client's QoE requirements. Assuming the table shown in FIG. 4 is representative of other videos, meaning delay of 10 s requires bandwidth of around 600 kb/s on average with an upper and lower bound for the majority of videos, $T_{LU}$ is set to 10 s, and subsequently is set to $T_{NU}$, a value between 30 s and 10 s. As mentioned above, the delay of 10 s is an estimate of delay provided by the backhaul scheduler to support better QoE. Thus, if the delay of 10 s or right below 10 s for a video, according to the LBP table, results in higher required bandwidth than the scheduler can grant, the video client requests a delay higher than 10 s and below its maximum acceptable QoE requirement.

Consider a video request when the backhaul is in its normal utilization state. The backhaul scheduler offers the client the delay corresponding to the normally utilized state, which is 20 s in this case. The client selects from its LBP an initial delay lower than 20 s, which is 15.5 s, and requests the corresponding data rate of 400 kb/s. However, if the backhaul scheduler does not have the bandwidth to support the 400 kb/s rate, the client will use its LBP to select an initial delay lower than its maximum acceptable initial delay (30 s), which is 21.4 s, and requests 290 kb/s bit rate. If this rate also cannot be granted, the scheduler blocks the request.

Determining the best delay values associated with each backhaul utilization state may be difficult, given that the LBPs associated with different videos may vary widely, and given that the backhaul spare capacity varies due to new video requests entering the system and existing ones completing. An additional scheduling approach, an optimization based scheduler, utilizes the spare backhaul capacity to finish downloads faster to better free up bandwidth for future peak demand periods.

In this example approach, each video client requests the lower rate that satisfies its initial delay requirement using the LBP. Based on the requested rate and current loading of the backhaul, the example schedule decides whether to admit or reject the user. To avoid stalling, the scheduling method ensures that the download rate does not fall below the minimum requested rate at any time during the transmission. For this reason, the scheduler refrains from admitting new video requests if there is not enough bandwidth to maintain the minimum required rates of the scheduled requests. On the other hand, if there is additional bandwidth after scheduling all the requested videos, the spare capacity can be used to accelerate the ongoing downloads with the intent to finish downloads faster and free up bandwidth for later use. The scheduling problem is formulated as maximizing an objective function $f(b_i)$, under the constraint that the bandwidth of the ith flow, $b_i$, should be greater than the initially scheduled (minimum) rate, $R_{min}^{(i)}$, and the sum of the bandwidth of all scheduled flows that go through the RAN backhaul must be equal to capacity limit, $C_1$:

Maximize: $f(b_i)$

Subject to: $b_i \geq R_{min}^{(i)} \forall i \in F_1$ $\Sigma_{i \in F_1} b_i \leq C_1$ $F_1$ is the set of flows that go through the RAN backhaul, and $R_{min}^{(i)}$ is the minimum required rate of the ith video request. The objective function $f(b_i)$ is defined depending on how the additional bandwidth (after allocation of $R_{min}$) is intended to be distributed among the scheduled video flows. For an example method, to allocate the additional bandwidth equally among ongoing video flows, the objective function $f(b_i)=\max \Sigma_{i \in F_1} \log(b_i - R_{min}^{(i)})$ is used. For other ways of allocating the additional bandwidth, $f(b_i)$ can be defined appropriately. For example, for weighted proportional fair allocation, $f(b_i)=\max \Sigma_{i \in F_1} w_i (Ub_i)$, where $w_i$ is the weight given to each allocation and $Ub_i$ is the utility function for the bandwidth allocated to flow $b_i$. As an alternative, one can define a polytope containing all and the only solutions to the constraints as follows: $\{b_i | b_i \geq R_{min} \forall i \in F_1; \Sigma_{i \in F_1} b_i = C_1\}$.

FIG. 5 shows an example method for rate allocation. The example optimization formulation is executed only after all the initial video bandwidth assignments ($R_{min}^{(i)}$) are decided based on LBP. In other words, after any new video request, one first makes sure that the new video request can be admitted based on its LBP and minimum required rate of all existing video sessions, otherwise the newly arrived video request is blocked. Only after all the videos receive their $R_{min}$, are the maximizations executed to further optimize the rate by using the additional bandwidth.

The LBP preferably spans useful delay/rate pairs, which are the delays that the scheduler could be interested in achieving for the initial delay. Intermediate values not directly available in the table may be derived using interpolation of existing table values.

Any video scheduled through the RAN backhaul or found in the (e)NodeB cache should further traverse through the wireless channel before reaching the client's buffer. For a wireless channel, the rate allocated to a video session cannot be maintained throughout the video session, and rate scheduling should be done in small intervals to adapt to changing channel conditions in order to admit as many users as possible.

Another example scheduling method is referred to herein as a video-aware wireless channel scheduler (VAWS). This example method makes the RAN scheduling video-aware using the LBPs of the videos, such that the number of videos that can be transmitted from the (e)NodeBs to the clients can be maximized.

In an example network, the wireless channel is assumed small-scale flat fading with log-normal shadow fading path loss modeled according to 3GPP TR 36.814 V0.4.1 Urban Macro (UMa) and Urban Micro (UMi) models. With these models, some users experience good average channel conditions, and some experience degraded channel conditions depending on their specific channel realization, e.g., whether or not there is line-of-sight (LOS) communication, and the distance from the (e)NodeB. These models are congruent with the typical nomadic video usage scenario in cellular networks, as users that are located in the vicinity of the (e)NodeB experience a better wireless channel and as a result have higher data rates than the users that are located at the cell edge.

For illustration, assume an LTE system where the users are assigned subcarriers and power so that there is no dominant interference from the serving cell or neighboring cells. Without the presence of dominant interference, one can model interference using a band-limited white noise process as proposed by 3GPP, "TS36.101 v11.3.0, Evolved universal terrestrial radio access (E-UTRA), User equipment (UE) radio transmission and reception, 2013 (Online) http://www.3gpp.org, and combine it with the thermal noise, which allows one to use a simple rate estimate given by the Shannon capacity formula as $$R_i = B_i \log_2(1+SNR_i) \tag{4}$$

where $B_i$ is the channel bandwidth of the ith user in hertz, $SNR_i$ is the signal-to-noise ratio for the ith user, and $R_i$ is the achieved rate for user i in bits per second (b/s). Furthermore, it is assumed that the channel state of each user allocated across all tones is equal to power multiplied by square of the user's channel gain and that the SNR can be expressed as $$SNR_i = P_i |h_i|^2 / B_i N_0 \tag{5}$$

where $P_i$ is the allocated power for user i, $h_i$ is the channel gain for user i, which includes the combined effect of small- and large-scale fading, and $N_0$ is the noise and interference power spectral density. The goal is to allocate power $P_i$ and bandwidth $B_i$ to maximize overall cell throughput while satisfying the ith user's minimum rate requirements $R_{min}^{(i)}$, which is the rate that, if sustained, guarantees a video session without stalling.

An example method includes two phases. The first phase is to attempt to assign enough subcarriers to satisfy $R_{min}$ of each user, assuming equal power assignment per subcarrier and starting with the video request that has the best channel condition. The second phase is to re-allocate power, first to ensure $R_{min}$ of each user that was allocated in the first step, and then using waterfilling to assign the remaining power optimally to the users that were given subcarriers. Optionally, the first step may be executed again to reevaluate the subcarrier assignment based on the power allocation of the second phase of the previous iteration and subsequently assign power; i.e., repeating the first and second steps multiple times to get improved power and subcarrier assignment. The second iteration is to address the case where some users are assigned so much power by waterfilling in the second phase of the previous iteration that they are able to meet the minimum rate requirement with fewer subcarriers than were first assigned. The iterative process does not result in any gain if all users are assigned subcarriers during the first phase of the previous iteration or if there is no excess power to redistribute using waterfilling in the second phase of the previous iteration. The iterative process does not result in any gain if all users are assigned subcarriers during the first phase of the previous iteration or if there is no excess power to redistribute using waterfilling in the second phase of the previous iteration.

Because the channel is flat fading, subcarriers can be assigned independently for each user—i.e., no subcarrier performs better or worse for a given user, so one only needs to determine how many subcarriers to assign. Had the channel been frequency-selective, one would also need to decide which carriers to assign. With assumption of equal power allocation per subcarrier assigned to video request i, one can derive the number of subcarriers assigned to a video request as follows:

$$n_{sub}^{(i)} = \left\lceil \frac{R_{min}^{(i)}}{B_{sub} \log_2\left(1 + \frac{P_{sub}^{(i)} |h_i|^2}{B_{sub} N_0}\right)} \right\rceil \quad (6)$$

One uses $P_{sub}^{(i)}$ to denote the power per subcarrier for the ith user, which is initially set to the total power constraint, $\bar{P}$, divided by total number of subcarriers, $N_{sub}$. The bandwidth of each subcarrier is $B_{sub}$, which is equal to total bandwidth divided by total number of subcarriers. Subcarriers are assigned to the video requests with the best channel conditions first and until the total number of available subcarriers has been assigned. If there are unused subcarriers available, after all video requests have been assigned enough subcarriers to meet the minimum rate requirements, the remaining subcarriers are divided in a round-robin fashion starting with the user with the best channel.

In the second phase, to refine the initial uniform power allocation, since there is no dominant interference between users, one can use equations (4) and (5) to allocate the power corresponding to the minimum rate requirements for each user independently of other users $$P_{min}^{(i)} = \frac{B_i N_0}{|h_i|^2} (2^{R_{min}^{(i)}/B_i} - 1) \quad (7)$$

In the above equation, $R_{min}^{(i)}$ is user i's minimum rate requirement, and $P_{min}^{(i)}$ is the required minimum power to achieve that rate.

Because of the first phase, one knows that equation (7) will either keep or reduce the allocated power per subcarrier for each user. After assigning $P_{min}^{(i)}$ to each user, whatever power remains unassigned will be allocated optimally using the waterfilling algorithm.

FIG. 6 shows an example video-aware wireless channel rate allocation and admission method. In the event of a new video request (without loss of generality, one video request at a time is assumed), a limited handshake between wireless channel and backhaul is used to ensure that neither backhaul nor wireless channel bandwidth is wasted for a request that is blocked in the other resource. For each new video request, if there is enough backhaul bandwidth available to schedule the video through the backhaul, one adds the video to $List_{buffer}$, which keeps track of the videos that are in initial buffering stage. Otherwise, one blocks the request due to insufficient backhaul resources. Other than the above initial handshake, the data exchange between backhaul and wireless channel is through the (e)NodeB buffer.

The wireless channel scheduler is executed at fixed intervals (e.g., every 10 ms) to derive the subcarrier and power allocation for all videos in the playback or buffering mode.

Subcarriers are assigned in phase 1, assuming equal power allocation using equation (6), and the power allocation is refined in phase 2. In the second phase, one first allocates power to satisfy $R_{min}$ for all video requests using equation (7). After minimum power allocation, the remaining power, P', is allocated among ongoing video requests, which were assigned subcarriers in the first phase, using a waterfilling algorithm. After allocating excess power using waterfilling, some users may end up having so much power per subcarrier that their min rate requirements can be met with less subcarriers that were initially given by Phase 1. Thus, as an enhancement, one can repeat Phases 1 and 2 twice to refine the allocation. Once the power allocation is finalized, one calculates the instantaneous channel rate, $R_{inst}^{(i)}$, for all ongoing video requests.

After rate allocation, during the same scheduling interval, the video requests that were not able to fill their initial video buffer $T_{init}$ in a timely manner blocked and removed from the $List_{buffer}$. Video sessions that can fill their initial buffer within acceptable time ($T_e$) are promoted to $List_{playback}$, and their video playback commences.

As explained above, video QoE is measured using the initial delay and probability of stalling. Furthermore, the example backhaul scheduler is designed so that once a video request is admitted with a rate of $R_{min}$, the achieved backhaul rate is at least $R_{min}$ for the entire video session. However, because of the inevitable variations in the wireless channel, a similar rate guarantee for the wireless channel is not feasible. An example method uses an IIR filter to estimate the average rate achieved from the instantaneous channel rate in a way that takes into account the history of the rate allocation. The video downloads are classified based on the average achievable rate. $\beta_1 (\beta_1 \leq 1)$ is a threshold used to identify the users that achieve a rate below factor of $R_{min}$. This threshold is used to identify the users that may experience stalling depending on the value of $\beta_1$. To quantify stalling as a performance metric, one models the UE's decoding buffer by adding bits to it at the scheduled rate while subtracting bits corresponding to the actual frame sizes of the video being played back, so that any buffer underflow accurately indicates video playback stalling.

In addition, to avoid unfair allocation of rate; i.e., some video requests achieve average rates of well above their $R_{min}$, while other video requests in playback mode are blocked frequently (i.e., $|List_b| \neq 0$) and experience stalling;

an example method temporarily suspends video requests with $R_{avg}^{(i)}$ above $\beta_2 R_{min}^{(i)}$ in subsequent scheduling intervals until the average rate drops below, $\beta_2 R_{min}^{(i)}$.

The example backhaul and wireless schedulers can coordinate with each other to provide an end-to-end video delivery system. Studies of multiple access systems (wireless channel scheduling) are typically done assuming a full-buffer model—i.e., the assumption that once the wireless channel scheduler is about to schedule a user, there is enough content in the (e)NodeB buffer to transmit to the user without interruption at any data rate. Another more realistic model is a finite traffic model; one assumes such a system with a buffer for each user at the (e)NodeB where the data from the backhaul is stored pending transmission through the wireless channel by the example VAWS method. Upon a video request, using the video's LBP table, the UE requests a bit rate $R_{min}$ that satisfies its initial delay requirements. Subsequently, wireless channel and backhaul schedulers try to meet the rate requirement if the request is not blocked. The backhaul grants the request if there is enough backhaul bandwidth available to support the requested rate, and it delivers the video bits to the (e)NodeB buffer, pending transmission through the wireless channel. If no data are available in the (e)NodeB buffer, the wireless channel scheduler cannot serve the UE during the corresponding scheduling interval regardless of the channel conditions. An example joint backhaul and wireless channel scheduler cooperates in two error conditions: 1) if the backhaul scheduler blocks a video request due to the lack of backhaul resources, VAWS also blocks the video request; 2) if VAWS blocks a video request during the initial buffering, the associated backhaul resource is released as well; 3) if multiple video requests are pending admission and the system is overutilized, video requests associated with the UEs with better wireless channel are admitted first. The VAWS can obtain information about the UE's wireless channel state through the measurements that the UE performs and periodically feeds back to the (e)NodeB. After the admission of a user, one makes sure that the backhaul scheduler maintains $R_{min}$, as explained above, so that once VAWS is ready to schedule a UE, there is enough data in the (e)NodeB buffer to ensure uninterrupted scheduling of the wireless channel.

Simulation 1

The experimental results demonstrate the feasibility and effectiveness of using micro-caches at the edge of the RAN, coupled with example caching policies according to embodiments of the invention based on video preference of users in the cell and a new scheduling technique that allocates RAN backhaul bandwidth in coordination with requesting video clients. Simulation results show that the example RAN micro-caching-based video delivery approach provided herein can significantly increase the number of concurrent video requests that can be served while meeting initial delay requirements. Example methods are compared to MPV and LRU.

A statistical simulation framework was developed using MATLAB to compare the relative performance of the caching policies. A Monte Carlo simulation was used, where the implementation consists of a number of iterations where the innermost loop corresponds to one video request per iteration, which is being evaluated for all the cache policies. There is an outer loop over a set of different cache sizes, and finally the outermost loop repeats the entire simulation using a new set of inputs for increased statistical significance.

Table 1 lists the parameters used for simulation results. The video frame size distribution was as proposed in D. M. B. Masi, et al., "Video Frame Size Distribution Analysis," The Telecommunications Review 2008, Vol. 19, September 2008. Though the example results are based on a Zipf distribution with parameter 0.8, experiments with other Zipf parameter values confirm the trends and conclusions. Similarly, to ensure simulation speed, the total number of videos available for request is restricted to 20,000, and the total number of mobile users is restricted to 5000, though the trends are expected to hold for higher values. User arrival and departure follow a Poisson process, and use an M/M/∞ queuing model, as disclosed in R. Gallager and Bertsekar, "Data Networks," Prentice Hall, 1992, to find the total number of concurrent active users. To generate a video request, a user is selected randomly from the AUS, and a video request is generated based on the user's UPP and the popularity ranking of videos. A backhaul bandwidth of 100 Mbps is assumed, and the micro-cache size varies between 50 to 400 Gbits.

| Variable | Distribution/Parameters Value |
| --- | --- |
| Total Number of Video Requests | Const, 100000 |
| Total Number of Videos | Const, 20,000 |
| Video Popularity Distribution | Zipf, 0.8 |
| Video Frame Size Distribution | As disclosed in Masi et al. |
| Total Number of Video Categories | Const, 250 |
| Video Size | Exp, min = 2, mean = 8, max = 30(minutes) |
| Video Bit Rate | Uniform, 200 kbps (QVGA), 2 Mbps (HD) |
| Total number of mobile users | Const, 5,000 |
| UPP Distribution Across VCs | Exponential, 2 |
| User Arrival/Departure Model | Poisson: User inter-arrival time = 100 s, User active time = 2800 seconds |
| Video Request Arrival | Poisson, Mean inter-arrival time per user = 120 s |
| Backhaul Delay Thresholds | Const, [10, 20, 30] |
| Max Cache Size | Const, Up to 400 Gbits |
| Backhaul Bandwidth | Const, 100 Mbps |

Figure 7A:
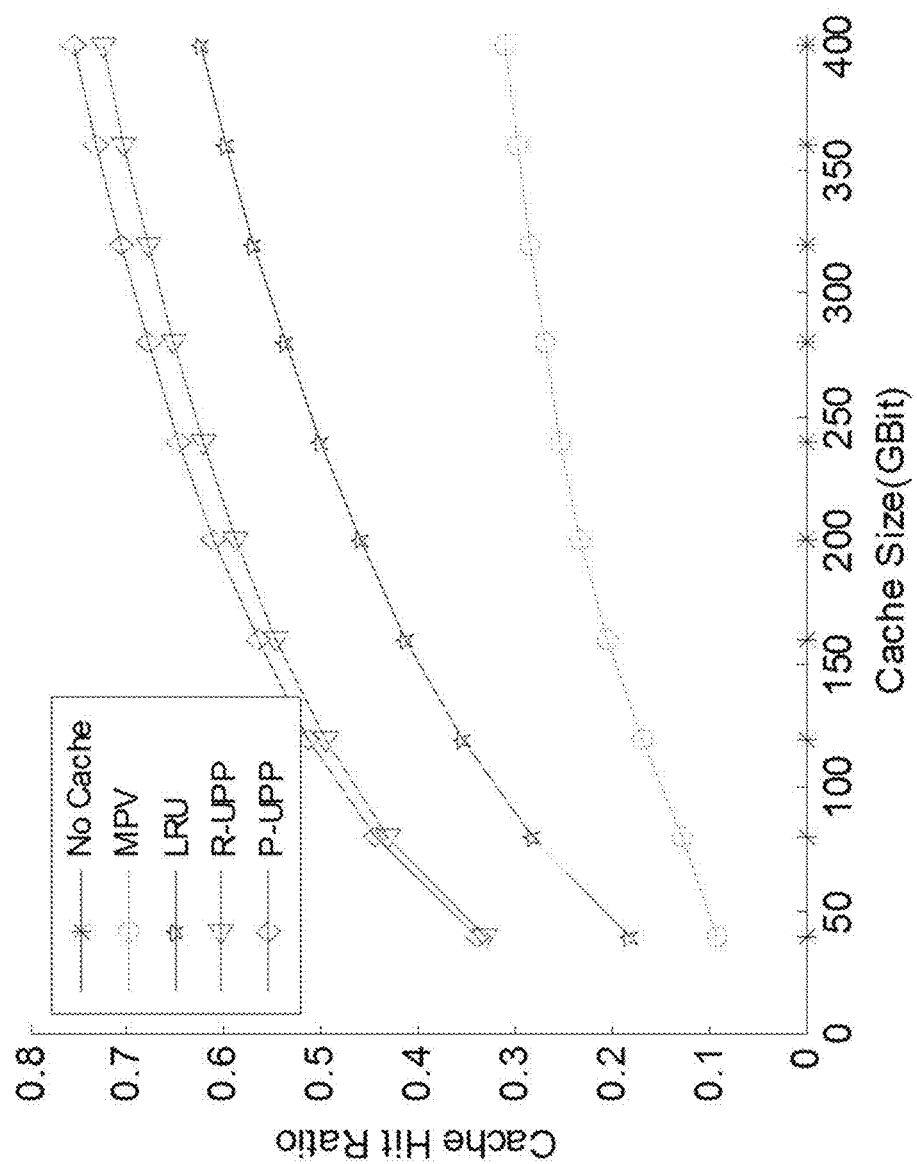

FIG. 7A shows the performance of the different cache policies in terms of cache hit ratio achieved for a given cell, for different cache sizes. The example UPP-based cache policies perform significantly better than the conventional cache policies for all cache sizes. For example, when the cache size is 250 Gbit, P-UPP and R-UPP achieve cache hit ratios of 0.67 and 0.65 respectively, compared to the LRU and MPV policies achieving cache hit ratios of 0.50 and 0.25 respectively.

A cache hit ratio of 0.75 is achieved by P-UPP when the cache size is 400 Gbit. FIG. 5A shows P-UPP and R-UPP achieving similar cache hit ratios, but with different parameters like lower P-UPP update threshold, an example P-UPP method can perform, e.g., up to 10 percentage point better than R-UPP in terms of cache hit.

Figure 7B:
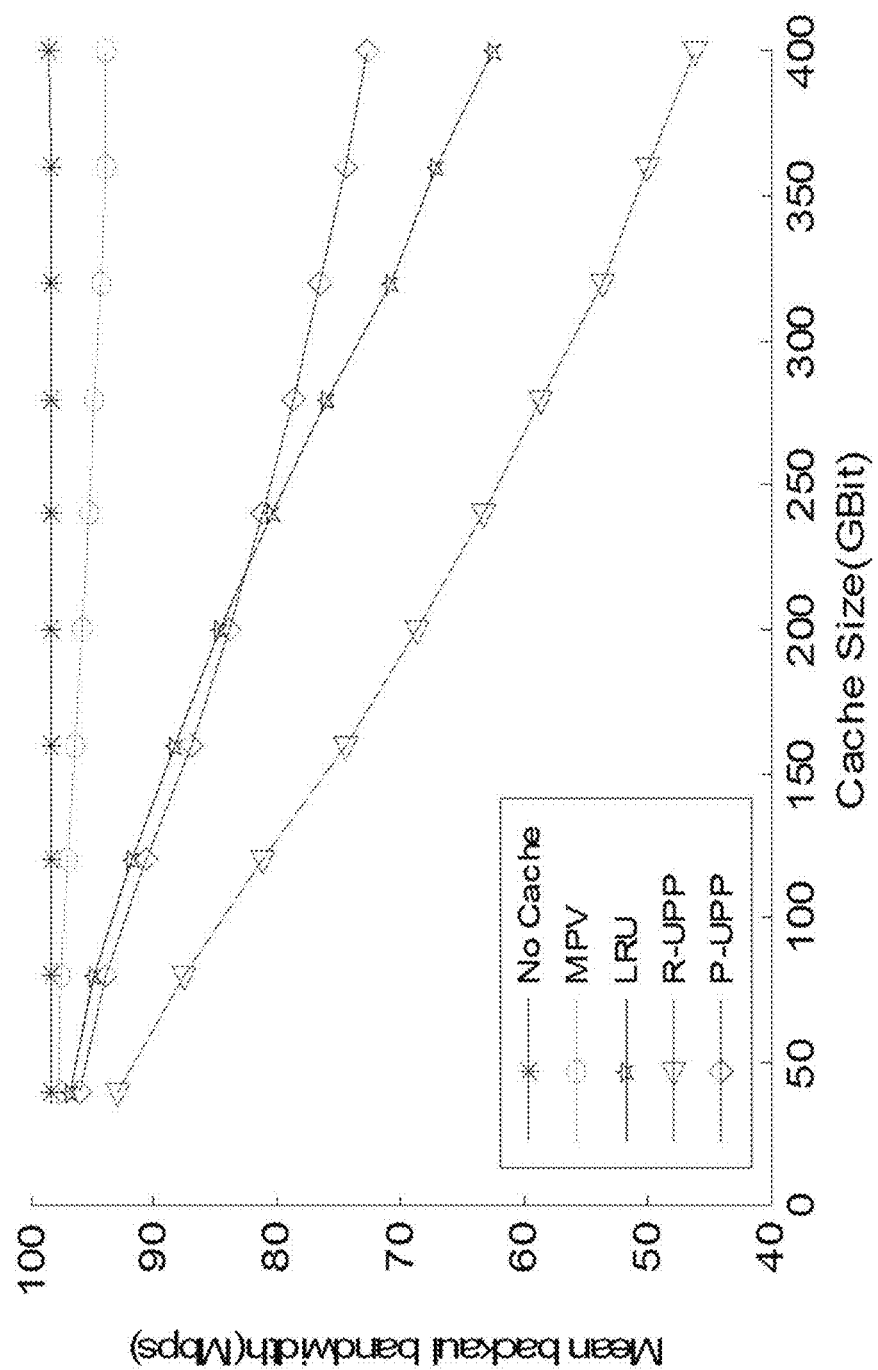

FIG. 7B shows the mean RAN backhaul bandwidth required by the different policies. For example, with cache size of 250 Gbits, 62 Mbps backhaul bandwidth for R-UPP, 81 Mbps for P-UPP, 79 Mbps for LRU, and around 94 Mbps for MPV cache policy are required. If there was no video caching at the edge of the RAN (no cache in FIG. 7B), the backhaul bandwidth needed to bring all the requested videos would be 98 Mbps.

Figure 7C:
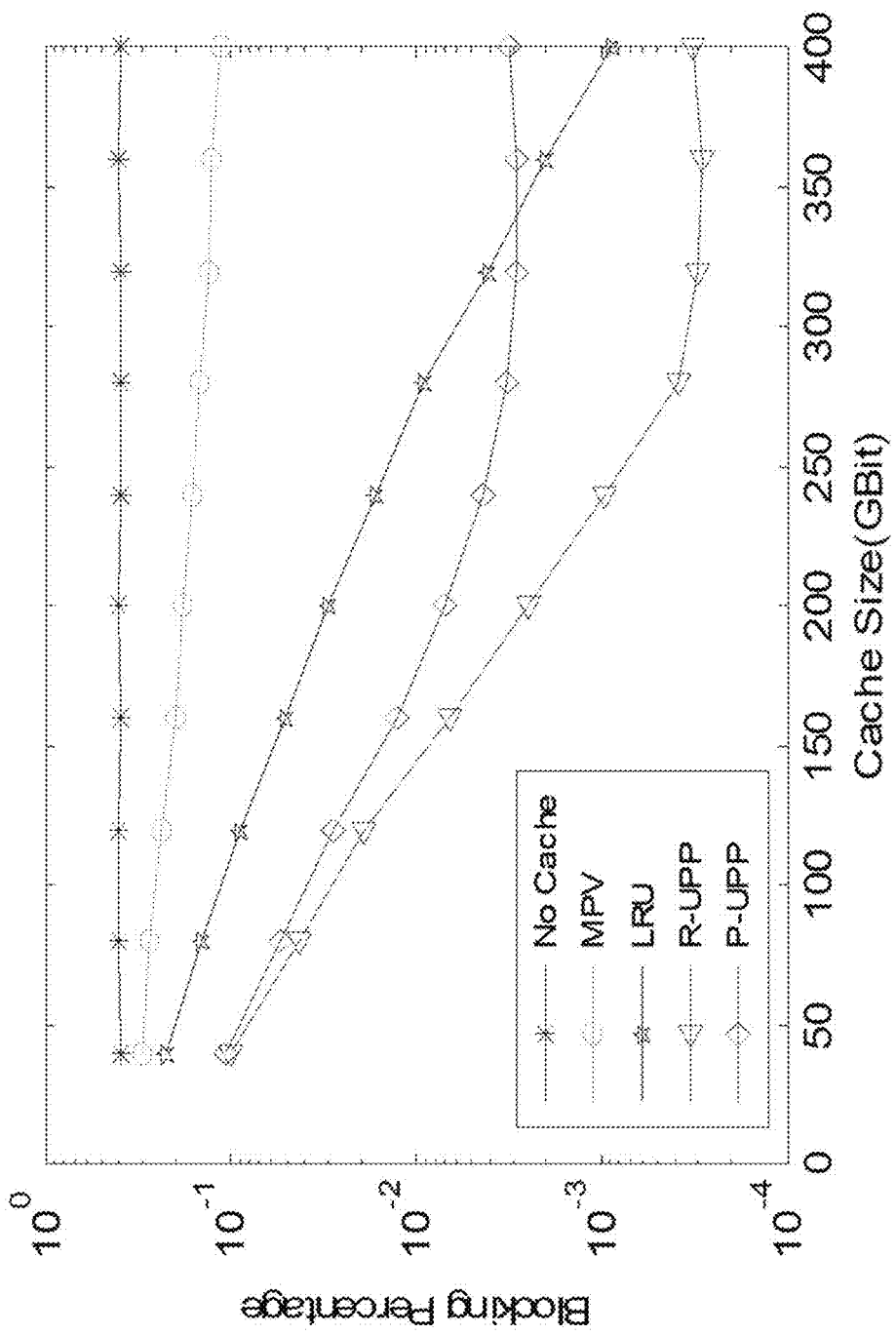

FIG. 7C shows the blocking probability (probability that requested videos could not be scheduled) when the cache size varies from 50 to 400 Gbits. An ideal system should achieve a low blocking probability while satisfying the desired initial video delay, here 30 seconds, for all users. For cache size of 250 Gbits, R-UPP and P-UPP achieve blocking probabilities of less than 0.0001 and 0.004 respectively, while the blocking probability for LRU is around 0.02 and 0.15 for MPV. These results illustrate the superiority of example UPP-based cache policies in terms of cache hit ratios, and reduced backhaul traffic overhead and thereby higher chances of being successfully served.

Figure 7D:
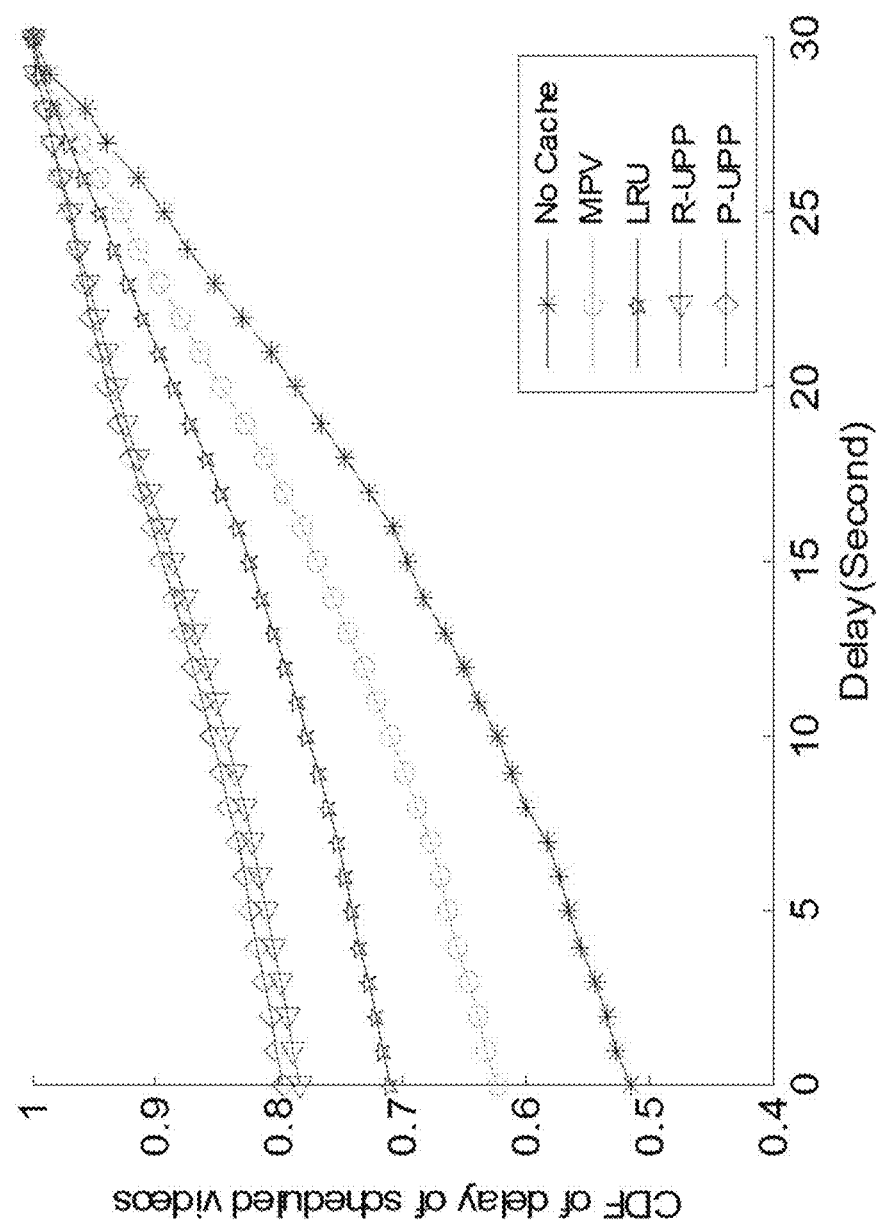

Performances are assessed in terms of the initial delay needed by the scheduled videos, a key contributor to QoE. Specifically, FIG. 7D shows the probability that the delay of a successfully scheduled video is below a certain value when the cache size is 200 GBits, and also when no RAN cache is used. For example, the probability of achieving an initial delay of 5 second or less is about 0.56 when no RAN cache is available, 0.66 for MPV, 0.74 for LRU, 0.80 for R-UPP, and 0.82 for P-UPP. FIG. 7D shows that using microcaching at the RAN significantly improves the probability of video requests that can meet initial delay requirements, in particular when the desired initial delay is low. The results also show the superiority of the example UPP-based policies, compared to MPV and LRU policies, in achieving better initial delay.

Figure 7E:
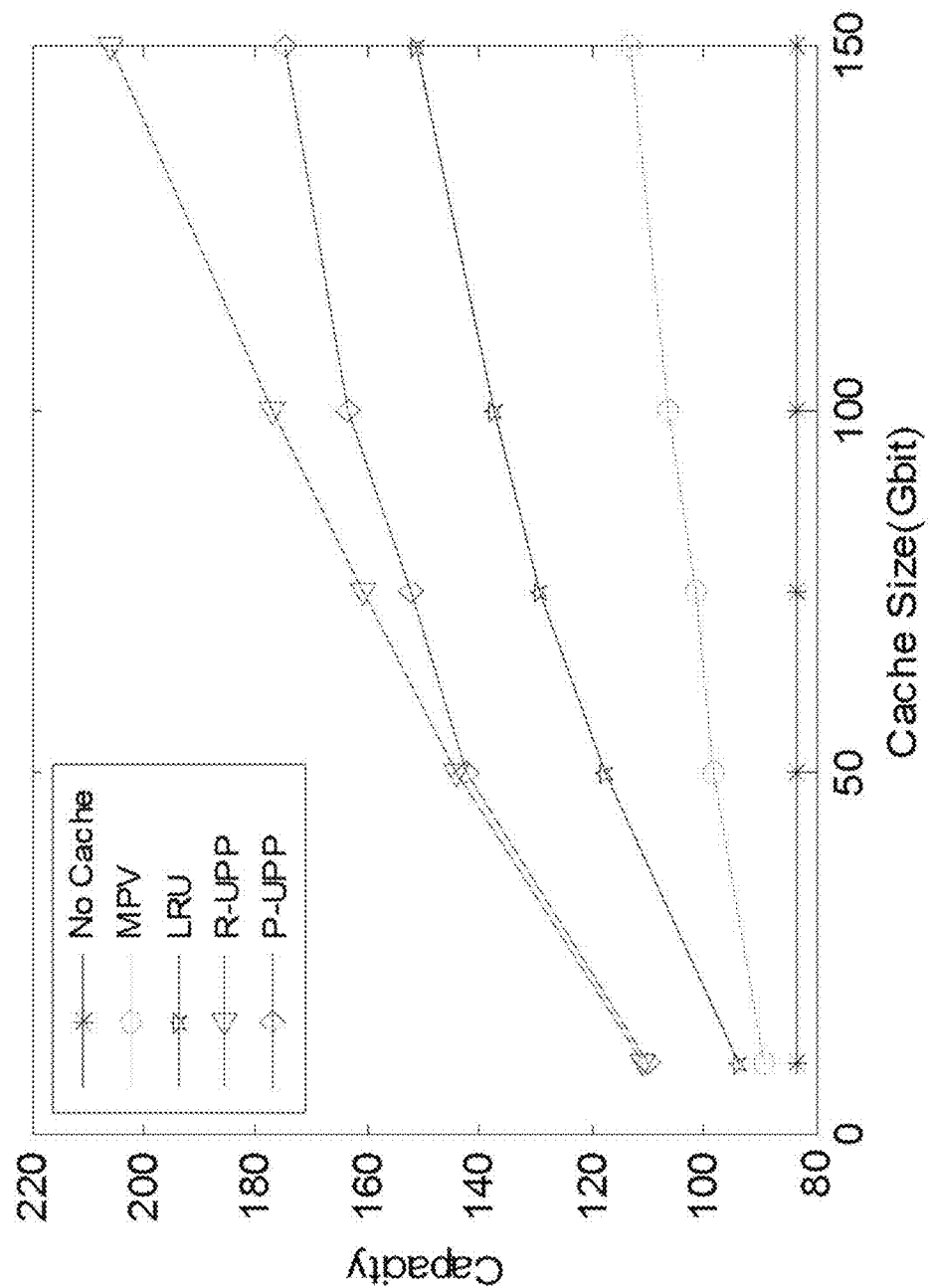

Next, to illustrate the impact of RAN caching and example policies on the capacity of the wireless network, experiments were performed to measure the capacity for different cache sizes and initial buffering delays. FIG. 7E shows capacity vs. cache size. Each point in the graph captures the case where the blocking probability is exactly 0.01, which is achieved by changing the user inter-arrival rate such that the steady state target blocking rate is achieved and noting the number of concurrent video requests generated at that specific user inter-arrival rate. For cache size of 150 Gbits, the capacity is 84 concurrent videos served in the cell without RAN caching, 113 with MPV, 151 with LRU, 175 with P-UPP, and 206 with R-UPP. FIG. 7E indicates that the example R-UPP performs about 18% better than the example P-UPP, about 36% better than LRU, about 82% better than MPV, and 145% better than when there is no RAN caching. The superiority of the example R-UPP in terms of capacity is due to the high cache hit ratio that it can achieve (comparable to the example P-UPP) while having no overhead (like proactively filling the cache as done by the example P-UPP and by MPV).

Figure 7F:
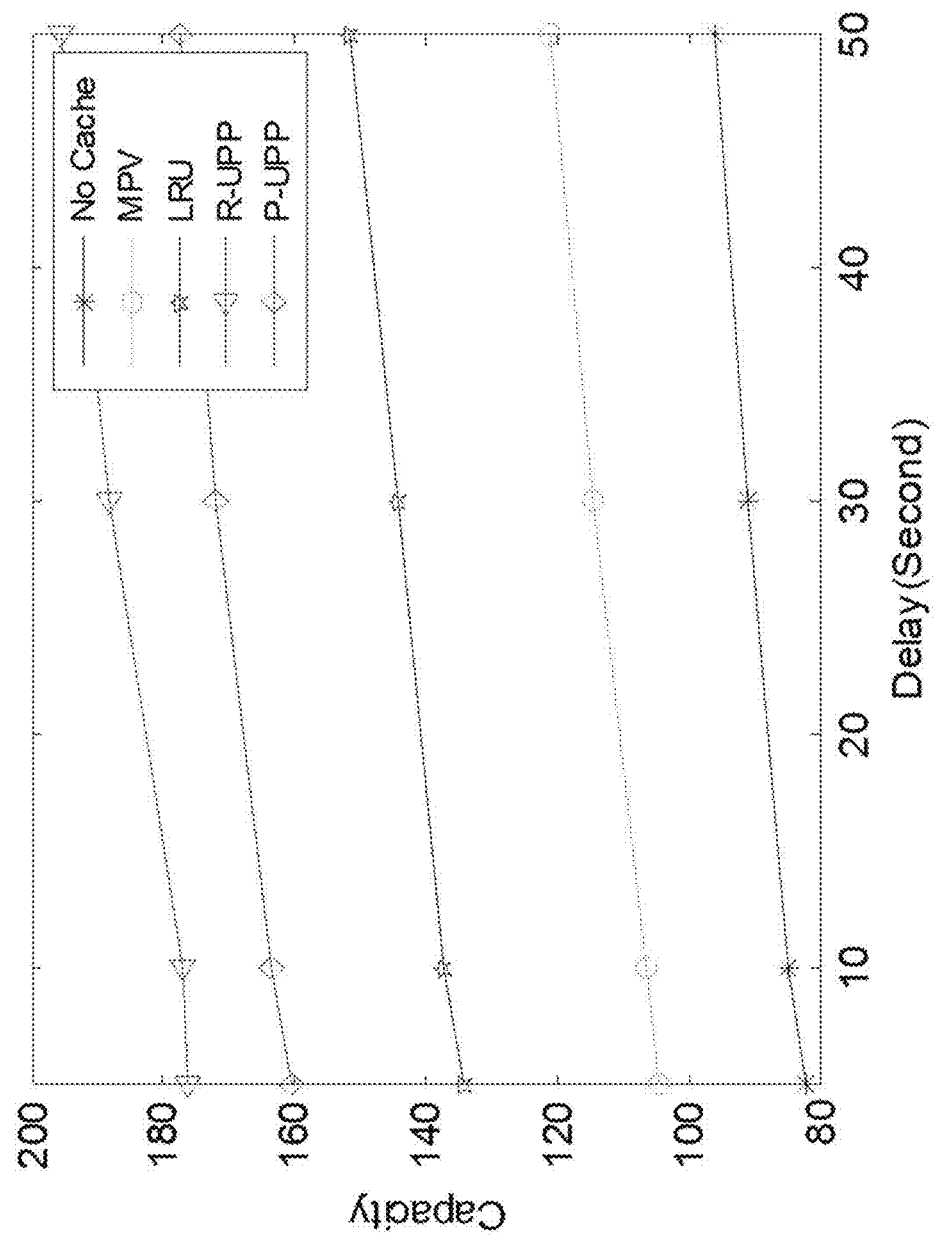

FIG. 7F shows the capacity when the target delay of the not-congested region is changed. As the target delay increases, the capacity increases for all caches. For delay of 30 seconds, the total number of concurrent videos served without cache is 91, with MPV 114, with LRU 144, with the example P-UPP around 172, and with the example R-UPP 188. FIG. 5F indicates that the example R-UPP performs about 10% better than the example P-UPP, about 30% better than LRU, and more than 100% better than when no caching is performed at the RAN edge.

Simulation 2

A statistical Monte Carlo discrete event simulation framework was developed using MATLAB to compare the relative performance of the caching policies, as well as to validate the effectiveness of example backhaul and wireless channel scheduling techniques. Monte Carlo discrete event simulation was used, where the implementation consists of a number of iterations, and where the innermost loop corresponds to one video request per iteration that is being evaluated for all the cache policies. There is an outer loop over a set of different simulation parameters (for instance, cache sizes or user interarrival time), and finally, the outermost loop repeats the entire simulation using a new set of inputs for increased statistical significance. All the cache policies are evaluated over multiple trials of the same configuration with randomized video popularity, video category, video size, user UPP, request generation, etc., generated from the specified distributions in Table 2 so that the observed statistics (capacity, hit ratio, etc.) and differences between these statistics for different caching policies are statistically significant with 95% confidence interval.

Although the lower and upper ranges associated with the 95% confidence interval in the figures are not shown when presenting results, using multiple trials, it was ensured that the achieved confidence interval for all the simulation results do not exceed ±1% of the estimated statistic. Confidence interval of 95% indicates that if the experiment is repeated, the results can be reproduced within +1% of the estimated statistic 95% of the time.

| Variable | Distribution/Parameters Value |
| --- | --- |
| Total Number of Video Requests | 100,000 |
| Total Number of Videos | 100,000 |
| Video Popularity Distribution | Zipf, $\alpha = 0.8$ |
| Video Frame Size Distribution | As proposed in [40] |
| Number of Video Categories | 250 |
| Video Size | Exp, min = 2, mean = 8, max = 30 (min) |
| Video Bit Rate | Uniform, 200 kbps (QVGA), 2 Mbps (HD) |
| Total number of mobile users | 5,000 |
| UPP Distribution Across VCs | Exponential, mean = 2 |
| Use Arrival/Departure Model | Poisson: User inter-arrival time = 40 s ($1/\lambda_u$), User active time = 2700 s ($N_{active}$) |
| Video Request Arrival | Poisson, Mean inter-arrival time per user = 480 s |
| Max Acceptable Initial Delay | 30 seconds |
| Cache Size | 10 Gbytes to 200 Gbytes |
| Backhaul Bandwidth | 100 Mbps |

Table 2 lists the parameters used for the base set of simulation results—base scenario. (40) in the table above refers to Masi et al. The base scenario reflects realistic system configuration and video requests by using distributions or simulation parameters that have been obtained by other research; e.g., through Internet measurements, network monitoring, or marketing research. To ensure simulation speed, the total number of videos, available for download, was restricted to 100,000, distributed uniformly across 250 video categories and following a Zipf popularity distribution with $\alpha=0.8$. The video duration is exponentially distributed, with the frame size distribution as reported in Masi et al., with mean of 8 min and truncated to a maximum of 30 min and a minimum of 2 min. It was assumed the video codec bit rate is uniformly distributed between 200 kb/s (QVGA quality) and 2 Mb/s (HD quality). The simulation assumes 5000 potential mobile users with Poisson arrival and departure with mean interarrival time of 40 s and user active time of 45 min (time the user is present in a cell whether actively downloading video or not). Video clients' maximum acceptable initial delay is set to 30 s. An M/M/oo queuing model is used to estimate the number of active users. The total number of concurrent active users follows Little's theory given by: $N_{active}=\lambda_u W$, where is mean user interarrival time and W is the user active time. Denoting the mean video request interarrival time per user to be $1/\lambda_v$, the expected mean video request interarrival time, $N_v$, is given by $N_v = \lambda_v N_{active}$. To generate a video request, a user is selected randomly from the AUS, and a video request is generated based on the user UPP and the popularity ranking of videos. For the results discussed below, a backhaul bandwidth of 100 Mb/s was assumed, and the micro-cache size varies between 10-200 GB.

Next, the effectiveness of the UPP-based policies in improving cache hit ratio, user QoE (initial delay and playback with limited stalling), and capacity are studied. The UPP-based policies were compared with LRU, LFU, and MPV using the base simulation parameters as well as variations of some of the more significant simulation parameters like Zipf, user dynamics (i.e., mean user interarrival time and user active time), and user UPP distribution (how biased the user requests are toward specific video categories). As both MPV and P-UPP are proactive caching policies, in the simulations, they were preloaded respectively with the most popular videos and the most likely videos to be requested based on initial AUS.

Figure 8A:
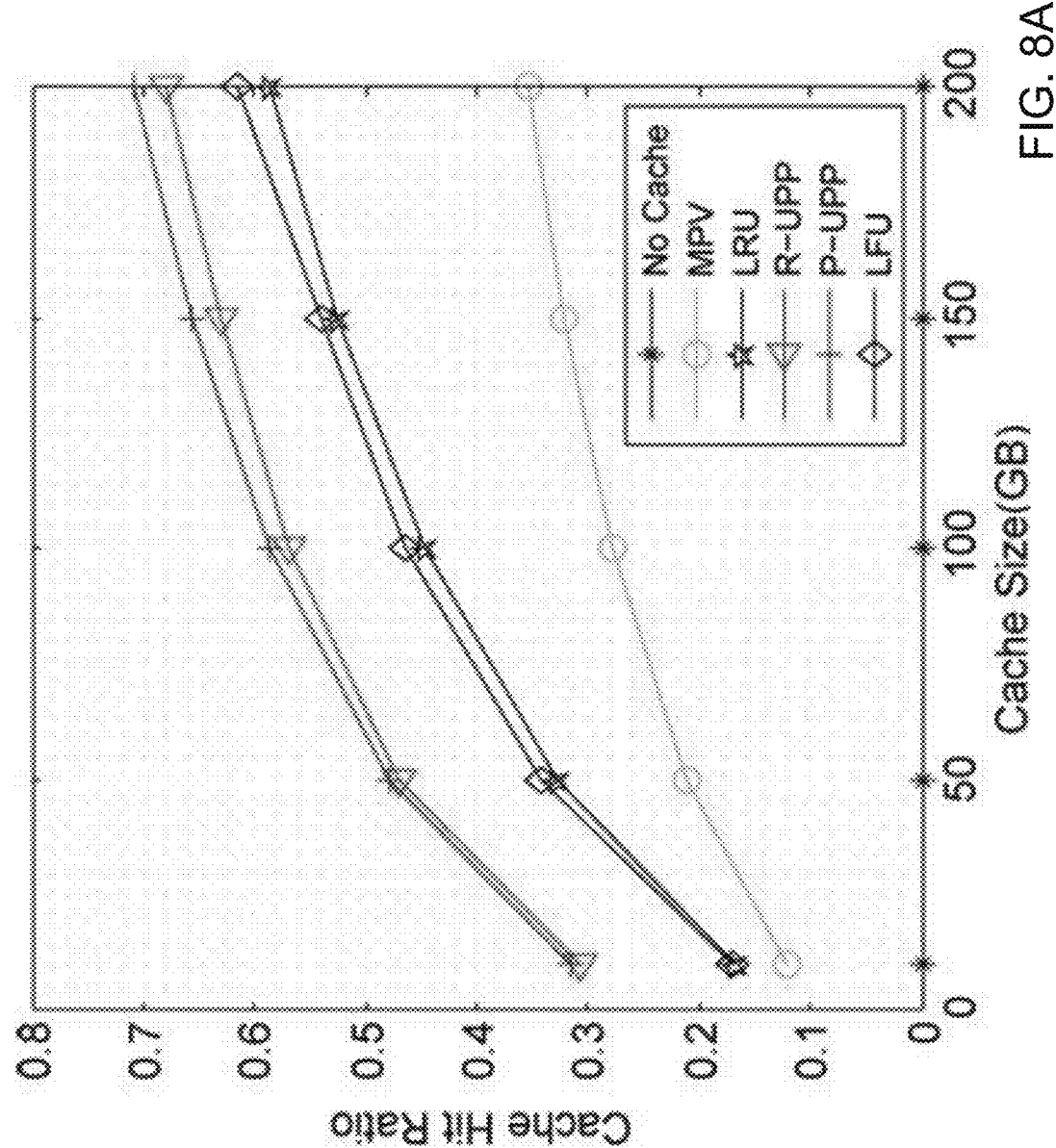
FIGS. 8A-8H show performance of example caching policies under base scenario and significant simulation parameters, where

FIG. 8A shows the performance of the different cache policies in terms of cache hit ratio achieved for a given cell for different cache sizes with the base scenario configuration. The example UPP-based cache policies perform significantly better than the conventional cache policies for all cache sizes. For example, when the cache size is 200 GB, P-UPP and R-UPP achieve cache hit ratios of 0.71 and 0.68, respectively, while the LFU, LRU, and MPV policies achieve cache hit ratios of 0.61, 0.58, and 0.35, respectively. Note that though FIG. 8A shows P-UPP and R-UPP achieving similar cache hit ratios, P-UPP can perform up to 6 percentage points better than R-UPP in terms of cache hit; this, however, comes with the cost of high required backhaul bandwidth.

Figure 8B:
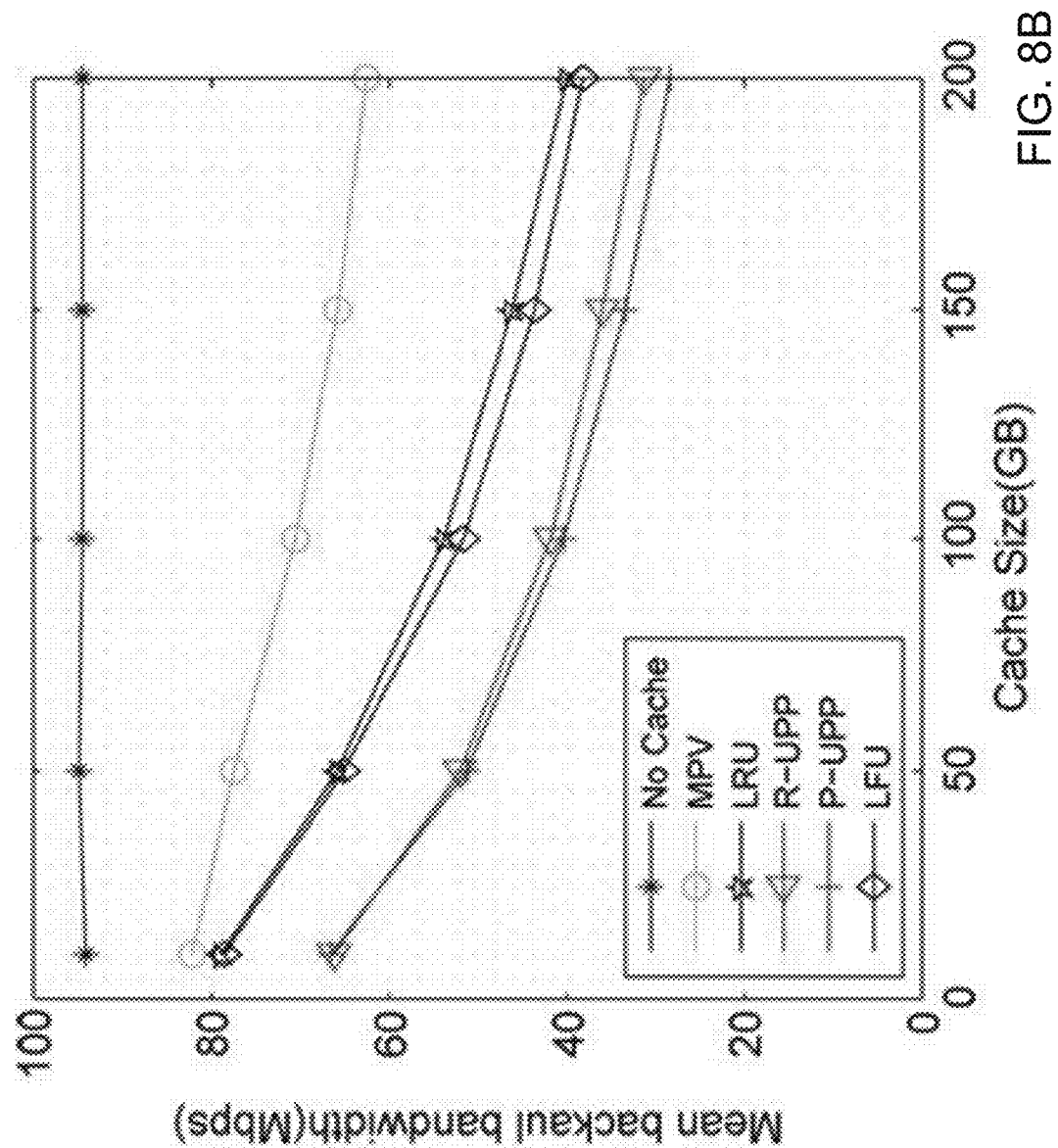

FIG. 8B shows the mean RAN backhaul bandwidth required by different policies in the base simulation. For example, with cache size of 200 GB, one requires 28 Mb/s backhaul bandwidth for P-UPP, 31 Mb/s for R-UPP, 38 Mb/s for LFU, 40 Mb/s for LRU, and around 62 Mb/s for MPV cache policy. If there were no video caching at the edge of the RAN [no cache in FIG. 8B], the backhaul bandwidth needed to bring all the requested videos would be 94 Mb/s. From the results, it can be inferred that example UPP-based caches significantly reduce the backhaul loading.

Figure 8C:
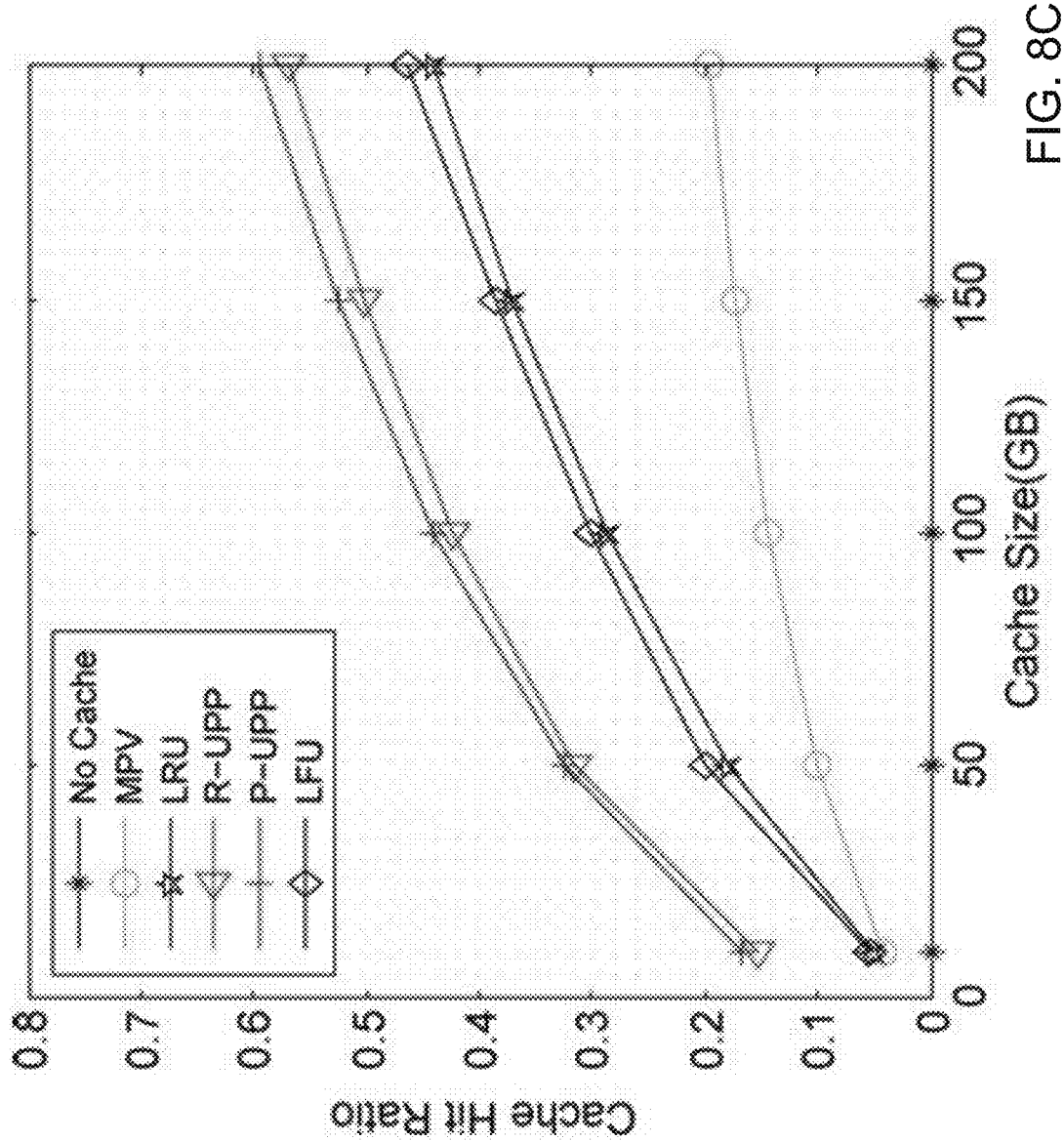

FIG. 8C shows the performance of different cache policies in terms of cache hit ratio achieved when is 0.6. In this scenario, the tail of the Zipf distribution is fatter than in the base scenario, and the most popular videos are less popular than the base scenario when $\alpha$ is 0.8. With this parameter change, given the same cache size as the base scenario, the expected cache hit ratio is going to be lower. For instance, from FIG. 8C, the cache hit ratio of MPV degrades by 15 percentage points from 0.35 to 0.20 for cache size of 200 GB when $\alpha$ changes from 0.8 to 0.6. However, the cache hit ratio of P-UPP and R-UPP decreases by 12 and 11 percentage points, respectively, and LRU and LFU by 15 percentage points compared to the base scenario. It can be inferred from the results that the cache hit ratio of MPV is most dependent on the MPV distribution and MPV caching policy is more effective for higher values of a.

Figure 8D:
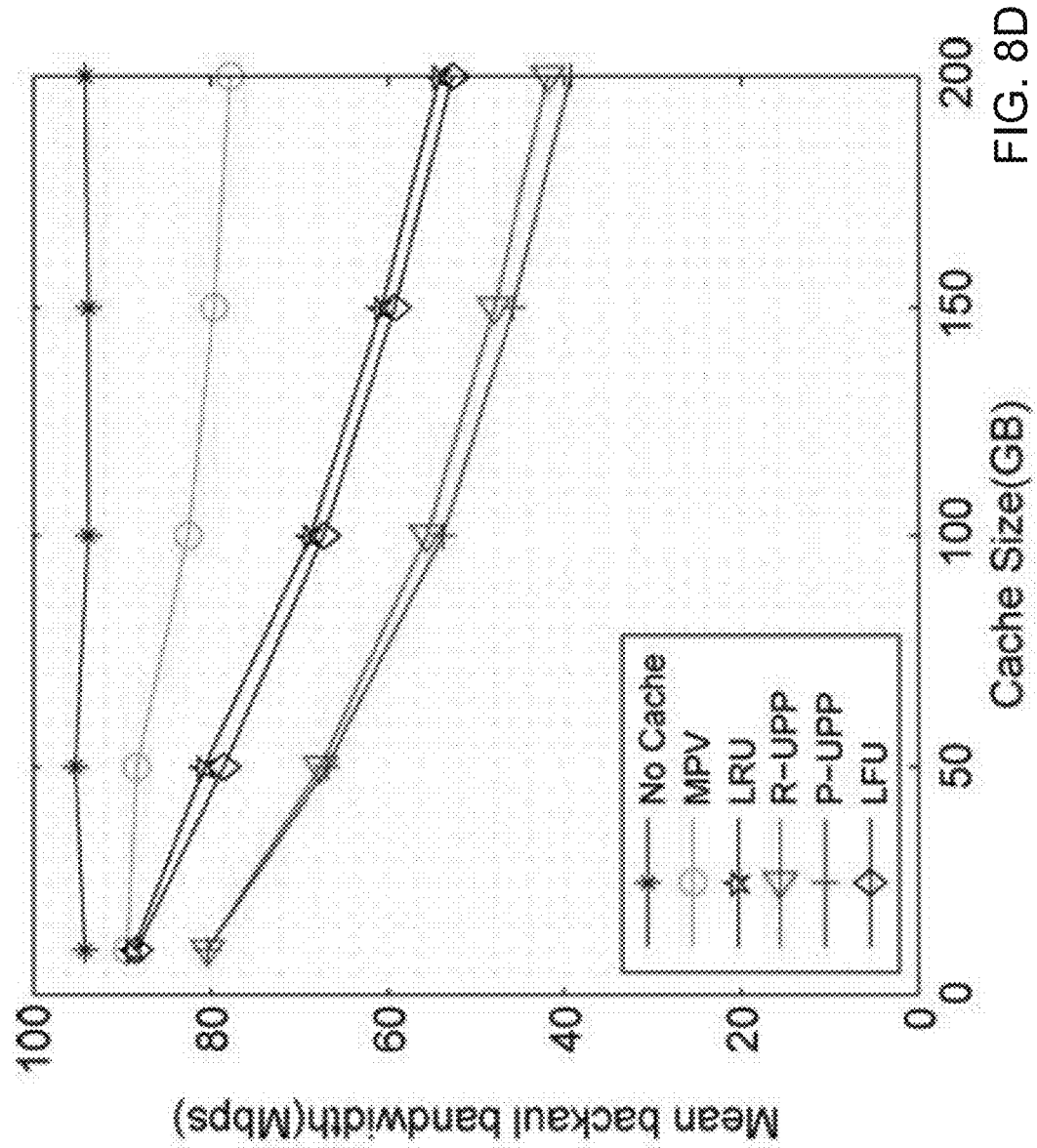

FIG. 8D shows the mean backhaul bandwidth required versus cache size when $\alpha$=0.6. For a cache size of 200 GB, 40 and 41 Mb/s backhaul bandwidth are required for P-UPP and R-UPP, respectively, 52 Mb/s for LFU, 54 Mb/s for LRU, and 78 Mb/s for MPV. Due to the lower cache hit ratio across all the policies with $\alpha$=0.6 compared to the base scenario, it can be inferred that the required backhaul bandwidth for all the policies increases, but MPV is affected the most.

Figure 8E:
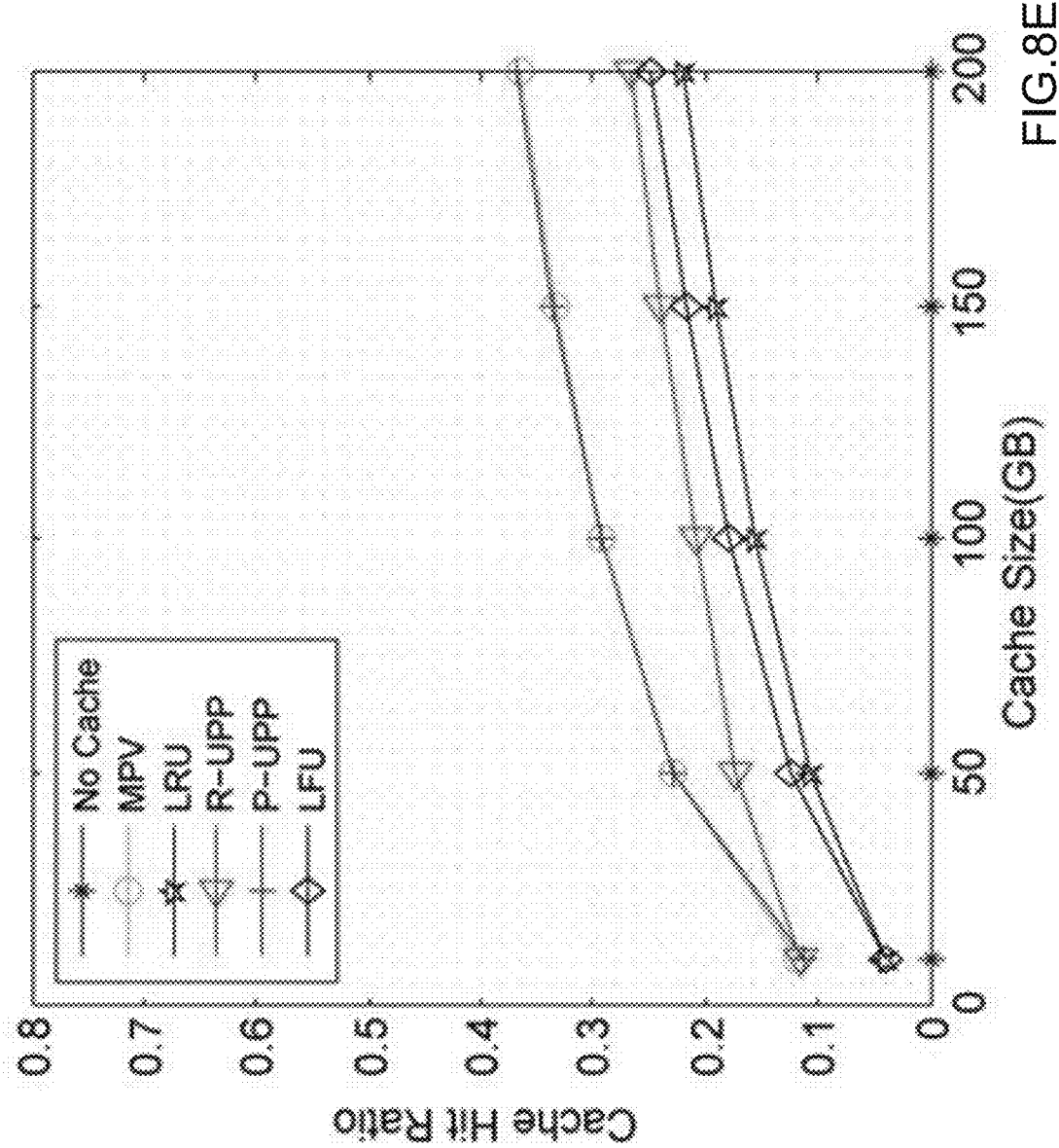

It is useful to also assess what happens when the cell site UPP is not biased, for instance, when the cell site UPP is uniformly distributed across the VCs, where it becomes more difficult to anticipate what videos the user may request. FIG. 8E shows the impact of the UPP distribution on the performance of the caching policies. Uniform cell site UPP implies that although each user still has personal preferences for certain video categories, as a whole, the cell site UPP will be unbiased and users may request a video from any of the 250 video categories with equal probability. The cell site UPP distribution does therefore not contain any information that can help determine which video is more likely to be requested.

From FIG. 8E, it is evident that the P-UPP and MPV caching policies perform better than the remaining cache policies when the UPP is uniform. The cache hit ratios of P-UPP and MPV policies are the same at around 0.37, while the cache hit ratios of R-UPP, LFU and LRU are 0.27, 0.25, and 0.21, respectively. It can be inferred that although the cache hit ratio of P-UPP has dropped by 34 percentage points from the baseline, the users' UPP does not have any effect on MPV cache hit ratio. This is because MPV ignores cell site UPP.

Figure 8F:
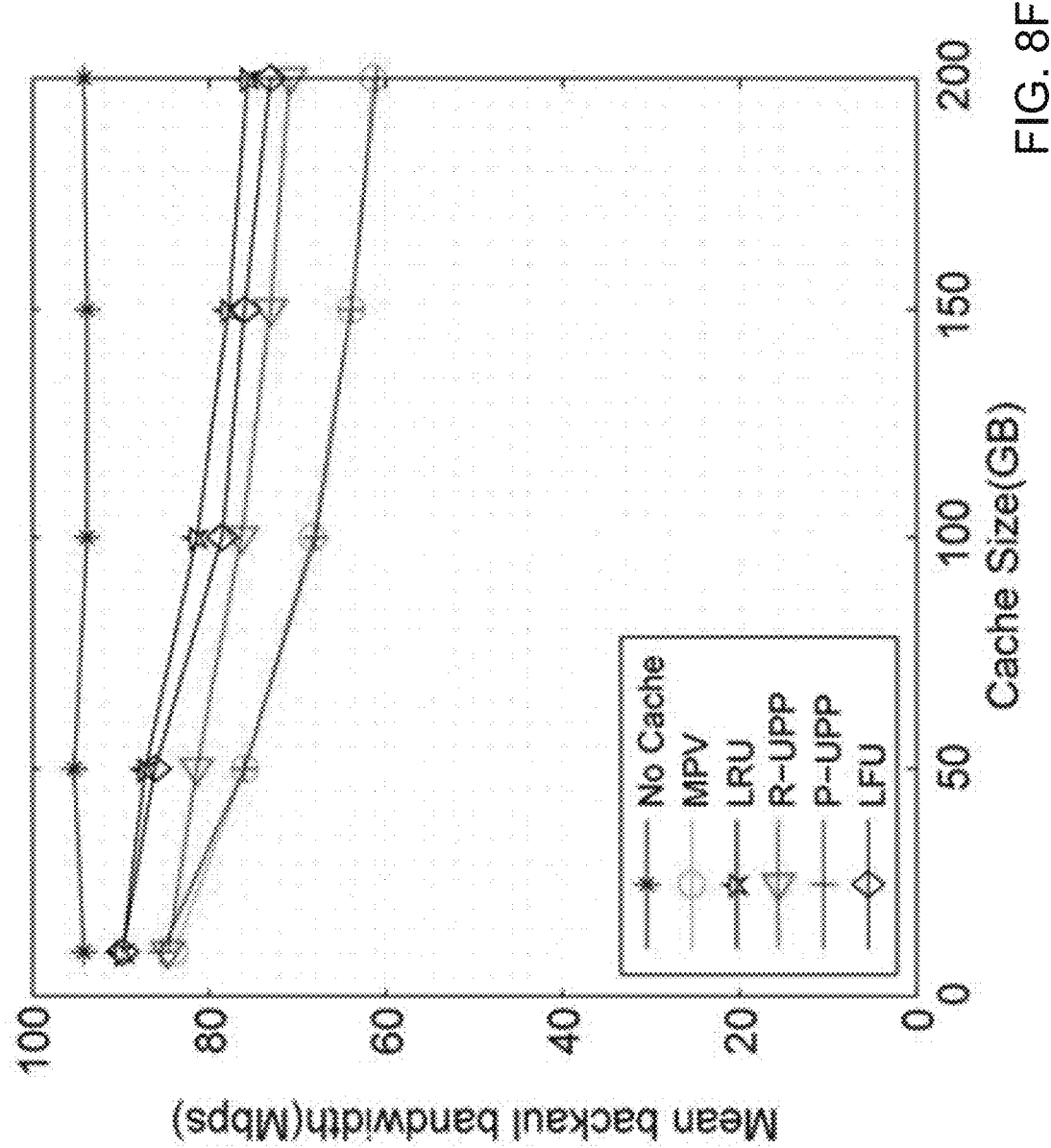

FIG. 8F shows the mean backhaul bandwidth required by the different policies. As expected, when the cache hit ratio decreases, the mean backhaul bandwidth required increases. For example, with cache size of 200 GB, 61 Mb/s backhaul bandwidth is required for P-UPP and MPV, 71 Mb/s for R-UPP, 73 Mb/s for LFU, 75 Mb/s for LRU, and around 94 Mb/s for no cache. Note that if there were no video caching at the edge of the RAN (no cache in FIG. 8F), the backhaul bandwidth needed to bring all the requested videos would be 94 Mb/s; thus, by caching even with uniform UPP, an example method can reduce backhaul bandwidth by about 35%. From the results, it can be seen that with uniform user UPP, the example P-UPP caching policy is superior to the no-cache and LRU caching policies, and that uniform user UPP results in degradation of LFU, LRU, and R-UPP. In the case of uniform cell site UPP, P-UPP and MPV effectively become identical because no local video category preference exists, so it is expected that they perform identically.

User dynamics in a cell (how frequently potential video users enter a cell site, and for how long they stay active within that cell) may result in frequent or seldom changes to the cell site UPP; depending on the cache policy, frequently changing cell site UPP may require more cache updates than an infrequently changing cell site UPP. Hence, it is useful to assess the impact of high user dynamics on the performance of the cache policies.

Figure 8G:
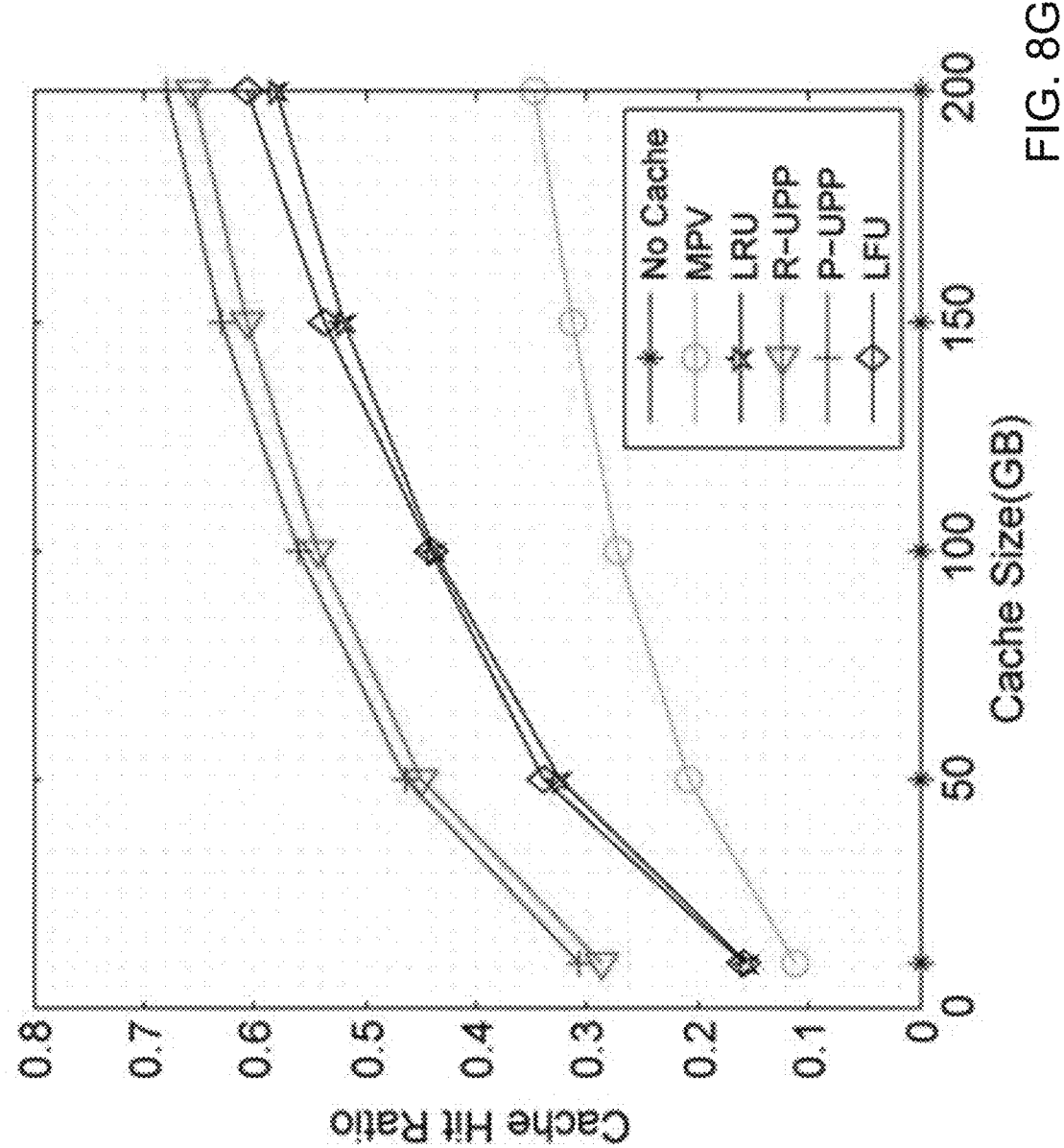
Figure 8H:
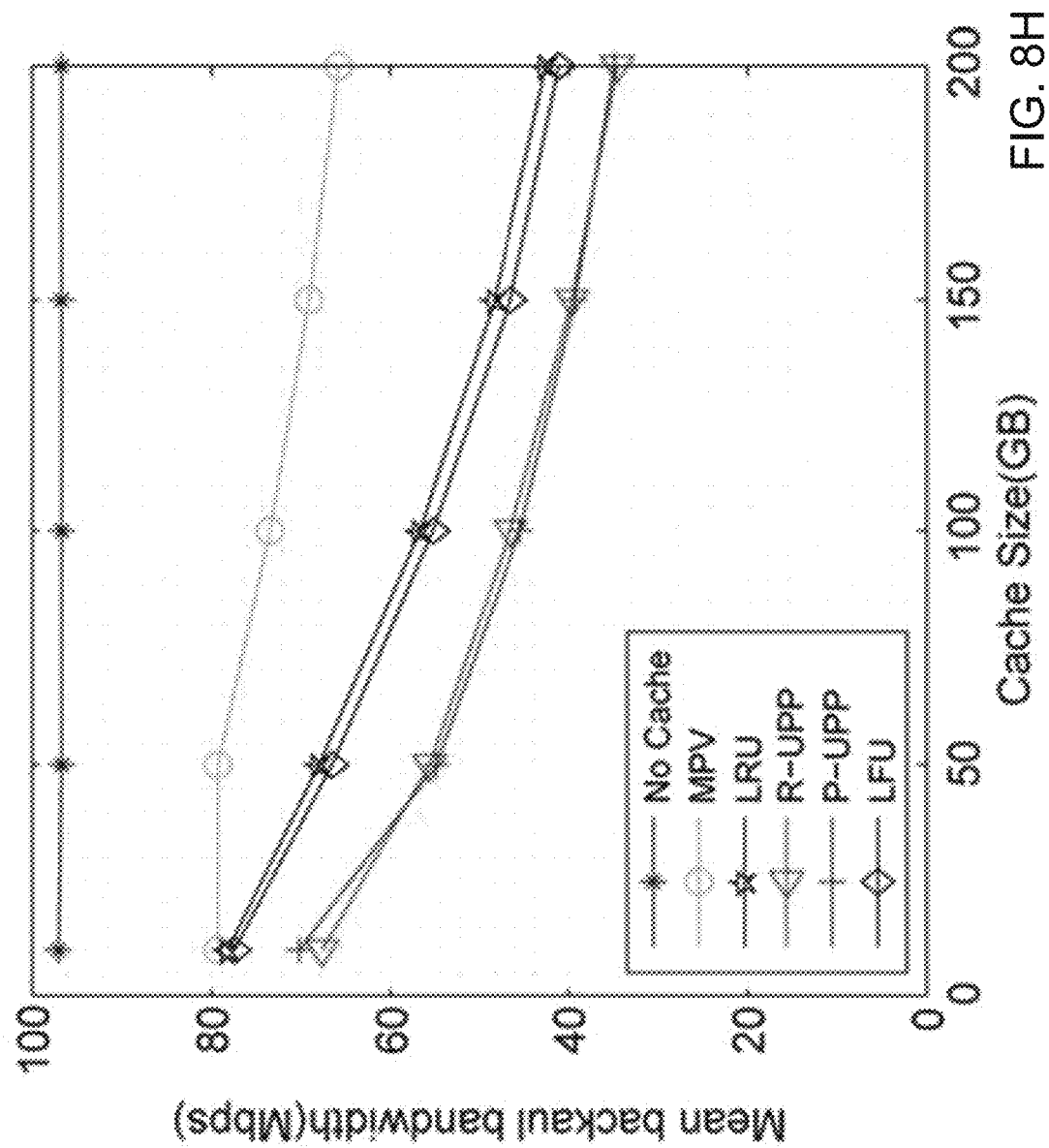

FIGS. 8G and 8H shows the performance of the caching policies under high user dynamics. To stimulate high user dynamics, the user interarrival time was reduced from 40 to 10 s and mean user active time was reduced from 2700 to 360 s. In addition to smaller user interarrival time, this example setup results in the total number of users in the system decreasing from 67 to 36 users, and as a result, the user arrivals and departures result in larger deviations from the mean cell site UPP. The caching policies' effectiveness was captured under high user dynamics scenario, while ensuring that the total number of video requests to the cache ($N_v = \lambda_v \lambda_u W$) is comparable to the base scenario; thus, the video request generation interval per user was decreased from 480 to 250 s.

FIG. 8G shows that the user dynamics do not significantly affect the cache hit ratio compared to the base scenario. For example, when the cache size is 200 GB, the example P-UPP and R-UPP achieve cache hit ratios of 0.68 and 0.65, respectively, and LFU, LRU, and MPV policies achieve cache hit ratios of 0.61, 0.58, and 0.35, respectively. Compared to the cache hit ratio of the base scenario, it is inferred that the high user dynamics degrade the cache hit ratio of the P-UPP and R-UPP by 3 percentage points. The cache hit ratio of all the other policies remains the same.

Next, the impact of high user dynamics on the mean backhaul bandwidth required by different cache policies was analyzed. From FIG. 8H, with cache size of 200 GB, mean backhaul bandwidth of 35 Mb/s was required for P-UPP and R-UPP, 41 Mb/s for LFU, 42 Mb/s for LRU, and around 65 Mb/s for MPV caching policy. Note that if there were no video caching at the edge of the RAN, the backhaul bandwidth needed to bring all the requested videos would have been around 96 Mb/s. It can be inferred that the mean backhaul bandwidth required increases by 25% for P-UPP, 13% for R-UPP, 8% for LFU, 5% for LRU, and 4% for MPV compared to the base scenario. This increase in backhaul bandwidth requirements for P-UPP is due to additional required updates to proactively update the cache as the average cell site UPP changes frequently.

Figure 9A:
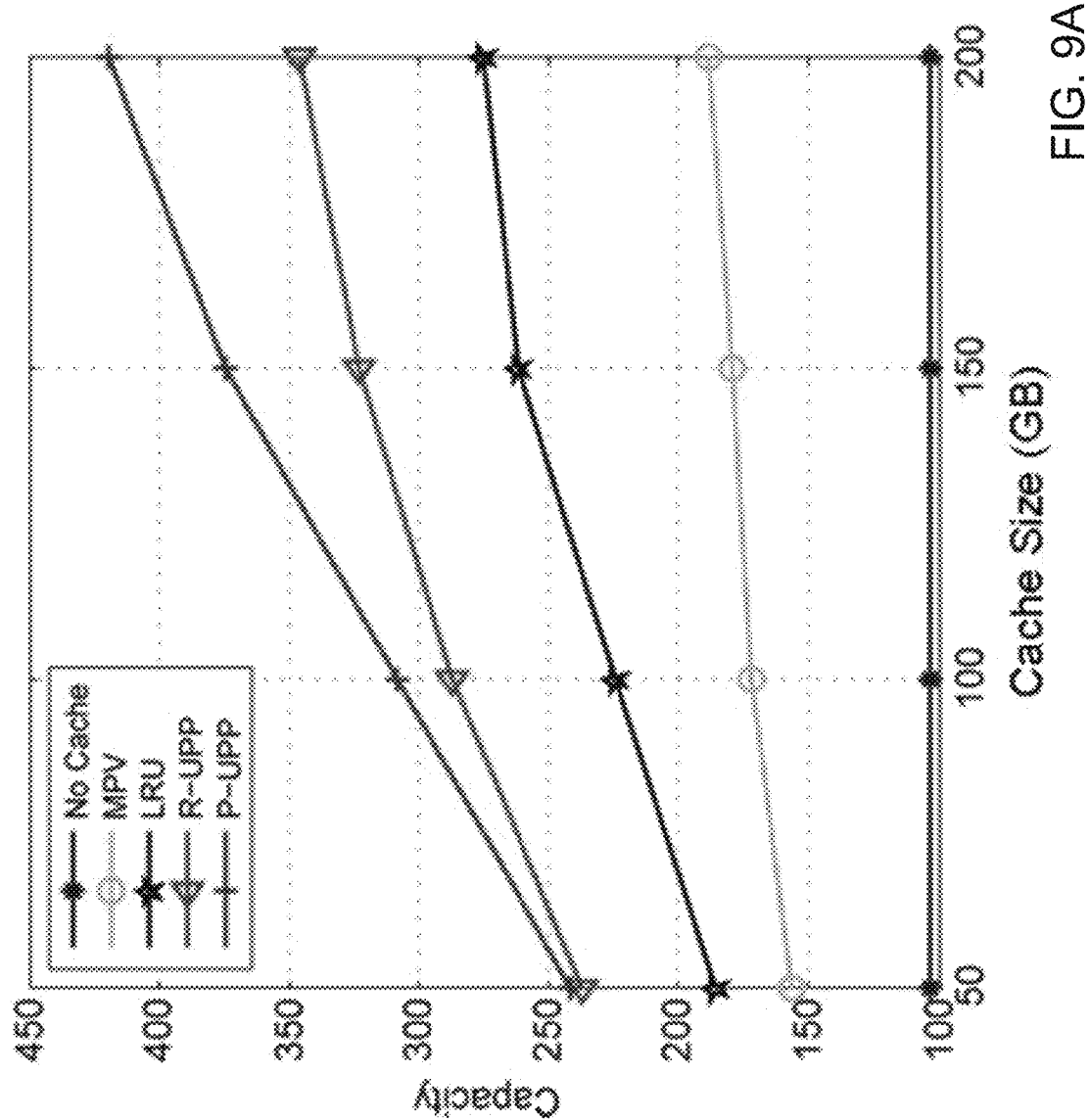
FIGS. 9A-9B show performance of example caching policies, including capacity vs. cache size (FIG. 9A) and CDF of delay of all videos at UE (FIG. 9B)

To better understand the impact of RAN caching and example caching policies on the capacity of the wireless network, a set of experiments was performed to measure the capacity for different cache sizes when ensuring the user's QoE, here initial delay. FIG. 9A shows capacity versus cache size with base scenario configuration except for the user interarrival time. Note that each point in this graph captures the case where the blocking probability is exactly 0.01, which is achieved by changing the user interarrival time such that the steady-state target blocking rate is achieved and noting the number of concurrent video requests generated at that specific user interarrival time. For instance, for cache size of 200 GB, the capacity is 103 concurrent videos served in the cell without RAN caching, 189 with MPV, 275 with LRU, 346 with R-UPP, and 419 with P-UPP. It can be inferred from FIG. 9A that P-UPP performs about 21% better than R-UPP, about 52% better than LRU, about 122% better than MPV, and 300% better than when there is no RAN caching. The superiority of P-UPP in terms of capacity is due to the high cache hit ratio that it can achieve.

Figure 9B:
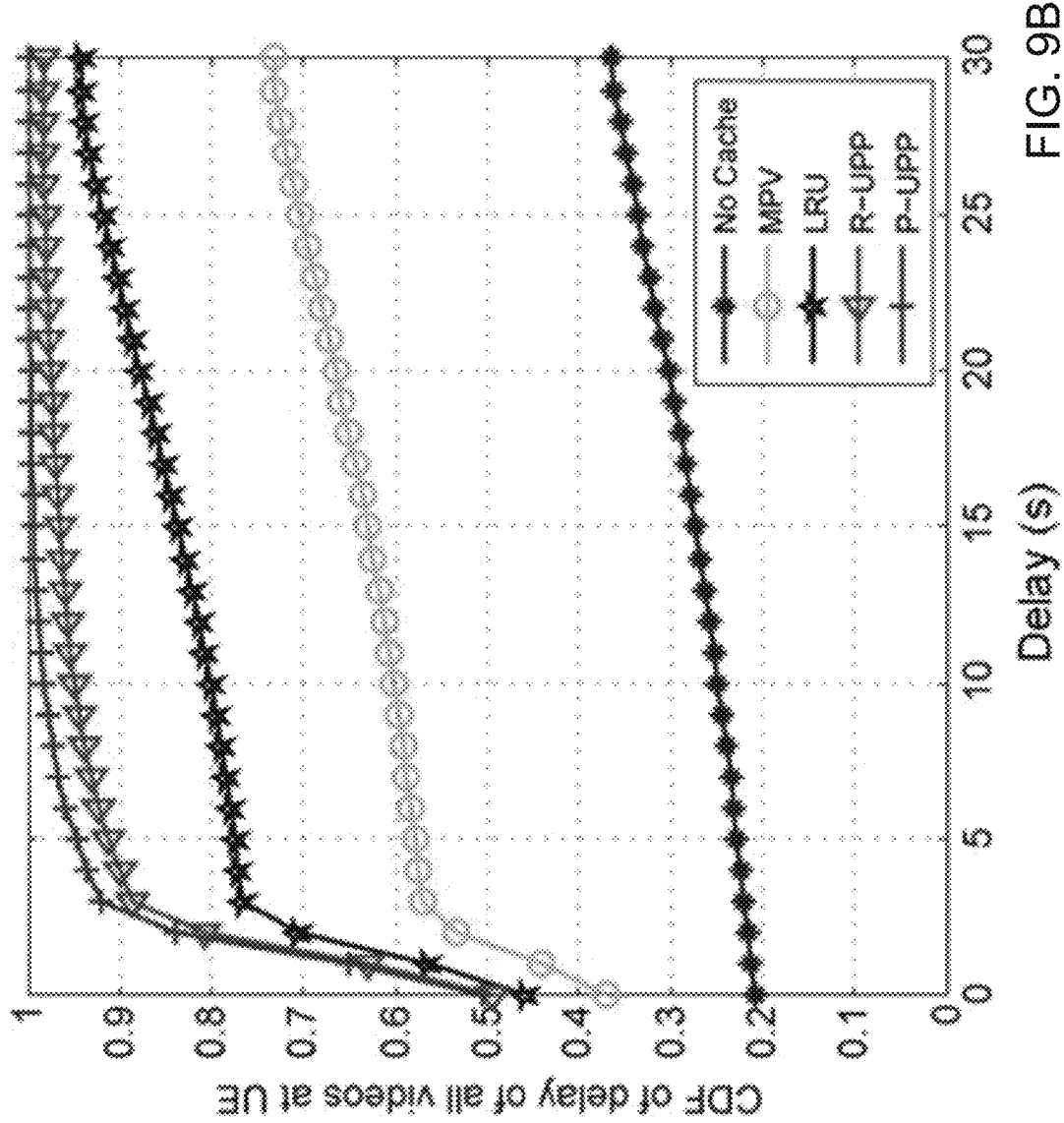

FIG. 9B shows the cumulative distribution function (CDF) of video delivery delay when the cache size is 200 GB and user interarrival time is 12 s, which corresponds to a heavily loaded system. Given that the user load is identical, but caching performance differs, the associated blocking probability is different for each caching policy. An infinite delay is registered for all the blocked video requests, which results in the CDF not reaching 1.00 within the displayed delay region. If the delay is measured for each cache policy when the blocking probability is 0.01—i.e., at different number of concurrent video requests—the delay for all the policies is similar, but the number of users achieving that delay is significantly higher for the cache policies with high capacity. This shows that improved caching performance will result in either higher peak capacity or a reduction of delay when operating below capacity limits. From FIG. 9B, it can be inferred that the probability of achieving an initial delay of, for instance, 5 s or less is about 0.23 when no RAN cache is available, 0.58 for MPV, 0.77 for LRU, 0.91 for R-UPP, and 0.95 for P-UPP. These results show that using micro-caches at the RAN greatly improves the probability that video requests can meet initial delay requirements, in particular when the desired initial delay is low. The results also reveal the superiority of the example UPP-based policies, compared to conventional caching policies, in achieving better initial delay given higher capacity. From FIGS. 9A and B, it can be inferred that given the comparable achieved delay, one can support significantly more concurrent video requests using the example UPP-based policies, and when similar number of videos sessions are concurrently active, one achieves a lower delay.

It was also determined that the system load does not affect the cache hit ratio—meaning an increase in the number of requests to the cache does not result in higher cache hit ratio. However, the mean required backhaul bandwidth increases toward the backhaul bandwidth capacity, and video requests experience increased delay due to the high network utilization. In addition, some video requests are blocked as the initial buffering delay requirement cannot be met.

For illustration, unlimited wireless channel bandwidth has been assumed when analyzing RAN cache performance. In additional results, one considers realistically constrained wireless channel conditions and assesses the effectiveness of an example VAWS method (e.g., plugin) by comparing with the results of scheduling the wireless channel without consideration for video QoE. The path-loss model for the wireless channel used follows 3GPP TR 36.814 V0.4.1 UMa and UMi models. Herein, results using the UMa model are mainly described for illustration, and a summary of results obtained using the UMi model is provided. The small-scale fading model is simplified to the case of single-path static channel. The wireless channel specific parameters that are used for the simulations are listed in Table 3.

| Parameter | Distribution/Parameters Value |
|---|---|
| Total (e)NodeB Power | 43 dBm (in each of 3 sectors) |
| Channel BW | 20 MHz in each of 3 sectors |
| Thermal Noise at UE | $-174 + 10\log_{10}(20$ MHz$)$ |
| Noise figure | 7 dB |
| Interference Margin | 5.5 dB |
| Cell Radius | 1.2 km |

Figure 10A:
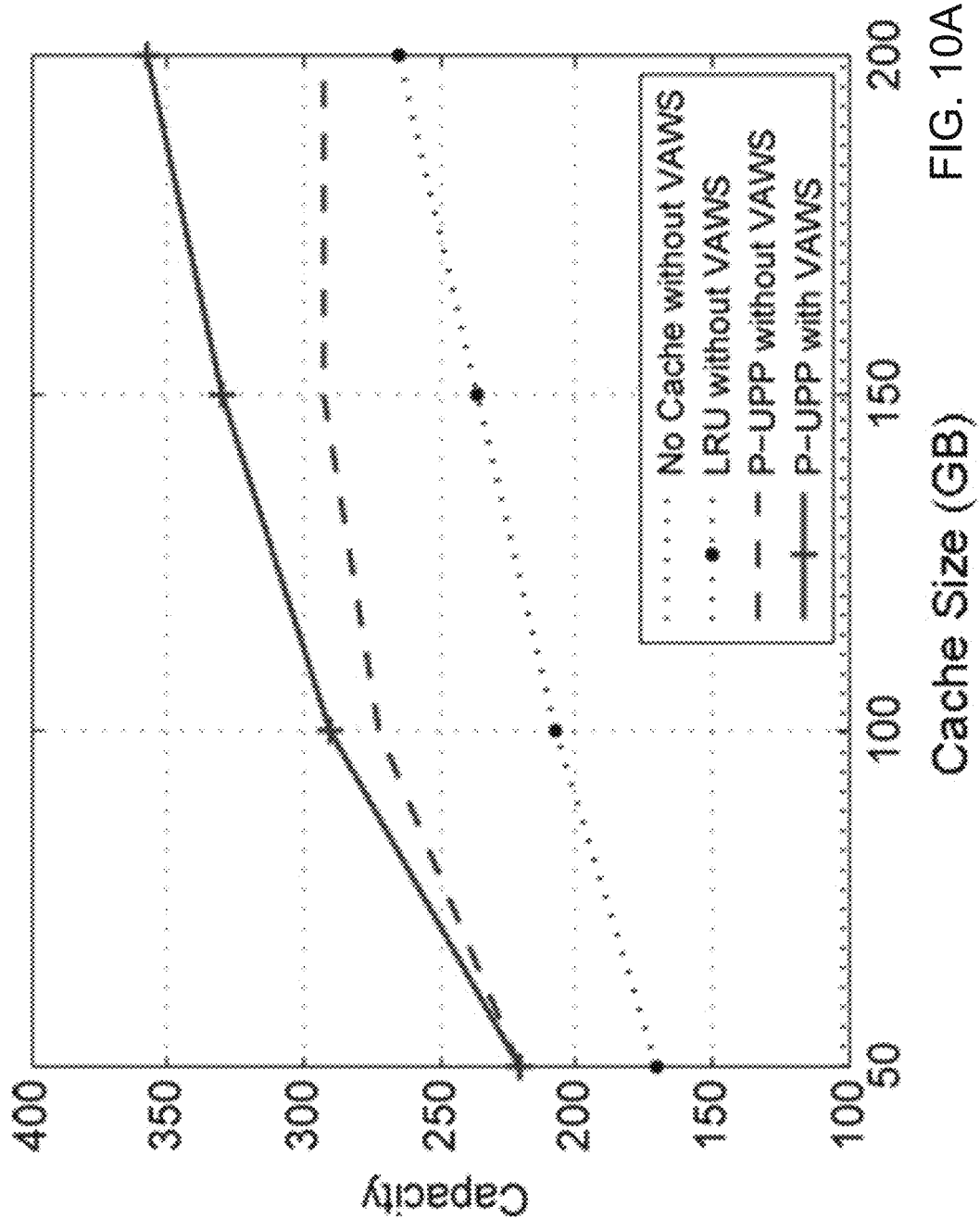

To understand the impact of VAWS on the end-to-end capacity of the wireless network, the same experiments were repeated as shown in FIG. 9A, but this time with additional wireless channel constraints for no RAN caching and RAN caching with the conventional and UPP-based caching policies. As was the case for the backhaul-only scheduler, capacity is defined as the number of concurrent video requests served when the blocking probability is 0.01. However, unlike the previous experiments in FIG. 9 where the blocking is only due to the lack of backhaul resource, in this case blocking can be due to either lack of backhaul or wireless channel resources. FIG. 10A shows the end-to-end capacity as a function of cache size, with and without the use of video-aware wireless channel scheduling in addition to the use of backhaul scheduling. For clarity, results are shown using one conventional caching policy (LRU), one example UPP-based policy (P-UPP), and without RAN caching. Here, the maximum allowed initial delay is 30 s; any video request experiencing delay of more than 30 s is blocked.

When no RAN caching is used, the end-to-end capacity is 102 concurrent video sessions. The end-to-end capacities when using example P-UPP and LRU caching policies with cache size of 200 GB, along with waterfilling-based wireless channel scheduling (no VAWS), are 292 and 264, respectively. End-to-end capacity can be significantly improved by using example VAWS methods, from 292 to 357 in the case of UPP caching. As shown in FIG. 10A, one can see an improvement of 22% in terms of concurrent video requests served using VAWS. The results presented in FIG. 10A indicate that while the constrained wireless channel limits the end-to-end capacity for P-UPP [compared to results in FIG. 9A], an example video-aware wireless channel scheduler reduces the negative impact in terms of video requests served. Note that when no RAN caching is used, the backhaul limits the end-to-end capacity of the network, so the impact of the wireless channel limitations is minimal.

Figure 10B:
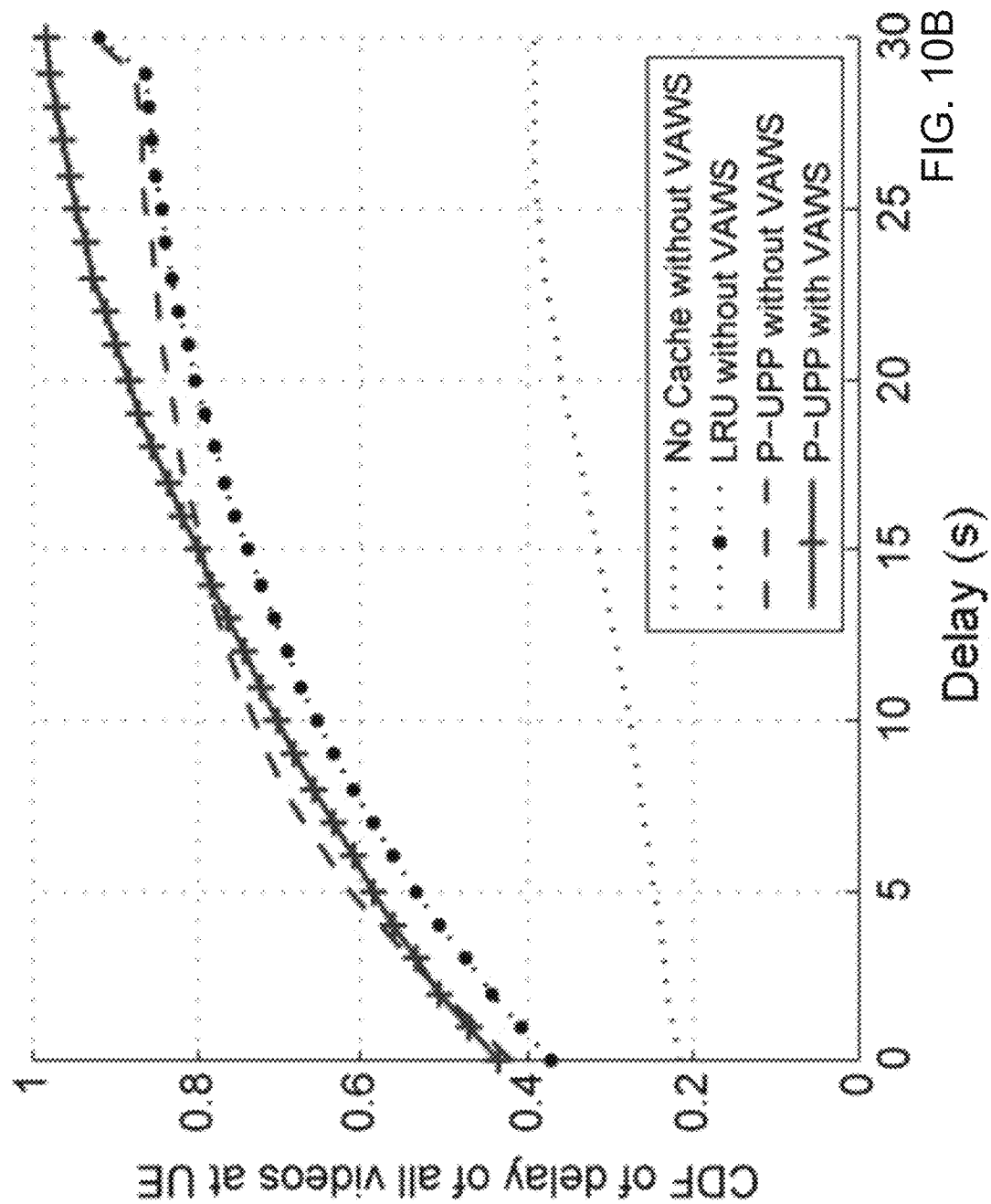

Next, the effect of wireless channel scheduler, together with RAN caching, is assessed on initial delay that users experience. FIG. 10B shows the CDF of the delay when the cache size is 200 GB and user interarrival time is 12 s. Here, unlike FIG. 9A, the results are affected by the limitations in wireless capacity and impact of different wireless channel scheduling methods. As before, an infinite delay was registered for each blocked video request. As expected, lower capacity and increased delay were observed when considering wireless channel limitations, but by choosing an example VAWS method, one can recoup much of the loss and approach the results observed when not considering wireless channel limitations. From FIG. 10B, it can be inferred that the probability of achieving a delay that exceeds 25 s with P-UPP caching method is 0.05 with VAWS and 0.14 without VAWS. The probability of achieving a delay of 25 s or more with LRU caching policy without VAWS is 0.16, and without any RAN cache and without VAWS is 0.61. There is an improvement of 56 percentage points in terms of reducing the number of video requests experiencing delay of more than 25 s with P-UPP and VAWS compared to no cache and conventional scheduler.

Figure 10C:
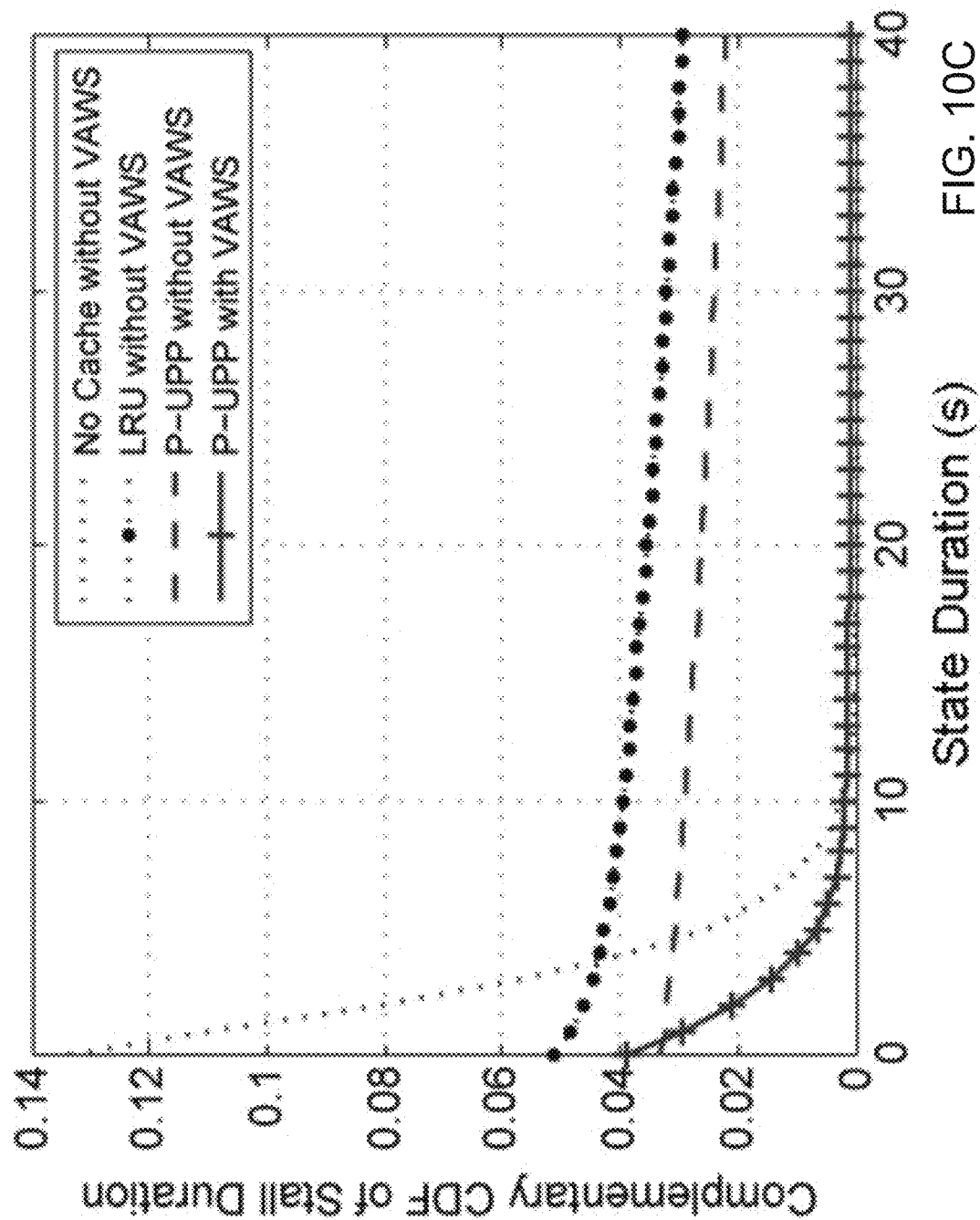

FIG. 10C shows complementary CDF of stall duration for example cache policies. From the figure, it is apparent that using the example VAWS method significantly reduced the probability of stalling and stall duration. For example, the probability of stall with delay of 10 s or higher is almost 0 for P-UPP with VAWS, while it is around 0.03 for example P-UPP caching policy without VAWS and 0.04 with LRU without VAWS. The no-cache case does not experience any stall with duration of above 20 s because blocking happens exclusively in the backhaul, which does not lead to increased delay, but instead reduces the overall capacity. However, when not using RAN caching, even though one is limited by the RAN backhaul and operating well below the capacity of the wireless channel due to the aggressive scheduling of waterfilling algorithm that optimized for users' channel conditions and total throughput, there still are a high number of stalls with short durations. The results show that using P-UPP with VAWS can improve the total number of stalls with delay of 5 s or higher by 1600% compared to P-UPP without VAWS.

FIG. 10D shows the effect of different user interarrival times, caches, and VAWS on blocking probability. As expected, the blocking probability decreases with increasing user interarrival time. Further, significant reduction in blocking probability can be obtained by using example P-UPP caching with example VAWS, compared to other alternatives. For example, for user interarrival time of 9.5 s, the blocking probability is 0.71 with no RAN caching, 0.16 with RAN caching using LRU, and 0.05 and 0.09 for P-UPP with and without VAWS, respectively. The simulation results show that RAN micro-caches with example UPP-based caching policies, together with the example video-aware scheduling approaches improve the capacity by up to 247% over the no-cache, no-videoQoE-basedwireless scheduling case while maintaining similar or better QoE.

Figure 11:
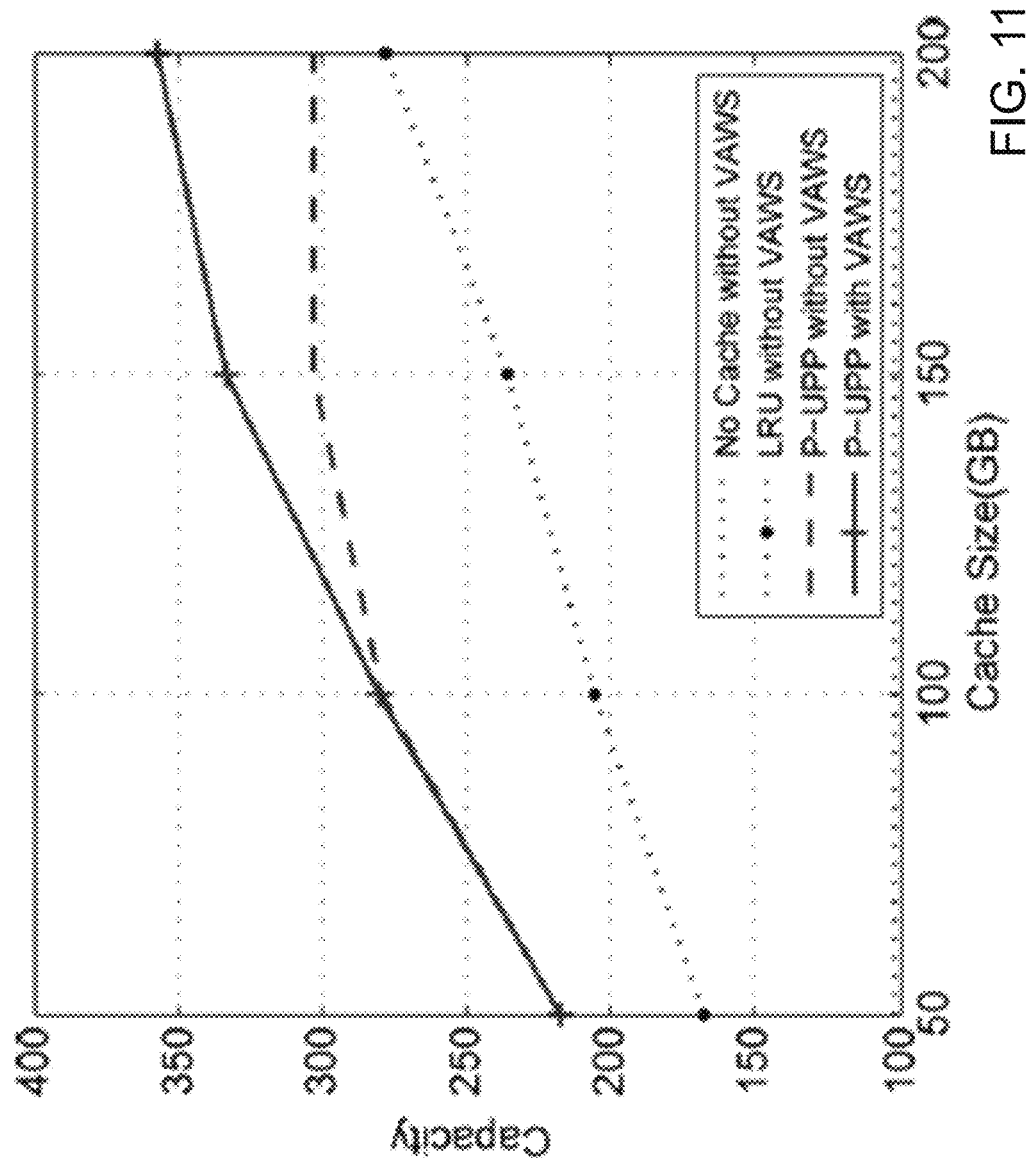
FIG. 11 shows capacity versus cache size for UMi wireless channel model.

While the above results were obtained using the UMa channel model, the performance of example methods using the UMi model were also considered. FIG. 11 shows that using the UMi channel model and the particular cell radius of 1000 m, the end-to-end capacity obtained by each caching policy with and without VAWS is comparable to the end-to-end capacity obtained by the same caching policy and VAWS combination using UMa model and 1200-m cell radius. The end-to-end capacities when using P-UPP and LRU caching policies with cache size of 200 GB, along with waterfilling-based wireless channel scheduling (no VAWS), are 303 and 278, respectively. End-to-end capacity can be significantly improved by using VAWS, from 303 to 357 in the case of P-UPP caching. These results show that the conclusions for the UMa model hold true for UMi as well.

To assess how the example UPP caching methods perform when the exact UPP distribution of the video users in a cell site is not available, three different types of UPP estimation error were introduced, and further simulations were conducted. The first scheme assumes that the VC rankings in a UPP remain the same but the probability changes by a random amount. To generate this type of error, the selection probability of each VC is multiplied by (1+e), where is uniformly distributed on the interval $[-\epsilon; \epsilon]$. Introducing this type of error to the base scenario yields similar results to those presented in FIGS. 8A and 8B, and the example caching methods are robust in response to this type of errors.

The second type of error introduced was inspired by the Kendall tau-distance and swaps the ranking of adjacent VCs, selecting adjacent pairs at random and swapping their popularity ranking. The simulation results showed that example UPP-based caching methods are very robust to this type of error as well.

Third, an error was introduced where the user with some probability requests a video from a video category that is not expected given the users preference profile, and example caching methods showed some sensitivity to this type of error. The last of the three types of errors is modeling a user that behaves unexpectedly and requests videos that are not consistent with the user's historical preferences. This could, for example, be if the user has taken up a new interest recently, or maybe responding to an unusual event.

Time complexity analysis of the caching methods is significant as it measures the amount of time required to execute critical cache operations, for instance fetching the videos from the cache (cache lookup) and making caching decisions for proactive policies or replacement decisions for reactive policies (cache maintenance). However, not all operations are equally time-sensitive, and additionally, some operations can be done offline. Specifically, cache lookup is time-sensitive because it has a direct impact on the users' experience, and it is usually an online process as most often the user requests are generated on the fly and are not a known sequence of requests. Cache maintenance is less time-critical, but it has impact on future requests. For instance, for reactive caching policies, it is important to identify and replace the cached videos considered for replacement as soon as possible in order to have the video ready for impending requests. However, the time sensitivity of cache maintenance is lower than the cache lookup.

For clarity, it is assumed that sorting of the videos based on their popularity (national video popularity) can be done offline every time the ranking of the videos changes, and hence the sorting of the videos does not directly impact the time complexity of the operations that rely on the videos being sorted. The optimal data structure for the cache lookup is a sorted linked list to keep track of the videos based on their adjusted popularity and a hash table of pointers to the sorted list to map the videos to their popularity ranking Adjusted popularity refers to national video popularity for MPV, least recently used for LRU, and geographical popularity of videos according to the cell site AUS for example UPP-based policies. For all the available videos that can be cached, it is useful to have a hash key that is long enough that it can map videos with high probability. One then creates a mapping from the hash table to the cache entry pointer in the linked list. With such a data structure, the access time depends on the probability of hash collision and is given by O(N/k), where N is the number of videos in the cache and k is the number of unique hash keys in the table. Therefore, on average, if a video is in the cache, one can identify and retrieve the video from the cache in O(N/k) or declare a cache miss and fetch the video from the Internet CDN. The worst-case time complexity happens when all the videos in the cache are mapped to one hash value, which is O(N). Many variants of the hash table are available for implementation considerations. See, e.g., J. Morris, "Data structures and algorithms," 1998 [Online], www.cs.auckland.nz/~jmor159/PLDS210/hash_tables.html.

MPV: MPV cache maintenance requires updating of the cache when the national video popularity changes—it is assumed that national popularity distribution of the videos is maintained offline—and subsequent populating of the cache with videos corresponding to the new ranking. In order to save on bandwidth usage instead of evicting the entire MPV cache and repopulating it with the newly ranked videos that have complexity of O(N), the cache is resorted, and only those videos evicted from the cache are replaced. The average and worst-case time complexity of the sorting algorithm is that of a general sorting algorithm: O(Nlog (N)). If major changes in the national popularity ranking of the videos do not occur often, the MPV cache maintenance is negligible.

LRU: In the LRU caching policy, when adding a video to the cache, the video is placed at the head of a doubly linked list. On eviction of a video from the cache, the video is removed from the tail of the list. The time complexity of the maintenance operation depends on whether the request results in a cache hit or miss. If there is a cache hit, the corresponding entry in the linked list must be moved to the head of the list, which can be done with O(1) time complexity. In the event of a cache miss that triggers a successful video download (backhaul not blocked), the time complexity is the time it takes to add the requested video to the beginning of the list and to remove any evicted video(s) from the end of the list, which are both O(1). Hence, even for a cache miss, the average time complexity of maintenance for LRU is of the order of O(1). The average number of times the cache update needs to be executed per request depends on the probability of getting a cache miss and successfully scheduling the download from the backhaul or probability of cache hit. This probability is given by $(1-p_h)(1-p_b)+p_h$, where $p_h$ is the probability of cache hit and $p_b$ is the probability of backhaul blocking; if the video request is blocked, no additional operation is required.

R-UPP/P-UPP: Example R-UPP and P-UPP caching policies require keeping track of the average cell site UPP. It is assumed that information about the users' UPP is already available and can be retrieved from a central server with no additional time/memory complexity to the caching methods. For keeping track of the AUS UPP, one requires $|U|\times|VC|\times W$ bits of memory to store all the active users' UPP, where $|U|$ is the cardinality of active user set, $|VC|$ is the total number of video categories, and W is the number of bits used to quantify the user preferences for each category. Furthermore, the users are being added/removed one at a time, so for each user added/removed, one adjust the average cell site UPP by a simple update algorithm Add: $UPP^{(t)}=(|U|\times UPP^{(t-1)}+UPP_i)/(|U|+1)$ Remove: $UPP^{(t)}=(|U|\times UPP^{(t-1)}+UPP_i)/(|U|+1)$ In the above equations, $UPP^{(t)}$ represents the average UPP at time t, and $UPP_i$ is the user preference profile of the ith user. Calculating the average UPP has time complexity O(|VC|) because one needs to average across all the video categories. The number of times this operation is required depends on the number of active users in the cell site and frequency of the AUS change.

Next, the probability of request for each video is evaluated, and MLR and LLR sets are calculated. As explained in the methods, each time the AUS or national video popularity changes, the ranking of the videos in the cache or potential videos for caching may change and require regenerating LLR and MLR sets for R-UPP and P-UPP, respectively, and consequently resorting of the cache. Alternatively, the resorting of the list for both R-UPP and P-UPP can happen at fixed intervals—e.g., every 1-10 min—to reduce computational overhead. The time complexity of calculating $P_R$ for R-UPP and P-UPP caching policies is not the same, so the time complexity for each policy is explained separately.

To calculate $P_R$ for R-UPP caching policy, in the event of AUS change, one needs to go through the list of cached videos and recalculate the popularity of each cached video. Average time complexity of this operation is $O(N\times|VC|)$ because one needs to go through the cache and use equation (3) to calculate $P_R$—however, here it is assumed that each video belongs to only one video category, so the complexity reduces to O(N). After an AUS change or a change in national video popularity, the ranking of the videos in the cache may change, so the list is resorted accordingly in O(Nlog (N)) average operations, or worst-case time complexity of O(N log (N)) for instance using merge sort. Furthermore, in the event of a video request, if the video request is a cache miss, one first needs to calculate $P_R$ for the video request, and if it is higher than the request probability of the LLR, it will cause eviction with O(1) time.

The complexity analysis for the example P-UPP follows the example R-UPP time complexity analysis, with the difference that the ranking of the videos is done across all the available videos instead of just the cached videos. However, as going through all the videos in the universe is likely not feasible, the analysis can be performed on the subset of the videos, not currently cached, with highest popularity within each video category. Start by calculating $P_R$ for all the videos in the cache and sort them according to the updated request probability. The time complexity of this operation is O(Nlog (N))+O(N). Next, one calculates $P_R$ for the most popular video, not already in the cache, within each video category and selects the one with the highest request probability to replace the video in the cache with the lowest request probability if the new video has higher request probability than the video from the cache that it replaces. This iteration continues until the most likely requested candidate video has lower request probability than the least likely requested video in the cache. For each step of the iteration, one new request probability must be calculated, and the video with the highest probability among the video categories must be selected as the cache replacement candidate. The worst-case time complexity of the above operation occurs when all cache entries are replaced with complexity $O(1|VC|\times N)$, while the best case is O(|VC|), which occurs when no replacement is required. In conclusion, the average maintenance complexity of the P-UPP caching policy is O(Nlog (N)), dominated by the sorting of the cache.

In terms of actual execution time measured in the example MATLAB implementation, for a cache size of 200 GB with approximately 3030 videos in the cache and average duration of 8 min, user interarrival time of 16 s, and total number of video categories of 247, it takes on average 8.5 ms to calculate $P_R$ for example R-UPP caching policies (all videos in the cache) and 98.3 ms to calculate $P_R$ for example P-UPP caching policies (optimized search of all available videos). The former is done for each new video request that causes a cache miss, while the latter is done only when AUS changes. The above example shows that the overhead of calculating $P_R$ will not be limiting to serve requested videos in real time.

Although the objective of HRD incorporated as part of most codecs, e.g., x264, is not to generate LBP parameters, but to create an encoded stream that complies with the decoder buffer initial delay and max buffer size given a transmission rate, the GHRD, which is part of the JM codec published by Joint Video Team (JVT), creates LBPs. For instance, implementation of the LBPs is in file "leaky_bucket.c" for JM codec. The approach used to generate LBPs for each encoded video is presented. Encoded video frames have variable bit rates, and the decoder needs to decode video frames, each of different sizes in order to display the video sequence on the screen. Thus, one can model the UE's video buffer as a queue, where the input has a constant bit rate, representing the minimum rate by which the channel delivers the encoded video bits and the output has a variable rate representing the rate at which the decoder removes variable size frames from the queue for decoding. As such, for generating LBP the objective is to find the initial fullness level F for a D/G/1 queue, with input rate R and output rate $R_{out}$, so that the queue never becomes empty. One defines the equivalent problem: Find the largest queue deficit of a G/D/1 queue with input rate R and output rate $R_{out}$ when starting the queue empty and allowing negative buffer level, representing a temporary deficit in the download rate compared to the video decoder rate. At time T (in frames), the total queue size Nun be described by the following recursion:

$$N_Q(T) = T\frac{R}{f} - \sum_{n=1}^{T} b_n = N_Q(T-1) + \frac{R}{f} - b_T \quad (8)$$

where $b_n$ is the frame size in bits of frame n, and $f$ is the frame rate in frames per second. The initial buffer fullness to guarantee that the buffer never runs empty assuming a video of length L is then $$F = -\min_{T=1,\ldots,L}(N_Q(T)) \quad (9)$$

It can be shown that, as the transmission rate increases, the initial delay and buffer size requirements decrease, until rates about 700 kb/s, where the buffer size stabilizes, as it needs to at least buffer the largest and initial I-frame.

Hierarchical Video Caching

Additional embodiments of the invention enhance a wireless video cloud, further distributing the RAN caches to include network elements within the CN, resulting in a hierarchical video caching structure. This preferably is accomplished without increasing the total cache size used. Adding caches within the CN in example embodiments can supplement the RAN caches, enable multiple cell sites to share caches at higher levels of the cache hierarchy, and help reduce or eliminate bandwidth bottlenecks between the UE and CDN. The result can be improved overall cache hit ratio, and increased network capacity to support simultaneous video requests.

Additionally, an example hierarchical caching approach can be beneficial to support mobility. When a user requesting a video moves from one cell to another cell, the associated RAN cache of the new cell may not have the requested video, leading to a cache miss and the video to be downloaded from the Internet CDNs. This in turn results in increased latency and reduced capacity. However, in hierarchical caching according to example embodiments, proper caching of the video at the CN caches can help provide seamless mobility.

Additional example embodiments thus extend the UPP-based caching policies disclosed above to support hierarchical caching. Such example policies also implicitly anticipate mobility and prepare for the eventuality that the video downloads will have to be migrated to a neighboring cell cache. As with RAN caching, even with hierarchical caching, some cache misses are inevitable in each layer of the hierarchy, and each video download needs to go through the backhaul of all network elements in the hierarchy up to the level where the video is found, so some backhaul traffic must be scheduled throughout the network. An example scheduling approach thus improves the total number of concurrently admitted videos while maintaining the user's required QoE by first scheduling the videos based on the video codec's LBP and assigning any spare backhaul bandwidth using optimization such as Linear Programming (LP) optimization.

Figure 12A:
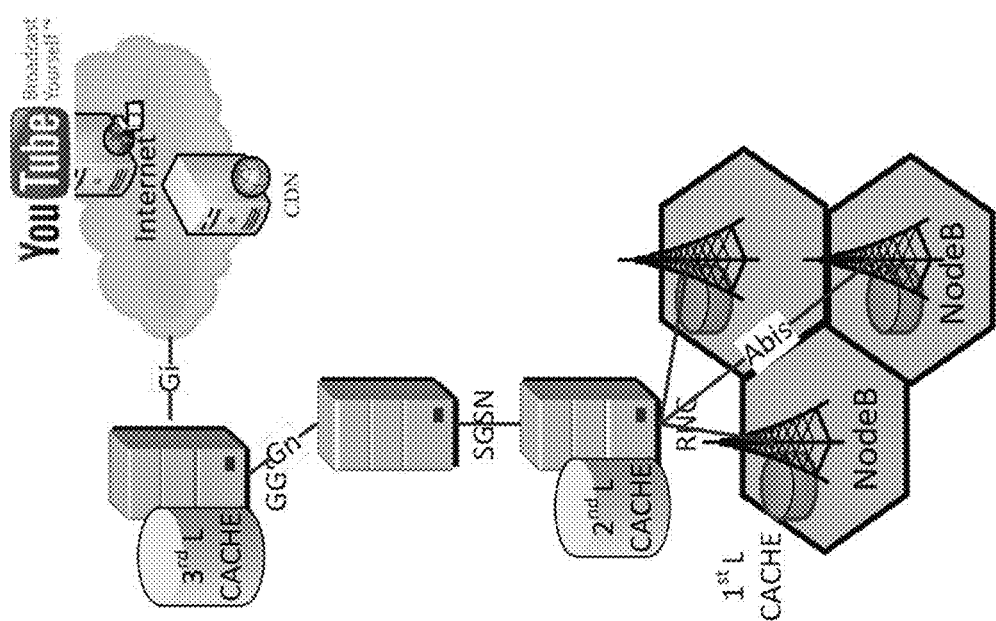
FIGS. 12A-12C show example wireless system architectures and associated caches, including 3G architecture (FIG. 12A), 4G architecture (FIG. 12B), and a hierarchical cache model (FIG. 12C)
Figure 12B:
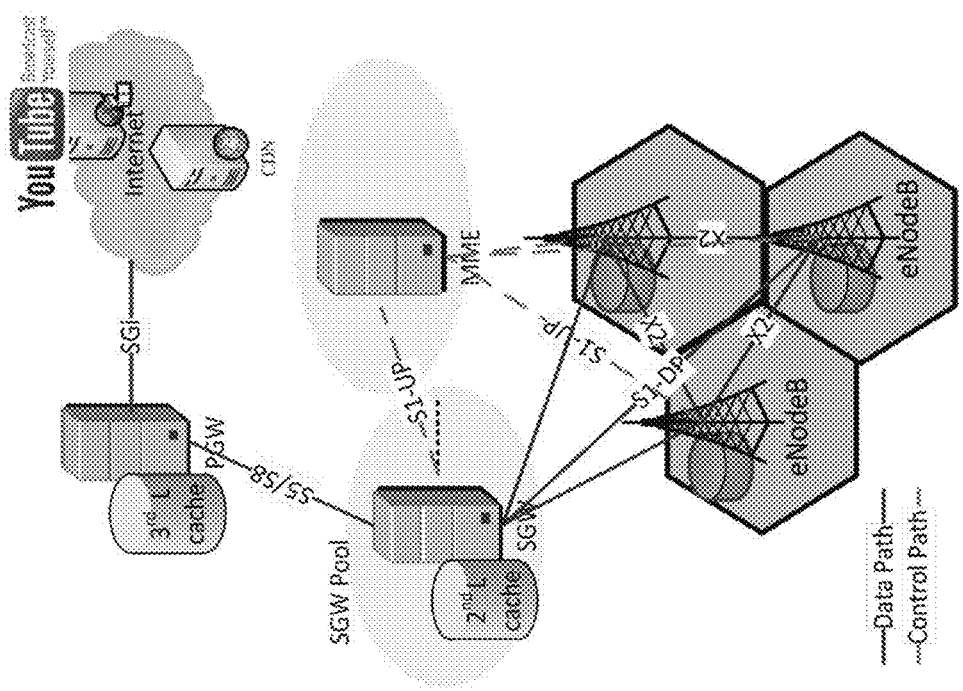
Figure 12C:
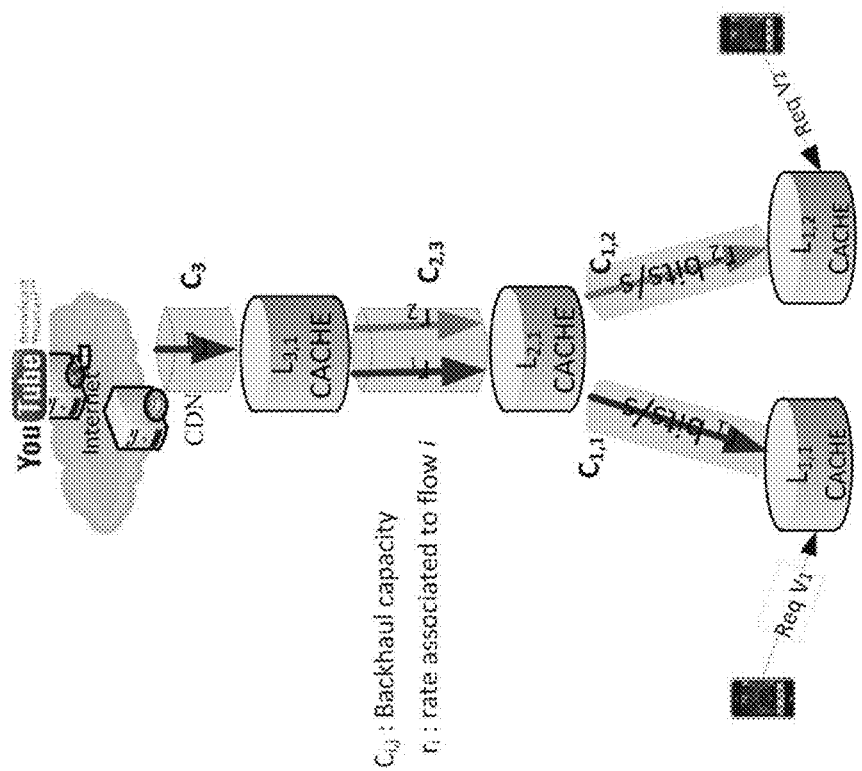

FIGS. 12A-12C show an overview of a wireless network embodied in a 3G architecture, according to example embodiments of the invention. The 3G architecture includes, at a first level, a RAN having cells with NodeBs for communicating with UEs. The NodeBs communicate with Radio Network Controllers (RNCs) (a next higher level) via Abis links. The RNCs communicate with a higher-level Serving GPRS Support Node (SGSN), which in turn communicates with a still higher-level Gateway GRPS Support Node (GGSN). The GGSN communicates with the CN via an IP-based reference point (Gi). As shown in FIG. 12A, caches for storing video data according to example embodiments of the invention are provided in multiple levels of the wireless network, e.g., the NodeBs (first layer), the Radio Network Controllers (RNCs) (second layer), and the Gateway GRPS Support Nodes (GGSNs) (third layer). In particular example embodiments, a cache is not provided at the SGSNs.

In conventional 3G wireless standards, e.g. 1xEV-DO and UMTS, only limited radio functionality is placed in the NodeB, and the Radio Network Controller (RNC) is responsible for resource management, controlling the NodeBs, as well as session or connection setup. Every soft or hard handover goes through the RNC. In a conventional 3G architecture, requests first traverse through the NodeB to the RNC, then from the RNC to the SGSN and GGSN, and follow the same path in the reverse direction to the UE. No inter-Node(b) communication is in place, and the network is circuit-switched oriented. A NodeB is homed to the RNC, the RNC was connected to a SGSN, and so on.

FIG. 12B shows a wireless network embodied in a 4G architecture according to embodiments of the present invention. In 3GPP Long Term Evolution (LTE) and System Architecture Evolution (SAE) wireless standard, the main data path is from the PGW to the SGW to (e)NodeB; i.e. a top down flow, although control and minimal data transactions can be performed between nodes within the same level (e.g. between two (e)NodeBs or two SGWs). From 3GPP release 6 to release 8 the functionality of the RNC has been consolidated into the (e)NodeB containing all the network-side radio functionality. SAE helps accommodate the high capacity LTE radio interface, optimize for packet-switched operation, improve the experienced delay and support the higher user throughput provided by the physical layer, along with inter-operability with the other 3GPP and wireless standards.

In 4G, the (e)NodeBs can be inter-connected over the X2 interface, a high capacity interface designed in SAE for transferring control information or UE's data buffer during handover; here, no RNC is used. SAE supports handovers at the (e)NodeB level over the X2 or S1 interface. Although this X2 interface is available for limited data transfer, it cannot be used for the long term data transfer between two (e)NodeBs, so it cannot be exploited for inter-cache data transfer; for this reason, it is assumed that nodes at the (e)NodeB layer cannot share their cache contents directly. FIG. 12B further shows caches according to example embodiments of the invention located at each of (e)NodeB (a first layer cache), SGW (a second layer cache), and PGW (a third layer cache).

The MME keeps track of UE locations in its service area. Once the UE first registers in the network, the MME allocates resources in the eNode(b) and the SGW for the UE. The SGW is responsible for relaying the data between the eNode(b) and the PGW. A pool of MMEs and SGWs are assigned to serve a particular set of eNode(b)s. An eNode(b) may connect to many MMEs and SGWs, for instance if there is congestion or one of the elements cannot be reached because the route is not available. However, each UE will be served by only one MME and SGW at a time. Because in the normal operation one (e)NodeB is connected to one MME and SGW, without loss of generality, an example caching structure can be simplified to a tree-based hierarchy similar to the one provided for 3G.

In an example embodiment, as shown in FIG. 12C, a wireless network has a tree topology to model data flow in a 3G or 4G network. In this example tree structure, leaf nodes (first layer nodes) are provided at NodeBs/(e)NodeBs where users (e.g., UEs) attach. Second layer nodes are provided at the RNCs/SWGs, which do not have users directly connected to them, but cover a group of (e)NodeBs and their associated users. Similarly, third layer nodes are provided at the GGSN/PGW, with RNC/SGWs attached. In a non-limiting example embodiment, a single GGSN/PGW (third layer node) is provided, which forms the root node of the tree and is connected to the Internet CDN via the Internet backhaul. The caches associated with the first, second, and third layer nodes are referred to as the first, second, and third layer caches respectively. A video may be present at the first, second, or third layer caches, but will always be found in the Internet CDN connected to the backhaul of the third layer node. FIG. 12C shows an example tree architecture. Nodes of the tree represent the caches, and edges represent the backhaul links with bandwidth, which sets the upper bound on the total number of concurrent video downloads possible on the link.

In caching policies used with this example hierarchical model, if a user requests a video, and the video is found in the lower layer cache, the video is delivered from that cache and the backhaul connecting to a higher layer node is kept available for other downloads. If the request results in a cache miss in the lower layer, then the request goes to the higher layer cache, preferably only if there is enough backhaul bandwidth to accommodate the video download. Consequently, the finding of a video in a lower layer cache results in lower latency and higher capacity. More significantly, finding the video within the wireless cloud helps one to lower the traffic in the backhaul connecting the wireless cloud to the CDN (i.e., the Internet backhaul).

A significant aspect of hierarchical caching is the amount of video redundancy in the caches of different layers of the hierarchy, impacting cache hit ratio of users in a cell, as well as support for mobility between cells. Different cache hierarchy architectures have been considered. Examples include inclusive cache hierarchy, where a higher layer cache includes all of the videos that exist in the associated lower layer caches, conditioned upon the storage availability of the higher layer cache. Another example is exclusive cache hierarchy, where a higher layer cache will not cache videos that are present in the associated lower layer caches.

Inclusive cache hierarchy can be very effective to support mobility between cells, whereas exclusive cache hierarchy can be more effective to improve cache hit ratio of more static users. For example, in inclusive cache hierarchy, a user traveling from cell site A to cell site B while receiving a video stream can continue to receive the video almost seamlessly during the hand-off, even if the video that is being watched is not found in the cell site B cache, because the video can be found in the second layer cache that is connected to both A and B. In exclusive cache hierarchy, where the second layer supplements the second layer cache instead of including the first layer cache's contents, the cache hit ratios of users in cells A and B can be potentially enhanced, as long as the mobility of users in A and B are low. One problem with such caching schemes is that they require extensive cache coordination; maintaining coherency between caches may result in high levels of overhead.

Additional embodiments of the invention employ a hybrid and partially distributed hierarchical caching policy based on user preference profile (UPP-based) to increase cache hit ratio and provide support for high mobility. In this approach, each layer independently caches the video contents according to its caching policy. The minimum coordination needed is that each node relays its Active User Set (AUS) information, i.e. the active video users served by the node, whenever AUS is updated, to its higher layer node in the cache hierarchy tree. The AUS of the higher layer node is then defined as the union of all AUS of the first layer nodes connected to it.

To further optimize for mobility, a subset of the AUS information that captures users with high mobility can be exchanged between neighbor (e)NodeBs, who combine this information with its own AUS to provide what is referred to herein as "extended AUS" (eAUS). In particular example embodiments the implied inclusivity of example hierarchical caching methods is used to improve support for mobility. In other words, exclusive cache hierarchy is not used in such examples.

In an example hierarchical UPP-based method, each cache in the cache hierarchy makes its decision independently, and as a result, videos may be redundantly cached at multiple layers in the cache hierarchy. This is inconsequential if the assumption is that the cache size grows by a significant factor for each layer as one gets closer to the root node, because the redundant part of the cache will only be a small part of the total cache. However, if the cache sizes are limited it becomes more important to conserve space and an exclusive policy may be needed. To further optimize for storage, it is possible in some embodiments to remove the intersection of all the first layer caches, from the second layer and third layer caches, and so on.

Additional embodiment methods modify the example caching policies described above to support hierarchical caching: Most Popular Videos (MPV); Least Recently Used (LRU); Reactive-User Preference Profile (R-UPP); and Pro-active-User Preference Profile (P-UPP). In the example RAN-only model—where only (e)NodeBs have caches—P-UPP and R-UPP cache candidates are calculated based on the AUS of the (e)NodeB. The reactive caching policies, i.e. LRU or R-UPP, fetch the video from the video source if there is a cache miss and cache the video if the conditions of the replacement policy are met. If there is a cache miss in the first layer cache, the request propagates to the second layer cache, up the tree until there is a cache hit or it reached the root node of the hierarchy. Subsequently, the video is fetched, and while traversing down the tree hierarchy, each cache in the hierarchy chooses whether to cache the content based on its cache replacement policy.

As mentioned above, MPV is a proactive caching policy, which caches the "most popular videos" using the (nation-wide) video popularity distribution. In an example hierarchical MPV method (hierarchical MPV), each layer in the cache hierarchy caches the same "most popular videos" to the degree the cache size permits.

LRU is a reactive caching policy that caches contents as they are being fetched from the backhaul following a cache miss. If the cache is full, LRU replaces the video in the cache that has been used least recently. An example hierarchical LRU method (hierarchical LRU) is an extension of the single-layer LRU, and provides a built-in exclusivity mechanism. Consider a video request that occurs frequently at all (e)NodeBs associated with a second layer cache. Initially, the video is being fetched by a user at a single (e)NodeB, which results in the video being cached at that (e)NodeB and in the second layer cache. When a user at another (e)NodeB requests the same video, it is delivered directly from the second layer cache and stored in that new (e)NodeB's cache as well. Eventually the video will be stored at all the (e)NodeBs, and all future user requests for that video will be served from the second layer caches. That is, the second layer cache will no longer see any requests for that video and it will eventually be evicted by the LRU policy at the second layer to free up the space for other videos.

FIG. 13 shows an example hierarchical R-UPP method. Based on a definition of the cache tree structure, each cache in the first layer is associated with one cache in the second layer and one cache in the third layer. $L_{i,L_{1j}}$ refers to the ith layer cache that is associated with the jth first layer cache. In the example cellular network, there are three layers of cache (n=3), as shown in FIG. 12C.

Generally, upon a cache miss, R-UPP fetches the video from the backhaul and caches it if the UPP of the AUS indicates it is more likely to be requested again than any video currently cached. When applying R-UPP to hierarchical caching, similarly to LRU, for each video V to $L_{1,j}$, the cache of the $j^{th}$(e)NodeB, if the request to the first layer cache (layer i=1) is a cache miss, the request is progressively passed to the next layer in the cache hierarchy tree until either there is a cache hit or it has reached the root of the tree, meaning the video needs to be fetched from the Internet CDN. While the fetched video is traversing towards the UE in the hierarchy tree, each cache on the way to the first layer cache decides whether to cache the video.

The replacement policy for the example hierarchical R-UPP method is similar to that for R-UPP. Particularly, after each new video request for Video (V), the request probability, $P_R$, is calculated for the videos in the cache as well as that of the newly requested video. This can be done by finding the UPP for cache $L_{i,L_{1j}}$ based on AUS($L_{i,L_{1j}}$), where AUS($L_{i,L_{1j}}$) represents the AUS that is associated with the jth cache in the ith layer, and UPP (AUS ($L_{i,L_{1j}}$) is the aggregate UPP of the AUSs associated with the cache $L_{i,L_{1j}}$. Using these probabilities the Least Likely Request (LLR) set is formed, which is the smallest set of videos that need to be evicted to fit in the newly requested video, and which set may include one or multiple cache entries depending on the size of the requested video. Then, the LLR set is replaced with the requested video only if the $P_R$ of the new video is higher than the aggregate $P_R$ of the LLR.

An example hierarchical proactive UPP-based caching method (heirarchical P-UPP), shown in FIG. 14, is based on the P-UPP cache policy described above, in that it pre-loads the cache with the videos that are most likely to be requested given the UPP of the AUS of the associated (e)NodeBs. Particularly, in hierarchical P-UPP, when the AUS of any of the (e)NodeBs (that is, the ith (e)NodeB, $L_{1,i}$) changes due to user arrival or departure (including user mobility), video request probabilities are recalculated as explained above, to calculate the UPP of the $L_{1,i}$ cache and any higher level cache in the path to $L_{1,i}$. The request probability $P_R$ as well as the Most Likely and Least Likely Requested sets, MLR and LLR are calculated based on UPP (AUS $L_{i,L_{1j}}$)).

The cache contents are updated with the k videos belonging to the Most Likely Requested set, MLR. MLR is a subset of videos, with the highest aggregate request probability, that fits into the cache. In order to avoid excessive update overhead, each cache replacement can be associated with a probability threshold, so that the replacement only takes place if there is a significant improvement in request probability; i.e., if $P_R$ ($MLR_{i,L_{1j}}$(k))−Σ$P_R$ ($LLR_{i,L_{1j}}$ (t))>Threshold.

Videos not found in the (e)NodeB caches in hierarchical R-UPP and hierarchical P-UPP need to be brought from a higher layer cache or from the Internet CDNs, traversing through the CN and RAN backhaul. For all the videos that cause a miss in the RAN caches, including compulsory misses (i.e. the first time a reactive cache accesses a video) and cache maintenance traffic, a scheduling approach is provided in example embodiments that coordinates with the requesting video clients and uses backhaul resources judiciously to increase the overall capacity of the system.

Whenever a video is downloaded from one layer of the hierarchy to the next, the successful scheduling of the download in that layer is conditioned upon the availability of sufficient backhaul bandwidth. Otherwise, the request preferably is blocked. Leaky Bucket Parameters (LBP), as described above, are generated based on the video coding structure and allocated channel rate, and are used in additional example embodiments for allocating the minimum required rate for each video. This rate corresponds to the maximum acceptable initial delay (a QoE parameter) that a user can tolerate, and if it cannot be satisfied because of lack of available bandwidth in the backhaul of any layer of the hierarchy, the request preferably is blocked.

In addition, to avoid stalling, example scheduling methods keep the download rate from decreasing below this minimum rate any time during the transmission. For this reason, the example scheduler refrains from admitting new video requests if there is not enough spare bandwidth to maintain the minimum required rate of the scheduled requests. Further, once all the requested videos have been scheduled according to the LBPs, there may parts of the network operating at less than 100% capacity for a period of time. This spare capacity can be used to accelerate the ongoing downloads with the intent to finish the downloads faster and free up bandwidth for later use.

To utilize the spare capacity, flow maximization is provided in example embodiments using linear programming (LP). Consider each download (e.g., between the second layer node and (e)NodeB, or between the third and second layer nodes) as being part of a flow that spans the distance between the video source and the end user. For instance in FIG. 12C above, the first video request, $V_1$, spans all the way from the Internet CDN to the first layer cache, and the minimum allocated rate is based on the maximum delay that a user can tolerate and the available bandwidth at each level of the hierarchy. The same rate, $R_1$, is allocated for all the backhauls that $V_1$ should be downloaded through. The second video request, $V_2$, results in a cache hit in the third layer so the flow (video download) only spans from third layer to first layer. The bandwidth of the ith flow is identified by $b_i$ and is subsequently maximized under the constraint that the sum of the bandwidth of all scheduled flows that go through each backhaul must not exceed its capacity limits, $C_n$, and should be greater than the initially scheduled (minimum) rates, r as shown below:

Maximize: $\Sigma_i b_i$

Subject to: $b_i \geq r_i$ $\forall i$ $\Sigma_{i \in F_n} b_i C_n$, n=1, . . . ,N This optimization problem preferably is solved for the entire network, so all caches and backhauls are numbered from 1 to N, where N is the total number of nodes in the network. $F_n$ is the set of flows that go through the nth backhaul, and $r_i$ is the minimum allocated rate of the ith video request. This optimization is being executed only after all the initial video bandwidth assignments ($r_i$) were decided based on LBP. In other words, after any new video request, one first makes sure that the new video request can be admitted based on its LBP and minimum required rate of all existing video downloads (rate obtained using LBP), and then the scheduling method is run again to further optimize the rate by using the spare capacity. Unlike the distributed scheduling method in the example embodiments described above, with LP-based reallocation of spare capacity, the minimum rate requirements can be relaxed during peak load periods by asking the users (mobile clients) to recalculate their minimum rate requirements. This can be done because the buffer levels during the download sessions may be higher than anticipated at the time of initial scheduling.

The MATLAB Monte Carlo simulation framework described above for Simulation 1 is extended to assess the benefits of example hierarchical caching methods. The network is modeled as a tree, and the simulation assumes a backhaul bandwidth of 100 Mbps between (e)NodeB and SGW, 200 Mbps between the SGW and PGW, and 220 Mbps between SGW and the Internet CDN. These backhaul bandwidths, while lower than in some real carrier networks, allows a study of a fully loaded network with only few (e)NodeBs and SGWs (as opposed to a network with hundreds of such nodes). The example network includes nine nodes: two sets of three (e)NodeBs are connected to two SGWs, which are connected to one PGW. The size of the second layer cache is three times the size of the first layer cache, and the size of the third layer cache is ten times that of the first layer cache. The total number of video requests simulated per trial is 100,000, and the request originate uniformly from the users of all (e)NodeBs. The total number of videos available for download is 20,000, distributed uniformly across 250 video categories, and following a Zipf popularity distribution with parameter of −0.8. The video duration is exponentially distributed with mean of 8 minutes and truncated to a maximum of 30 minutes and a minimum of 2 minutes. It is assumed that the video codec bit rate is uniformly distributed between 200 kbps (QVGA quality) and 2 Mbps (HD quality). The simulation assumes 5000 potential mobile users with Poisson arrival and departure with mean inter-arrival time of 100 seconds and user active time of 2700 seconds (time the user is present whether actively downloading video or not). Video requests are generated independently per active user and follow a Poisson process with mean of 480 seconds. For all the simulations, one assumes the same total cache size for hierarchical and RAN-only caches, but the hierarchical case the cache has been distributed across three layers and for the RAN-only case only across the first layer caches. All variables are randomly generated for each simulation trial and all results include four trials.

FIGS. 15A-15D show the performance of non-heirarchical (MPV, LRU, R-UPP, P-UPP) and hierarchical (H-MPV, H-LRU, H-R-UPP, H-P-UPP) cache policies in terms of cache hit ratio achieved, for different total cache sizes of 50, 100, and 150 G bytes. The simulation assumes users do not move from one cell site to another (no mobility). Also, no bandwidth limitation is in effect. In all cases hierarchical caching results in higher overall cache hit ratio compared to caching only at the edge of the RAN although the total cache size is unchanged. For cache size of 150 Gbytes, H-P-UPP and H-R-UPP both result in cache hit ratios of 0.82, about 24 and 22 percentage points better than the RAN-only versions, respectively.

Figure 15A:
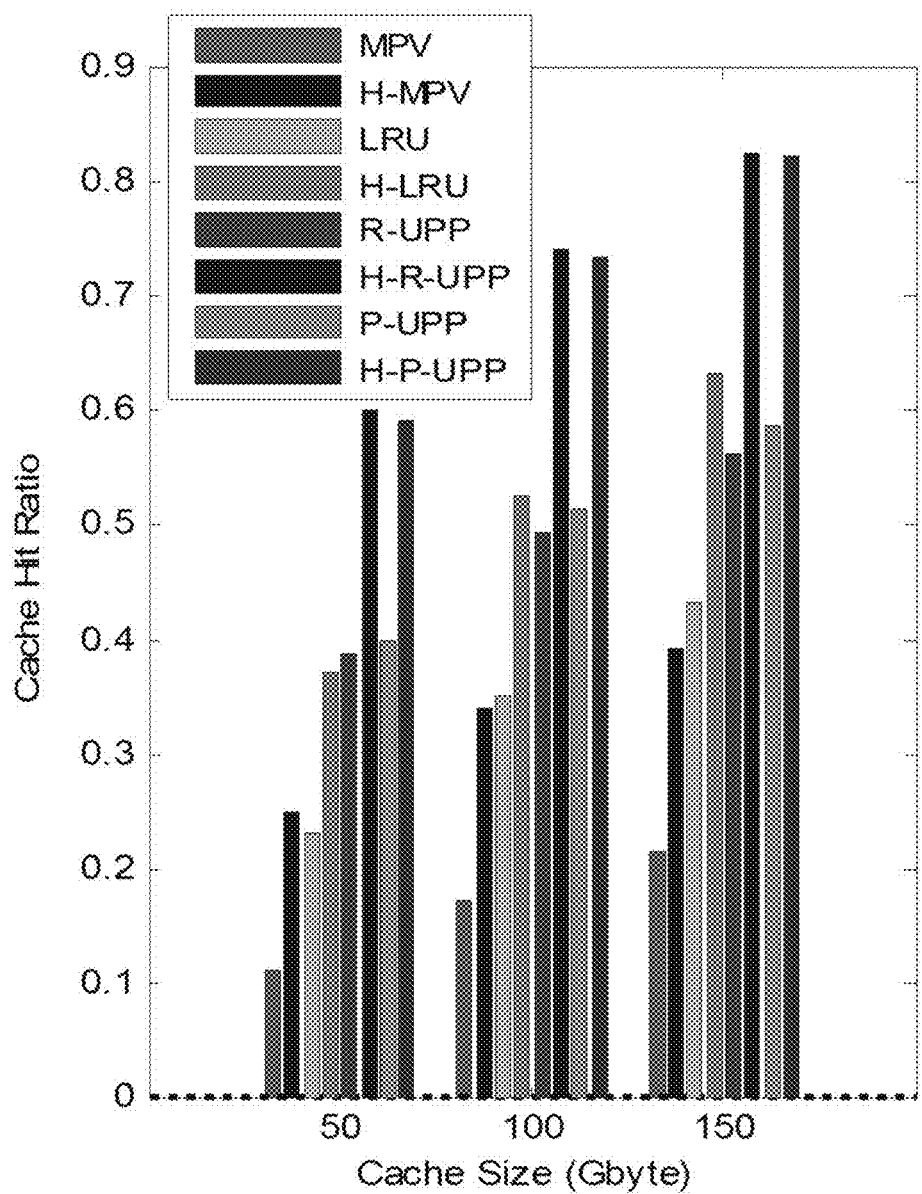
FIGS. 15A-15D show performance of example hierarchical caching policies, including cache hit ratio vs. cache size (FIG. 15A), mean backhaul bandwidth required per layer of hierarchy (FIG. 15B), capacity vs. cache policy with no mobility (FIG. 15C), and capacity vs. cache policy with mobility (FIG. 15D)
Figure 15B:
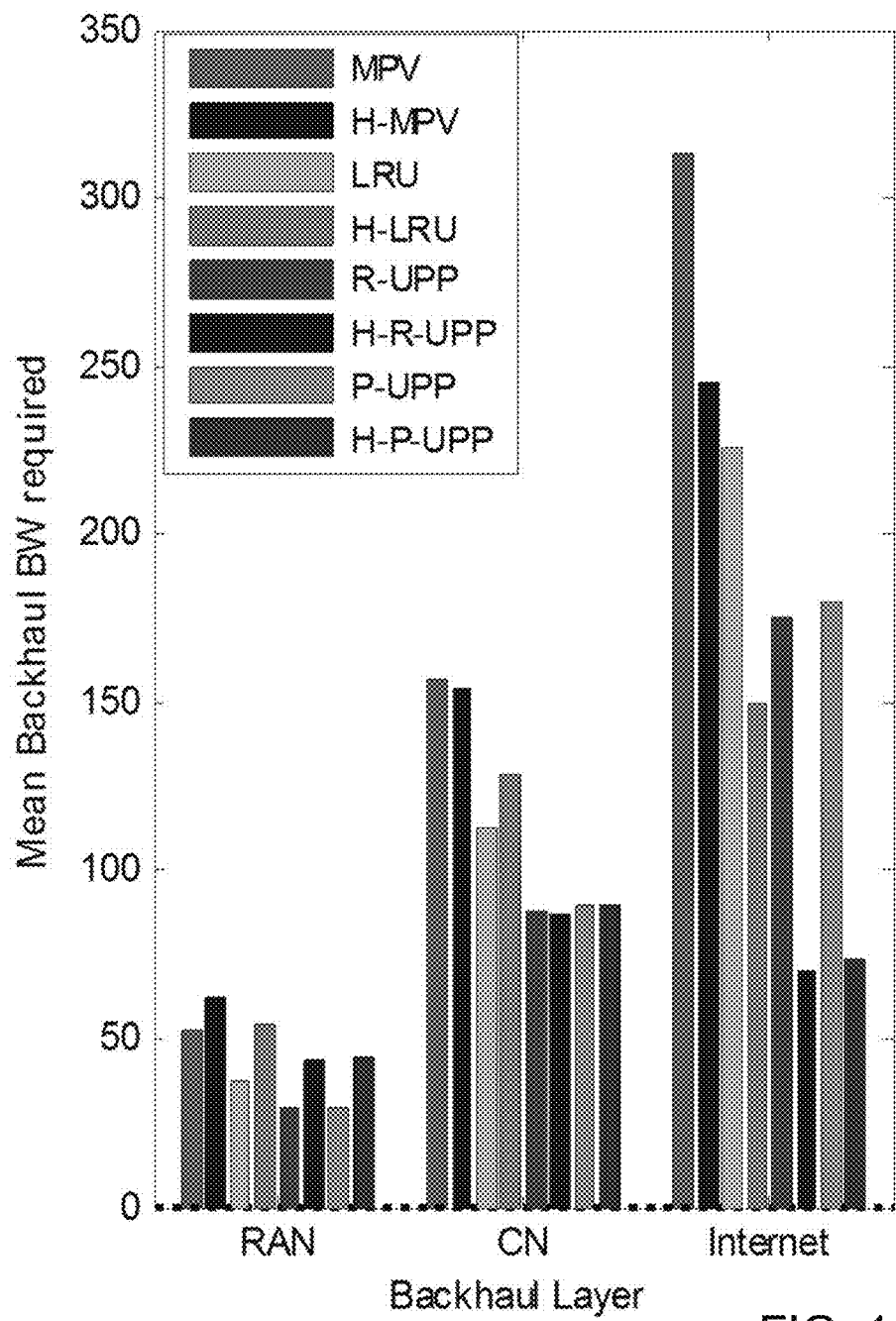

FIG. 15B shows the mean backhaul bandwidth required in RAN, CN, and Internet backhaul when the total cache size is 150 Gbyte. The mean required RAN bandwidth for the H-P-UPP (hierarchical caching) is 45 Mbps, while for the P-UPP (RAN-only caching) it is 30 Mbps. The required CN backhaul bandwidth is the same both for H-P-UPP and P-UPP at 90 Mbps, while the required Internet backhaul bandwidth is 74 and 180 Mbps for H-P-UPP and P-UPP, respectively. Similar trends are visible for the other cache policies: hierarchical caching results in significantly increased RAN backhaul traffic, but significantly lower Internet backhaul traffic (less data fetched from the CDN), which should result in lower operating costs for the network operator.

Figure 15C:
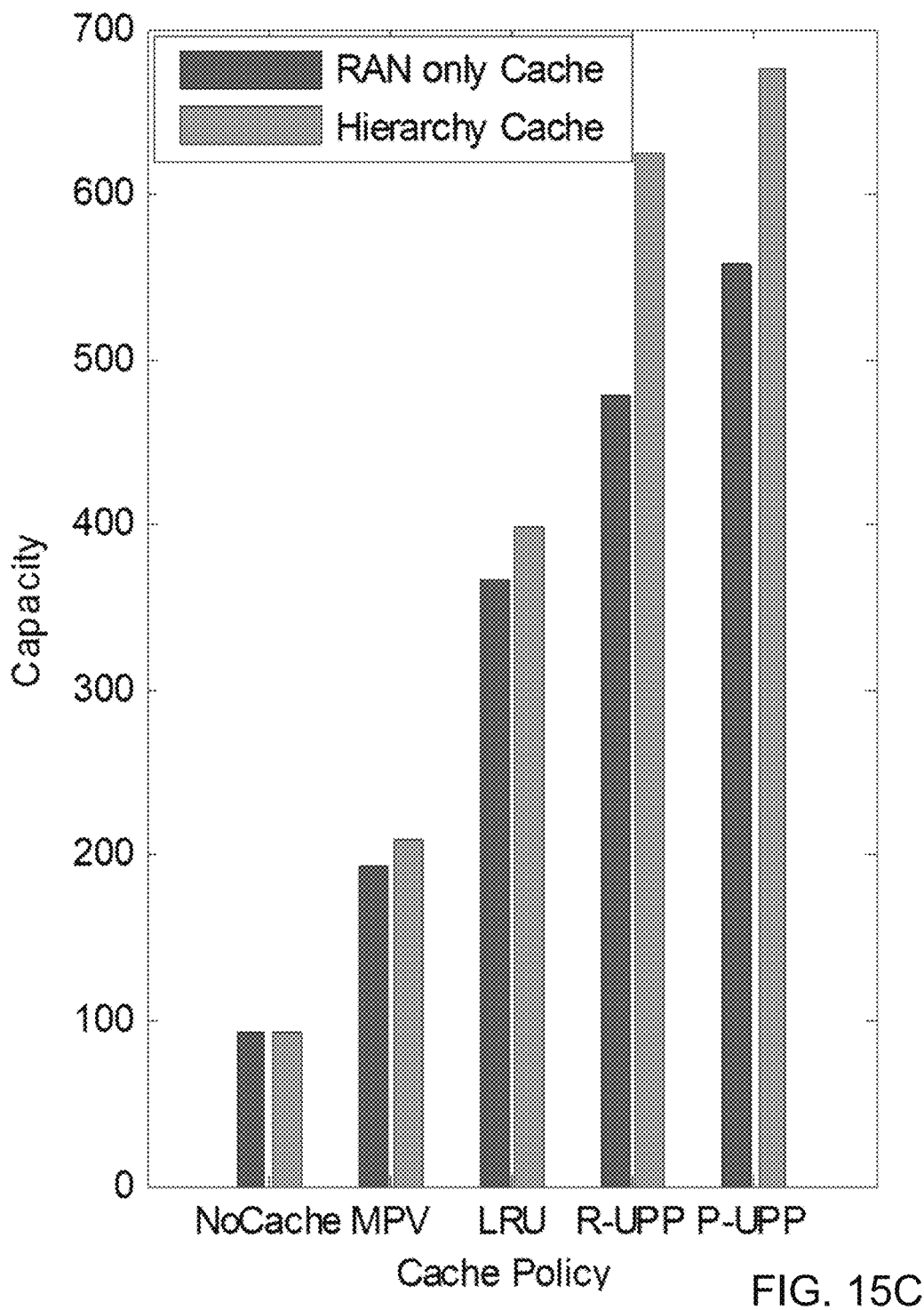

Next the advantages of caching both at the RAN and CN compared with caching only at the RAN are quantified in terms of capacity of the wireless network when considering the bandwidth limitations described above. Here, capacity is defined as the maximum number of concurrent video sessions that result in a blocking probability of less than 1%. FIG. 15C compares capacity of the hierarchical and RAN-only cache policies when the total cache size is 150 Gbytes. With the chosen bandwidth configuration, hierarchical caching performs better than RAN-only caching because it addresses congestion in the links between second layer and third layer nodes, and between third layer nodes and CDN. For example, network capacity improves by 21% and 30% using hierarchical P-UPP and R-UPP policies compared with RAN-only P-UPP and R-UPP respectively. Capacity using the hierarchical LRU and MPV is improved by 9% and 8% respectively compared to RAN-only versions.

Figure 15D:
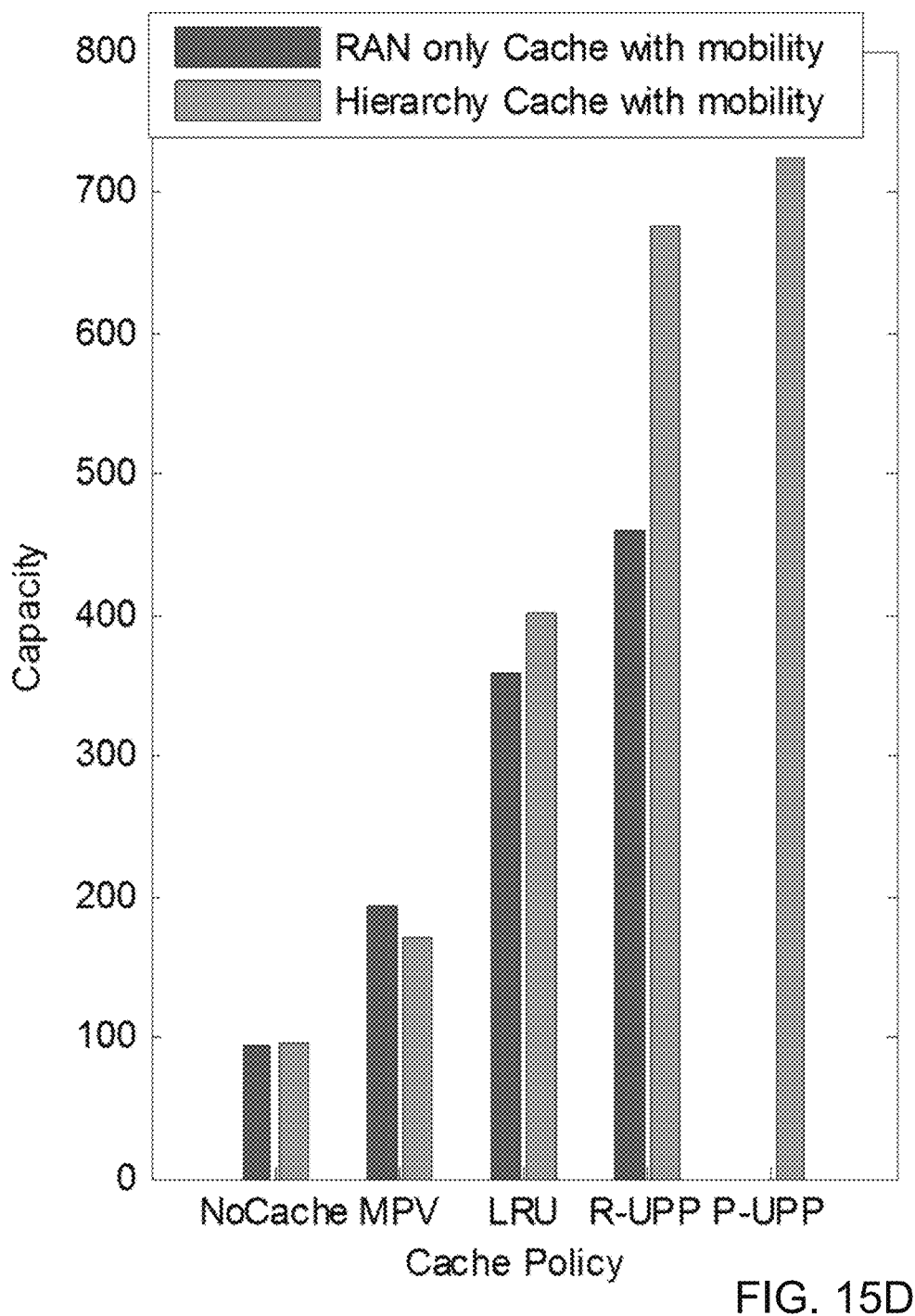

FIG. 15D shows the effect of mobility where, in addition to having users added to and removed from cell sites, the users move between cell sites while continuing with their video downloads. In the simulation, cell site migration follows a Poisson process with mean active cell time of 100 seconds; i.e., the mean time a user stays in the cell site before moving to another cell site. An ongoing video session is blocked (terminated) if the (e)NodeB that the UE migrates to cannot support the new session. FIG. 15D compares hierarchical caching with RAN-only caching under mobility condition. RAN-only P-UPP capacity results are not provided. FIG. 15D indicates that UPP-based hierarchical policies perform significantly better in the case of mobility; e.g., hierarchical R-UPP performs 47% better than the RAN-only R-UPP.

Thus, the simulation results show that the hierarchical caching of videos in the CN to supplement RAN microcaching can significantly decrease the required Internet backhaul bandwidth while maintaining the end user's video QoE leading to a significant capacity increase in existing networks. Example embodiments of the invention can be expanded to address bandwidth constraints in the RAN RF links.

Adaptive Bit Rate Capable Video Caching and Scheduling

Additional embodiments of the invention extend caching and scheduling methods for adaptable bit rate (ABR) streaming. ABR Streaming has become a popular video delivery technique, improving the quality of delivered video in the Internet as well as wireless networks. Several ABR streaming techniques have been developed and deployed. More recently, Dynamic Adaptive Streaming over HTTP (DASH) has been developed as a new standard for ABR streaming with the aim to improve video Quality of Experience (QoE). Example embodiments of the present invention incorporate ABR as part of scheduling methods. Some example methods combine advantages of ABR streaming and RAN caching as disclosed elsewhere herein to increase the end-to-end video capacity and preserve advantages of QoE for wireless networks. Using ABR, example scheduling methods can not only use different transmission rates, but also different video bit rates, providing flexibility to serve more concurrent video requests and improve users' QoE, by trading off video frame quality with risk of stalling.

Since with ABR streaming, each video is divided into multiple chunks, and each chunk can be requested at different bit rates, a caching problem can become more challenging: a cache hit will require not only the presence of a specific video chunk, but also the availability of the desired video bit rate version of the specific chunk. Handling video chunks for caching is particularly challenging for multiple reasons; for example, a cache hit or miss can no longer be determined at video level, but is evaluated at chunk/rate level. With ABR, having a video in the cache does not translate to having all the chunks of that video with the same rate in the cache. In addition, the decision to cache or evict a video from the cache can be more complex and require dealing with the video at chunk and rate version level. One example way to solve this problem is to cache all rate variants of the video, but this approach may significantly increase backhaul bandwidth and storage requirement, or reduce the number of unique videos that can be cached. Alternatively, one can cache only the best quality video and use a processing resource to do the rate down-conversion (transrating). This approach, however, if not properly utilized can require excessive processing or over-utilize processing resources, which can lead again to a poor cache hit ratio.

Figure 16:
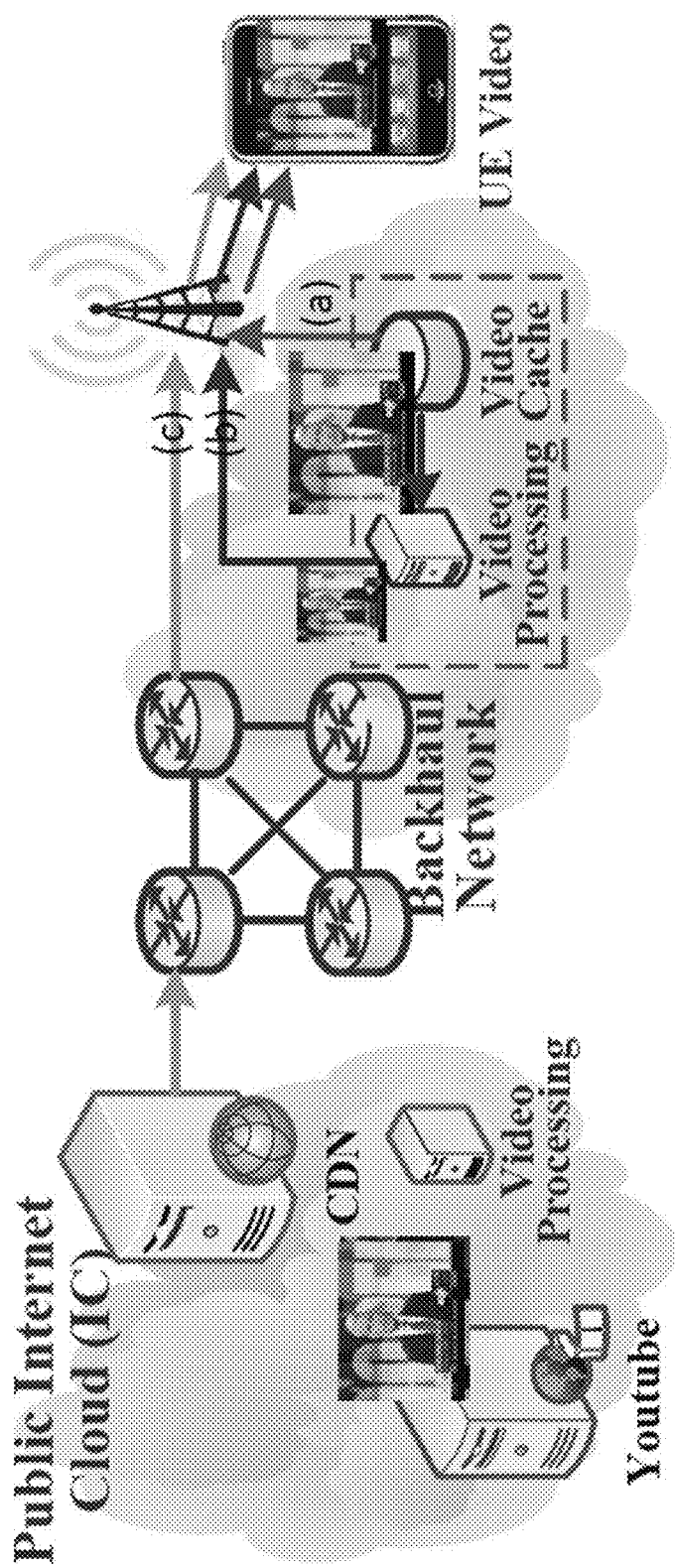
FIG. 16 shows joint video caching and processing operations, including fetching video with exact rate version from a cache, transrating from a higher rate version, and fetching video from Internet CDN.

To reduce RAN backhaul and cache storage requirements of downloading and caching different bit rate versions of a video, as shown in FIG. 16, example embodiments enhance RAN caches, such as those described herein with (preferably, limited) video processing capability to support ABR, and thus allow the possibility of transrating to a requested lower rate. Thus, additional example embodiments can provide a joint video processing and caching framework. An example framework allows transrating to a requested lower rate if a higher bit rate version is available in the cache, instead of fetching the requested version from the Internet CDN, thus avoiding the need to cache all bit rate versions.

However, some example embodiments do not cache only the highest bit rate versions, which can exhaust the available processing resources quickly. For example, for any video request, FIG. 16 illustrates possible options: either the exact bit rate version is available in the cache, or it can be obtained by transrating from a higher bit rate version in the cache, or by fetching from the Internet CDN using the backhaul. For the last option, either an exact bit rate version can be fetched, or a higher bit rate version can be fetched and cached, which will possibly allow future requests of lower bit rate version to be also satisfied using transrating. Thus, given the available cache size, processing capability, and backhaul bandwidth, an embodiment caching method, embodied in a joint caching and processing framework, decides between various tradeoffs available, such as fetching a new bitrate version from the Internet CDN, transrating using a cached version, whether to cache a fetched/transrated version, etc., to optimize the quality metrics, e.g., to increase the number of ABR video requests that can be satisfied concurrently, and hence increase video capacity, while also increasing video QoE.

FIG. 16 illustrates how a video may be fetched by the system. The system includes a public internet cloud (IC), including a Content Delivery Network (CDN) and video processing, a backhaul network, and a wireless carrier core network (CN) and Radio Access Network, including video processing and video caching, which communicates with user equipment (UE). While video capacity can be increased by utilizing multiple bit rates, constantly adapting to channel conditions, when the requested video bit rate is changed, may impact the cache hit ratio, and the amount of transrating and backhaul bandwidth needed, and consequently the end-to-end video capacity.

Example wireless video cloud frameworks are disclosed herein, including ABR aware video caching, processing, and ABR aware wireless channel and backhaul scheduling methods, which can perform one or more of the optimal tradeoffs described above. Both proactive and reactive policies can be configured for adaptive bit rates to leverage transrating and cache resources available. Some example embodiments enhance a caching policy such as LRU caching policy to work effectively with ABR streaming. A particular example method provides an ABR aware Least Recently Used (LRU) caching and processing policy (ABR-LRU-P), which is shown to be highly effective in utilizing RAN caches for ABS streaming. Another particular example method provides an ABR aware P-UPP based joint caching and processing policy (ABR-P-UPP-P), which preferably can be used to fetch not only the most likely requested videos by the users of a cell, but also at the most likely requested rates. To achieve high hit ratios with ABR streaming, it may no longer suffice to know which videos users may like to watch, but also it is useful to have an estimate of the video bit rate that the users may request, which can depend on the channel condition of the requesting users and the overall utilization of the network.

Still another example method extends LBPs to consider the additional flexibility of multiple encoding bit rates available for a video, thus allowing a rate adaptation method to use two degrees of freedom, video transmission rate and video bit rate, to adapt to changing channel conditions. This ABR method can be integrated into, for instance, the VAWS method disclosed above to improve capacity and QoE. By incorporating ABR, VAWS can now not only use different transmission rates, but also different video bit rates, providing flexibility to serve more concurrent video requests and improve user's QoE, by trading off video frame quality with risk of stalling. Some example rate adaptation methods can run on the mobile client and use LBP of the requested videos—thus, indirectly considering video frame structure of each video—to improve capacity and QoE.

Given the cache, processing, backhaul, and wireless channel constraints, the problem of improving end-to-end video capacity is addressed, while reducing or eliminating video stalling during playback and maintaining video quality above, and initial delay below, acceptable thresholds set by the users. An example heuristic solution includes: client side ABR to maximize the wireless channel capacity and video QoE—a heuristic for this maximization; VAWS and backhaul scheduler to maximize the number of videos served; and ABR aware joint caching and processing (ABR-LRU-P) to support maximum number of requests through the backhaul.

The objective of an example method is to maximize capacity, which is defined as the number of concurrent requests that can be served, while meeting each request's QoE requirement and satisfying existing resources. The objective function is defined as:

$$\max_{1 \le j \le M} \sum_{k=1}^{R} \sum_{i=1}^{N} \sum_{j=1}^{M} I_k(v_{ij})$$

Subject to: End users' QoE constraints:

$$D_k(v_i) \le T_D, Q_k(v_i) \ge T_Q, P_{stall}(v_i) T_{stall}$$

Available Resources and their Constraints:

$$\sum_{k=1}^{R_2+R_3} \sum_{i=1}^{N} \sum_{j=1}^{M} U_k(v_{ij}) T_k(v_{ij}) \le Cache_{Max}$$

$$\sum_{k=1}^{R_2} \sum_{i=1}^{N} \sum_{j=1}^{M} U_k(v_{ij}) \le BW_{tr}$$

$$\sum_{k=1}^{R} \sum_{i=1}^{N} \sum_{j=1}^{M} U_k(v_{ij}) \le WirelessBW_{total}$$

$$\sum_{k=1}^{R_1} \sum_{i=1}^{N} \sum_{j=1}^{M} U_k(v_{ij}) \le BW_{bk}$$

$R=R_1+R_2+R_3, T_k(v_{ij})$=duration of video $v_{ij}$

In the above formulation, the solution comprises the values of $I_k(v_{ij})$, which indicates that request k is for video i at bit rate j, and is "1" if the request is granted (and not blocked) and otherwise it is "0". $U_k(v_{ij})$ is the required bandwidth of transmitting video $v_{ij}$ if the $k^{th}$ request is served for video $v_{ij}$ and otherwise it is 0. $v_{ij}$ represents video index i with $j^{th}$ rate, j=1 being the highest rate. In an example method, the assumption is that users are only interested in video index i, and j is being determined by the above formulation and constraint. According to this definition $v_{ij}$ corresponds to the highest quality video with index i available, and $v_{iM}$ to the lowest one. R is the total number of concurrent requests, N is total number of videos available, and M is the total number of rates available for each video. $D_k(v_i)$, $Q_k(v_i)$ and $P_{stall}(v_i)$ are desired initial buffering delay, video quality, and stalling probability experienced by the $k^{th}$ request for video $v_i$ respectively.

$D_k(v_i)$ should be smaller than $T_D$ seconds—which is the maximum tolerable delay—$Q_k(v_i)$ should be greater than $T_Q$, defined in terms of inverse VQM (a VQM value of 1 represents the best quality and 0 represents the worst), and $P_{stall}(v_i)$ should be smaller than acceptable tolerable threshold of $T_{stall}$ or is 0. The example objective function and the constraints are to be satisfied under the constraints of available resources: cache size ($Cache_{Max}$), video processing capacity ($BW_{tr}$), and backhaul ($BW_{bk}$) and wireless bandwidth ($WirelessBW_{total}$). $BW_{tr}$ is defined in terms of the number of encoded bits that can be processed per second. For instance, a RAN processing (transrating) capacity of 20 Mbps allows processing of 10 concurrent video requests with video bit rates of 2 Mbps each. In the above formulation $R_1$ is the total number of requests served from backhaul, $R_2$ is the total number of requests served by transcoding, and $R_3$ is the total number of requests served from the cache. With the above formulation, an example method tries to maximize R, or maximize the number of concurrent video requests by maximizing the number of $I_k(v_{ij})$s that are equal to 1, under the specified QoE and resource constraints explained above.

The above problem can be shown to be NP-Hard by reduction to Multidimensional knapsack problem. In a multidimensional knapsack problem, m knapsacks with capacities $W_i$ are to be filled with n items, and the goal is to maximize the sum profit of all the items packed given the profit and weight of each item. In an example formulation, the goal is maximize the profit, but instead of each video having a different profit, if a video request is granted, it results in a profit of 1 unit, otherwise 0. The constraints include cache size, transrating capacity, backhaul bandwidth, and wireless channel constraints. Example methods herein solve two sub-problems: client side adaptive video rate selection to maximize the number of concurrent video requests that can be served by a RAN scheduler like VAWS given the wireless channel, besides meeting/improving video QoE, which is the target of conventional ABR techniques; and ABR aware reactive and proactive joint caching and processing policies to support the maximum number of concurrent video requests through the backhaul, given the cache size, processing capacity, and backhaul bandwidth.

A rate adaptation method—where the desired video rate is selected depending on the available bandwidth—is a significant part of any ABR streaming implementation as it has direct impact on video QoE. For transferring video contents from (e)NodeB to UE, a video request, regardless of being served from the cache (as in some example embodiments disclosed herein) or through the backhaul, preferably is scheduled using a RAN scheduler. As such, example methods provide a rate selection method as part of the example VAWS method disclosed herein based on Extended-Leaky Bucket Parameters (E-LBP), which enhances the capability of ABR by enabling not only different transmission rates but also different video bit rates. Thus, ABR enables RAN schedulers such as VAWS to satisfy more requests, hence increasing capacity, and improving video QoE by eliminating or decreasing the probability of stalling.

Currently, ABR servers are expected to have videos encoded at all available bit rates—typically stored in the CDN server caches. However, applying this solution to the RAN caches results in further congestion in the backhaul and is not suitable for smaller distributed caches. Inherently DASH can leverage standard HTTP browser caching, and most browsers currently are capable of ABR caching. However, there are two problems with applying browser caching to shared caches at (e)NodeBs. First, browser caches are not shared caches and they do not account for the heterogeneous nature of the wireless channel within the cellular network. Second, if the cached version of the video is of lesser quality than what can be supported by the network, users may experience worse quality playing back the video from cache, than if they would have fetched the video from the network directly. Some example methods disclosed herein address issues with ABR caching, bringing and caching multiple versions of the video chunks in the shared and relatively small caches, e.g., at the (e)NodeBs of the wireless network. Example methods also address video processing to aid caching in the (e)NodeBs of the wireless network.

ABR trades off video quality for video bandwidth to achieve a video playback with no or limited stalling. Degradation in video frame quality caused by rate adaptation results in less degradation in the perceived video QoE experienced by users compared to stalling that may result from fixed bit rate operation. Video frame quality is also a decisive factor on the overall video QoE. It has been shown that the lower the video bit rate (the higher the compression ratio) the worse the video frame quality is. Further, it has been shown that multiple rate switches are better than fewer rate switches if the duration of high quality video is longer. Additionally, it has been shown that switching to an intermediate rate before switching to a higher rate is preferred over multiple large magnitude rate switches. Example methods consider one or more of these issues.

A client centric video rate adaptation method is disclosed, which mechanism is used by a mobile device to request a lower or higher rate when its buffer is about to run out or overflow respectively, to avoid stalling in varying wireless network conditions. This example method uses video frame characteristics through an extended leaky bucket parameters (E-LBP) table for rate selection. Furthermore, an example method is used by a mobile device to adapt simultaneously both the video bit rate and the transmission rate to not only avoid stalls but also increase the video capacity of the network. A particular example method is referred to herein as a Bit Rate and Transmission Rate Selection algorithm (BiTRaS).

As described elsewhere herein, a UE can use LBP to request a transmission rate that results in a desired initial delay just below a threshold, $T_{init}$, that is the maximum time the user can tolerate to wait for video playback to start (set according to the QoE requirements of the user or video service). LBPs include L 3-tuples (R, B, F) corresponding to L sets of transmission rates and buffer size parameters for a given bit stream. An LBP tuple guarantees that as long as the average transmission rate is maintained at R bits/second, the client has a buffer size of B bits, and the buffer is initially filled with F bits before video playback starts, the video session will proceed without any stalling. However, it is not always possible to sustain a constant rate in the wireless channel, thus ABR streaming is used in additional example embodiments to ensure stall free playback.

Figure 17A:
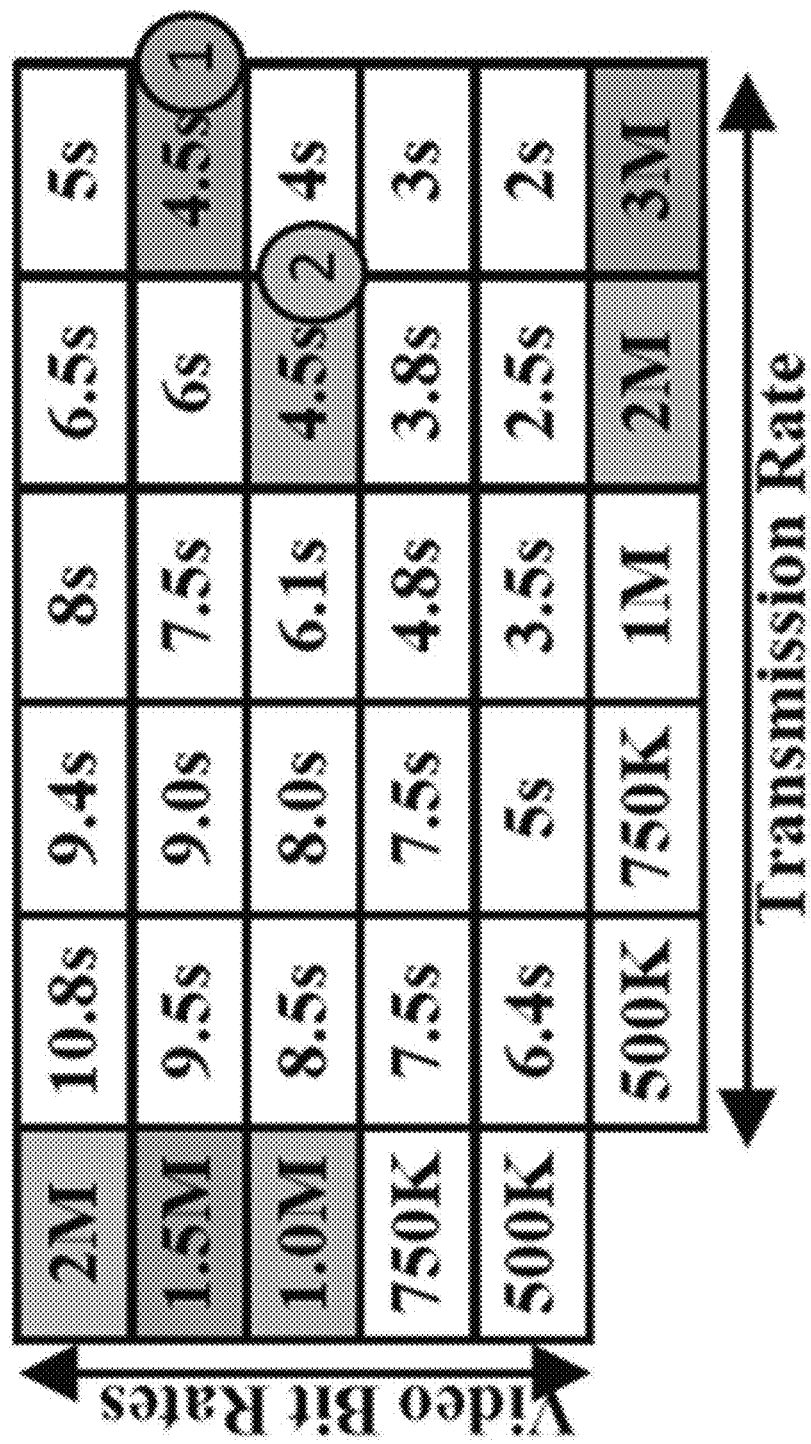
FIGS. 17A-17B show an E-LBP table, with transmission rate, video rate, and delay (FIG. 17A), and an example illustrating E-LBP selection during video session (FIG. 17B)

Using ABR streaming can enhance one or more of the methods disclosed above, to adjust the video bandwidth requirement as well. FIG. 17A shows an example of an extended LBP (E-LBP) table, in which dimensions are provided for both video bit rates and transmission rates. The example BiTRaS method utilizes the E-LBP table to select the optimal video bit rate and transmission rate simultaneously. In some example embodiments, the BiTRaS method runs on a mobile device and is integrated with the video client, and thus the example BiTRaS and mobile client can be used interchangeably.

In the example E-LBP table, columns represent the available transmission rates, rows represent different video bit rates, and the values in the cells represent the initial buffering period, F/R, to guarantee playback without stalling provided the transmission rate is delivered consistently for the corresponding video bit rate. As the video client can initiate a rate change anytime during the video playback, using a single E-LBP that is calculated from the beginning of the video may lead to more conservative bit rate and transmission selection. Thus each video can be divided into several segments (each segment including multiple chunks), and for each video, E-LBP tables can be calculated, each covering the 1-to-$L^{th}$ segment, where l=1, ... L.

Figure 17B:
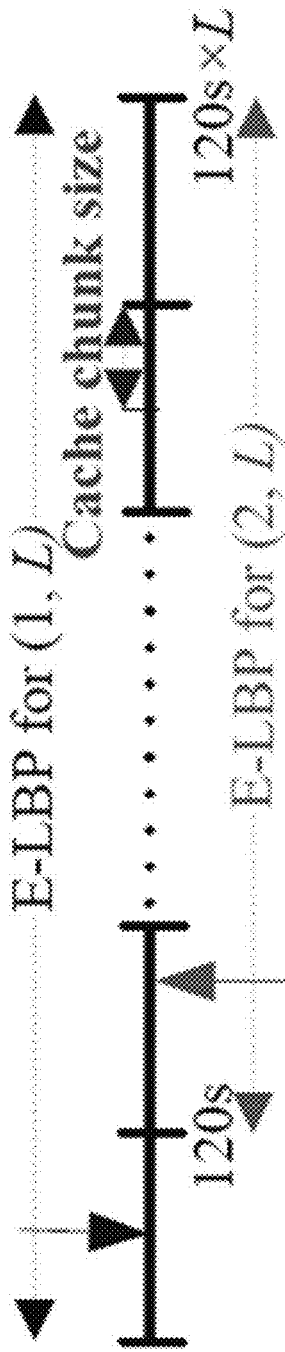

FIG. 17B shows an example, where each segment is of 120 s duration. If a video client requests a rate change (marked by (1)) during segment 1 (anytime from the beginning of the video until 120 s), BiTRaS will use the E-LBP table for the entire video. On the other hand, if video rate change occurs (marked by (2)) during segment 2 (from 120 s to 240 s), the video client will use the E-LBP table that is generated from 120 s to the end of the video or from the second segment to the $L^{th}$ segment.

From FIGS. 17A-B, it can be inferred that by using the example E-LBP table, the ABR method (e.g., BiTRaS) can leverage both different video bit rates ($R_v$) and different transmission rates ($R_t$) simultaneously to schedule the users through the wireless channel, and either improve QoE or assist VAWS to improve capacity. For instance, given the same transmission rate, by reducing the video bit rate, an example method can decrease the initial delay or finish downloading the video faster. Alternatively, it can decrease the required transmission rate to the mobile device by decreasing video bit rate.

Example methods use this application of the E-LBP table to identify whether the mobile device's buffer is in danger of under-flowing and hence stalling. For instance, if the transmission rate of a mobile device falls below the requested rate, which may result in video stalling, an example ABR method switches to a lower video bit rate to avoid stalling. However, constantly changing the video bit rate is not desirable, as frequent rate changes have been shown to degrade video QoE. Thus, example methods use thresholds to avoid constant rate changes and meanwhile have enough time to play back a new video bit rate without stalling. Example thresholds are provided below.

Figure 18A:
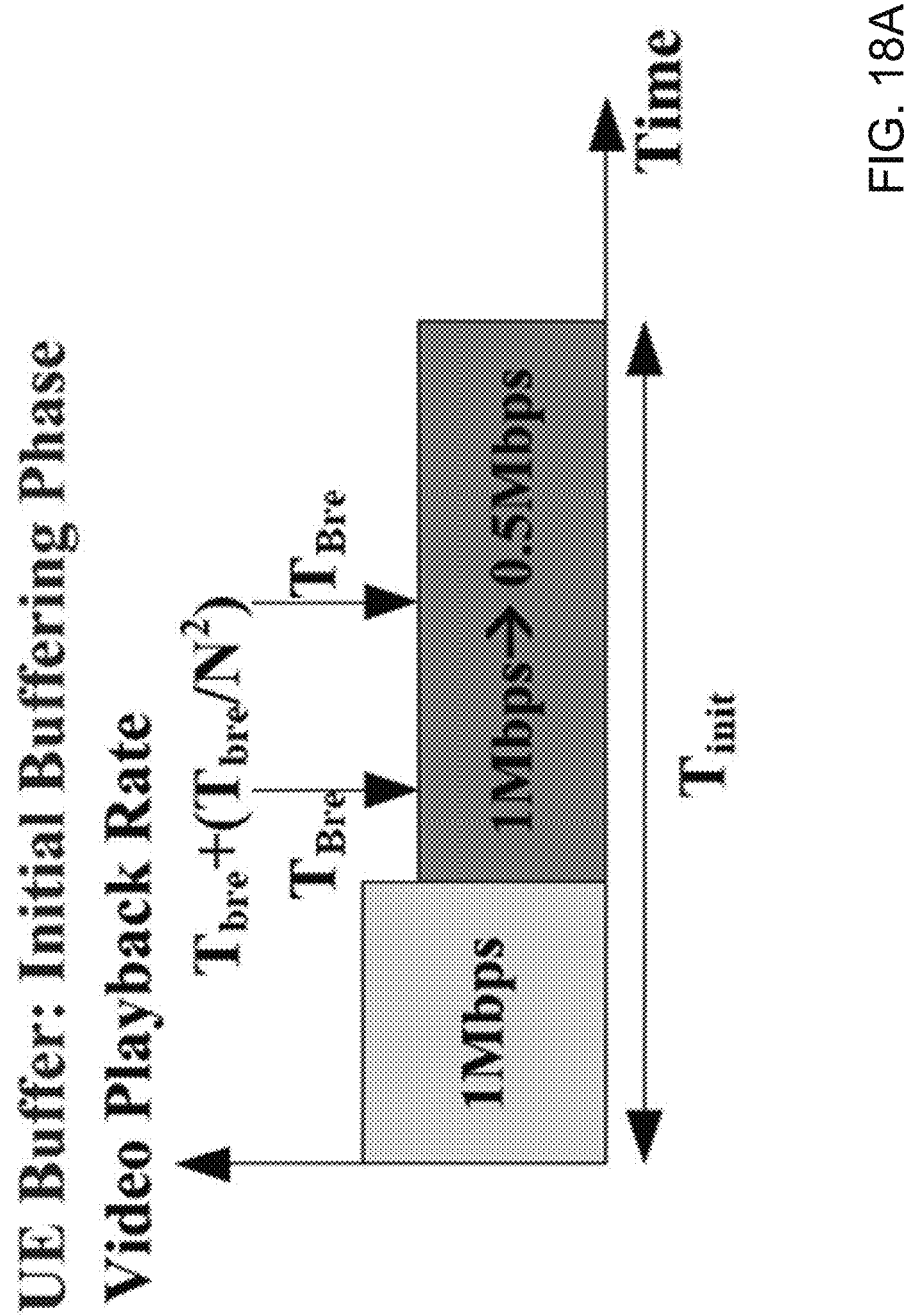
FIGS. 18A-18B show video bit rate timelines for initial buffering phase and playback phase for a user equipment buffer respectively.
Figure 18B:
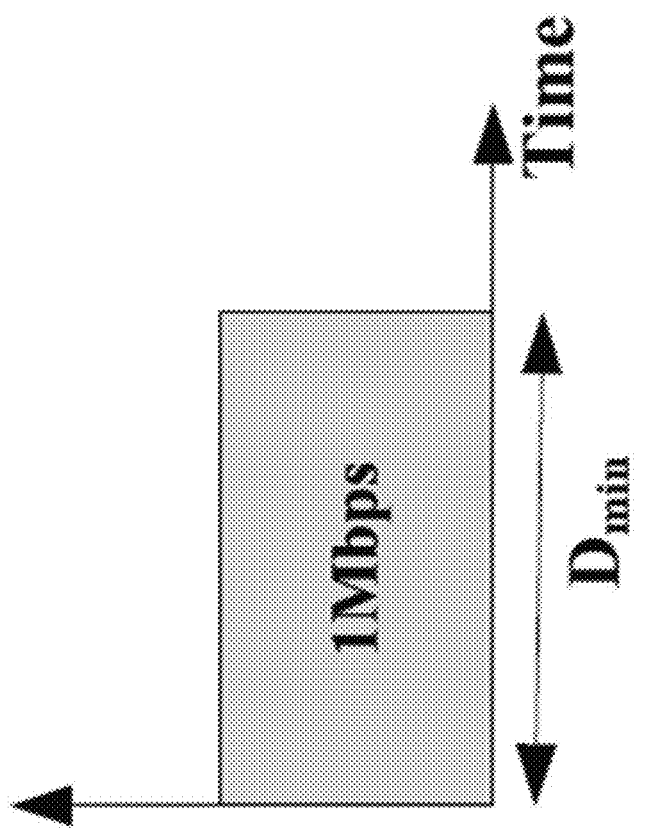

FIGS. 18A-18B show an example timeline and thresholds for changing the video bit rate to a lower value during initial buffering and playback phase. In the initial buffering phase (FIG. 18A), the UE monitors its buffer every $T_{Bre}$ seconds starting at time $T_{Bre}$; if the number of bits that the UE was supposed to receive by time $T_{Bre}$ is below the expected value (e.g., for k consecutive times), the UE switches to (requests) a new lower video rate. Selecting an appropriate value for $T_{Bre}$ is useful because if it is selected too aggressively, it may result in unnecessary rate change due to temporarily bad channel conditions. However, if one selects $T_{Bre}$ too close to $T_{init}$, it leaves the UE with limited time to switch to a new video rate, and as a result the user may experience stalling because it may not find a new video rate with an acceptable VQM with an initial delay of $T_{init}$-$T_{Bre}$ from the E-LBP table.

Thus, an example video client monitors the buffer status starting from $$T_{Bre} = \frac{T_{init}}{N},$$

where N is a design parameter above 1 that determines the aggressiveness of a method. For instance, for N=3 and $T_{init}$=4.5 s, $T_{Bre}$ is equal to 1.5 s. Thus, after 1.5 s, the video client monitors buffer fullness. From the E-LBP in FIG. 17A, assuming that the video client has selected a $R_v$=1.5 Mbps and $R_t$=3 Mbps (marked by (1)), the video client expect receiving 4.5 Mbit of video bits at 1.5 s. If the video client has received more than 4.5 Mbit, it continues to monitor the buffer at 1.5 s intervals.

If the video client has received less video bits than 4.5 Mbit, the client buffer may not get filled to the desired level by the start of the video playback, and hence be in danger of underflow during playback. The client accounts for the missing bits by comparing the total number of bits received, $B_r$ with the expected number of bits, $B_e$. The video client uses $B_r$ to estimate the actual received rate, $R_a$ and subsequently divides the next 1.5 s interval into units of $$\left(T_{init} - \frac{T_{init}}{N} - \frac{kT_{init}}{N^2}\right).$$

and monitors the value of $R_a$. If transmission rate does not change or reach the requested rate limits after k consecutive measurements, the video client assumes the achieved data rate that can be provided by the RAN scheduler to be $R_a$; hence it uses the E-LBP table to select a new transmission rate $R_t'$ equal to or lower than $R_a$, and a new video bit rate that can satisfy the new initial delay, which is the remaining time until starting the playback $$\frac{T_{init}}{N^2}$$

Note k above can be any number equal to or greater than 1; k=1 is used in an example implementation.

During the playback phase (FIG. 18B), if the UE buffer goes below a certain playback time, $D_{min}$, the BiTRaS switches to a lower video rate. UE uses $D_{min}$ as an initial delay to the E-LBP table to find a lower video bit rate with the original or lower requested transmission rate in order to experience a video playback with no stalling. The UE uses the remaining playback buffer duration, $T_B$, for the old video bit rate as the target initial delay when looking up the required transmission rate for the new video bit rate in the E-LBP table. Following the same approach, if the UE buffer goes above $B_{max}$ (maximum buffer size from LBP table), the UE switches to a higher video bit rate. To come up with $D_{min}$, a slight change is made to the example LBP generation process described above. In generating LBP, here the goal is to find the initial fullness level F for a D/G/1 queue, with input rate $R_t$ (transmission rate) and output rate $R_v$ (video bit rate), so that the queue never falls below a minimum buffer-level $F_{min}$ corresponding to having $D_{min}$ seconds play time left in the buffer. Thus, comparing the example E-LBP table in FIG. 17A with an E-LBP table that is generated accounting for $D_{min}$, each cell in FIG. 17A encounters an additional delay.

For any video bit rate change, either when the UE switches to a higher or lower rate, there is a transition period—equal to the remaining duration of the playback buffer—that allows for receiving bits for new video bit rate before starting playback of that video bit rate. When selecting the new video bit rate from the E-LBP table, one selects the highest bit rate that satisfies the constraints of the remaining time and transmission rate whenever possible. If possible, one selects the next video bit rate so that it is one step above or below the current video bit rate to comply with subjective QoE results that state that gradual changes are preferred by users over more abrupt changes.

For instance, from the earlier example, if $R_a$ drops to 2 Mbps from 3 Mbps and the remaining time for the rate change is 4.5 s, the BiTRaS selects the $R_v$=1 Mbps, which is a one rate below $R_v$ of 2 Mbps (marked by (2) in FIG. 17A). However, if $R_a$ would drop to 1 Mbps or less, one step transition is no longer possible, as bit rate of 500 Kbps will have to be selected to satisfy the new initial delay of 4.5 s.

FIG. 19 shows an example E-LBP based ABR rate selection method. For each video request, the BiTRaS starts by selecting the default video bit rate (here, highest video bit rate available) and requests the corresponding transmission rate $R_{min}$ which results in an initial delay $T_{init}$ that satisfies the user's maximum acceptable initial delay requirement according to the E-LBP table (lines 1 and 2). Next, BiTRaS resets the timers $T_{Bre}$ and $T_{Adapt}$ (time of last rate adaptation) (line 3). As long as the download is ongoing, if the video client is in initial buffering phase, BiTRaS looks at the buffer levels at $T_{Bre}$ (lines 4-7) and if the UE buffer is not in danger of underflow, it continues to monitor the buffer level at regular intervals as explained above (lines 8 and 9). However, if the UE's buffer is in danger of underflow, BiTRaS shortens the monitoring interval to $$\frac{T_{init}}{N^2} \text{ (lines 10 – 12)},$$

and if for another interval, the UE buffer is still in danger of underflow, BiTRaS calculates $R_a$ and $T_{remain}$. BiTRaS determines the new R, from the E-LBP table accordingly such that the new transmission rate and the delay for new video bit rate are at most $R_a$ and $T_{remain}$ respectively (lines 13-16). The highest video bit rate that fulfills the constraints is selected (this step implements one-step video bit rate transition if possible) (lines 17-18). Otherwise, BiTRaS blocks the request and cancels the download (line 20). If the video client is in playback phase, BiTRaS calculates the buffer level (line 24) and if the buffer is in danger of underflow or overflow and the time remaining of the video session exceeds $D_{min}$, then BiTRaS selects the video bit rate from E-LBP table with initial delay and new transmission rate of at most $T_B$ and $R_a$ respectively (lines 24-28). If there exists such video bit rate the rate change is made; otherwise, if the UE buffer is stalling more than $D_{min}$ seconds and no video bit rate is available from the E-LBP table to allow seamless rate change, BiTRaS cancels the video session (lines 32-34). This is in line with subjective testing results previously reported which suggest that users may terminate the videos due to many or long stalls.

Example embodiments provide reactive and proactive joint caching and video processing frameworks. ABR streaming imposes an extra challenge on caching, as it no longer suffices for a video to be in the cache but the video should be in cache at the requested bit rate. This is further complicated by the fact that each video is divided into multiple chunks, each of which can be requested at different bit rates. Even if the entire video is cached at the rate originally requested, the desired bit rate may change over time as channel conditions or network load change, so that after a rate change the desired rate is no longer available in the cache.

To help alleviate the above challenges, example methods provide processing/transrating resources which can be used to transrate a higher bit rate version of the chunk that maybe available in the cache to a required lower rate version, thereby relieving the need to fetch and possibly cache the lower rate version. Furthermore, when making caching decisions, one should cache the videos given the constraints explained disclosed above so that not only the cache hit ratio is increased, but also the number of video rate versions that can be served by transrating from the cached rate versions is increased. However, it may not always be optimal to use transrating when a higher bit rate version of a video is in the cache, and it might be better to use the backhaul to fetch the video with the exact rate version from the CDN.

As an example, consider a scenario with the availability of a transrating capacity of 2 Mbps and backhaul bandwidth of 2.3 Mbps. Video requests arrive consecutively with desired bit rates of 800 Kbps, 2 Mbps, and 1.5 Mbps. All the videos can be served using transrating or through the backhaul. If one greedily assign the first request (800 Kbps) to transrating, then one needs to fetch the second video (2 Mbps) using the backhaul; in this case, the third video request (1.5 Mbps) cannot be served, due to lack of backhaul and transrating resources. Instead, if one assigns the 800 Kbps video request to the backhaul, and 2 Mbps video request to transrating, then one can admit the 1.5 Mbps by assigning it to the backhaul.

The above example illustrates the need for a resource allocation scheme for incoming video requests whose exact requested rate versions cannot be found in the cache but with are found with a higher rate version available in the cache. The requests can be fetched from either the available backhaul or by using the processing resource to transrate a cached rate version, so an formulate an optimization problem is formulated that assigns resources in a way that maximizes the number of requests that can be served concurrently.

For the joint caching and processing architecture disclosed herein, in the event of a rate change requested by BiTRaS for the current video session, or request for a new video, either of the following scenarios may apply: (a) the video chunks are available in the cache with the exact requested rate; (b) the video chunks are in the cache but with a higher rate version; (c) there are video chunks with higher rate version in the UE's (e)NodeB buffer pending transmission to the UE. If the video is not available at the desired or higher bit rates (none of the above), it has to be fetched from CDN using the backhaul. But for scenarios (b) or (c), the video request can be satisfied either by using the processing resource to transrate to the desired rate, or fetching the video at the desired rate using the backhaul. The decision of which resource to use (processing or backhaul) depends on the utilization of each resource.

For all video requests that are not found in the cache at the desired rate, one must fetch the video form either backhaul or by transrating from a higher rate available either in the cache or (e)NodeB buffer. For this, an optimization problem is formulated that allocates resources to increase the number of videos served with objective function $f(x_i, y_i)$ that is maximized under the constraint that the transrating or backhaul bandwidth assigned to the ith video is equal to $R_{min}^{(i)}$ and the sum of the assigned transrating or backhaul bandwidth of all scheduled video requests assigned to each resource is below or equal to the capacity of each resource, backhaul bandwidth capacity ($BW_{bk}$) and Transrating capacity ($BW_{tr}$):

$$\text{Maximize: } f(x_i, y_i) \quad (10)$$

Subject to:

$$\sum_{i=1}^{k} b_i x_i \le BW_{bk}; \sum_{i=1}^{k} p_i y_i \le BW_{tr}$$

$$b_i = R_{min}^{(i)}$$

$$p_i = R_{min}^{(i)}$$

$$x_i = 1 - y_i, y_i \in \{0, 1\}$$

$x_i$ and $y_i$ are solutions to the maximization problem. By definition these are made mutually exclusive—i.e. if $x_i=1$ then $y_i=0$ and vice versa. $x_i=1$ indicates video request i is assigned to backhaul resource; $y_i=1$ indicates i is assigned to transrating resource. $b_i$ or $p_i$ are the backhaul or transrating capacity respectively allocated to the ith video request and are set equal to $R_{min}^{(i)}$, the minimum transmission rate required according to E-LBP table for ith video. An example method uses the following objective function that maximizes the total number of admitted videos given the constraints explained above.

$$f(x_i, y_i) = \max\left(\alpha \sum_{i=1}^{k} b_i x_i + \beta \sum_{i=1}^{k} p_i y_i\right) \quad (1)$$

In the above function, $\alpha$ and $\beta$ are set to a weight factor multiplied by the complement of the backhaul utilization, $w_{bk}(1-U_{bk})$, and transrating utilization, $w_{tr}(1-U_{tr})$ respectively. $w_{bk}$ and $w_{tr}$ are weights used to introduce a bias towards using transrating resource if utilization of the backhaul and transrating is the same. The goal is to assign more requests to the transrating resource as only a portion of the video requests can be served by transrating (videos with higher rate version in the cache), while backhaul can be used by any request and hence should be preserved for future requests that are not candidates for transrating. When utilization of the resources are not the same, the example formulation ensures that the less utilized a resource is, the more likely it is for the resource to be assigned to serve a new request.

Given the selected object function and the constraints, it is apparent that the example formulation has the canonical form of a binary integer program, finding whose solution has been shown to be NP-complete. Hence, one solves the linear relaxation of this binary integer program, relaxing the constraints to $0 \le x_i, y_i \le 1$. Later, the linear solutions are rounded to integer values, following a rounding method similar to that described below.

FIG. 20 shows an example method for the resource allocation. First, one calculates the backhaul and transrating utilization given $R_{min}$ of all the ongoing video requests allocated to each resource (line 1). Utilization of a resource is simply the ratio of the capacity of resource currently allocated to ongoing videos to the total available capacity of the resource. Subsequently, one calculates α and β and introduces two multiplicative factors $w_{bk}$ and $w_{tr}$, where $w_{tr} \geq W_{bk}$, to allocate more resources to transrating than to backhaul given the same utilization level (line 2). For all the new video requests, one maximizes the sum total number of videos going through the backhaul or being transrated using the linear utility function of Eq. (11) (line 4) given the constraint that the sum total bandwidth of admitted requests do not surpass the available resources. As it is not desirable to change the allocation of the admitted requests unless a better allocation can be achieved, one subtracts the required bandwidth of ongoing downloads from the corresponding resource and solves Eq. (11) only for the newly arrived video requests. If there is a video request that cannot be admitted (line 5), one solves the optimization problem (Eq. (11)) across all video requests (currently served and new) that can be either scheduled through the backhaul or using transrating. If more requests can be served (more i s.t. $b_i \neq 0$ or $b_i \neq 0$) by redistributing video requests across different resources, the new resource allocation is used (lines 5-10).

An example embodiment enhances the popularly used Least Recently Used (LRU) caching policy to efficiently serve ABR video requests from (e)NodeB caches, utilizing the available (e)NodeB processing and backhaul resources most optimally so as to increase number of concurrent video requests that can be served. The example ABR-LRU-P is a variant of the LRU that allows a video with several different bit rate representations to be cached. Additionally it allows for different chunk sizes (e.g., dividing the video into chunks of 1 s, 10 s or multiples of the GoP size), to be cached at the currently chosen bitrate. On eviction of a video from the cache, ABR-LRU-P removes the video that has been least recently used; if multiple rates of the same video exist, it selects the rate that has been least recently used for eviction. ABR-LRU-P starts from the last chunk of the video and evicts until there is enough cache space available for the chunk or chunks of the video that is to be cached.

Figure 21:
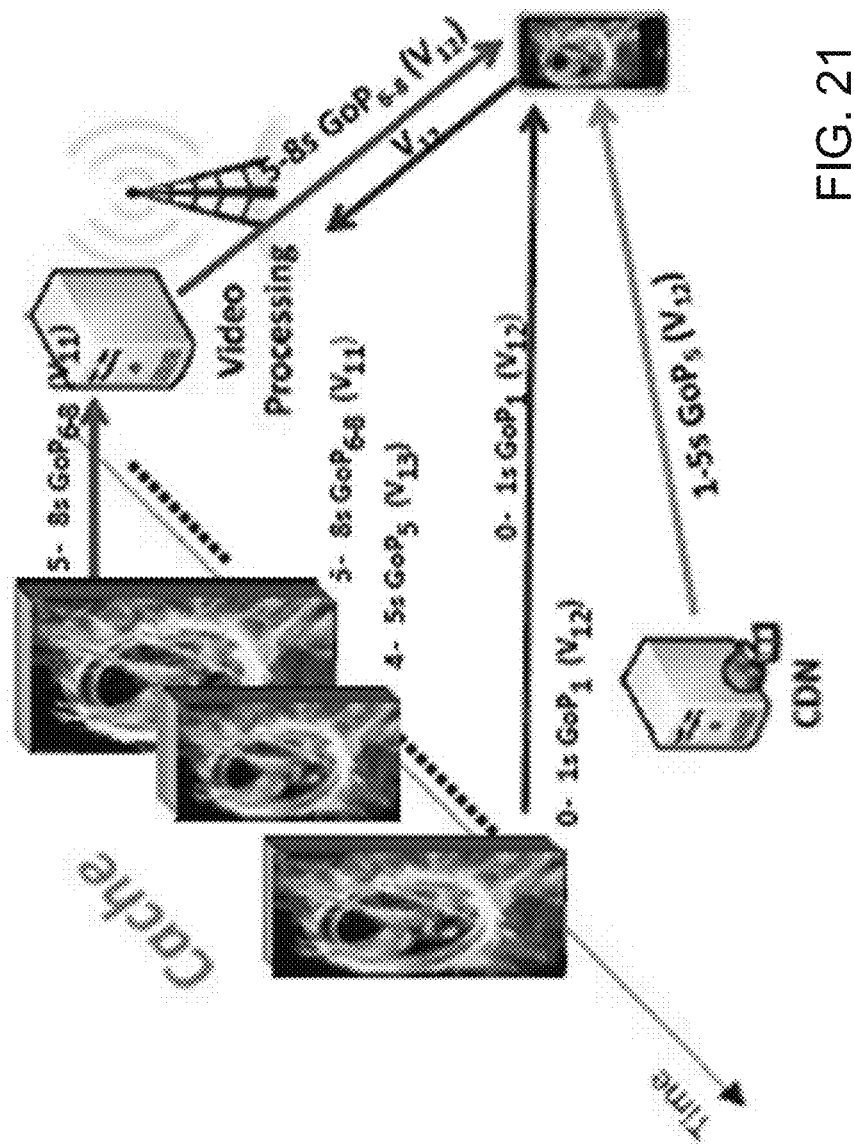
FIG. 21 shows an example scenario illustrating how video requests are satisfied in an example ABR capable RAN caching and processing approach.

One of the challenges for ABR-LRU-P is that a cache hit does not necessarily translate to finding all the chunks of a video with the desired bit rate in the cache. In other words, a cache hit for a chunk of a video may not necessarily translate to a cache hit for the next chunk, as different chunks of a video can be cached at different bit rates. For instance, as shown in FIG. 21, a UE requests video 1 with the 2nd highest bit rate, $V_{12}$; there is an instance of the video in the cache with the desired bit rate for the first second; however, video chunks that correspond to 1-4 s of video playback are not in the cache and chunks corresponding to 4-5s of playback are cached in 3rd available rate of the video (lower bit rate than $V_{12}$); thus, the video chunks from 1-5 s need to be brought in from the backhaul. The remainder of the video chunks exist in the cache with the 1st (highest) available bit rate (5-8 s of $V_{11}$), so the example method uses the transrating capability to change the video bit rate to the desired rate or use backhaul to bring the video chunks, using the example resource allocation method discussed above. If the video cannot be admitted, the example method uses the video available in the cache and serves the mobile device with a higher bit rate than it can support, risking stalling during playback.

FIG. 22 shows an example ABR-LRU-P caching policy. In the event of new video request for $V_{ij}$ (line 1), one starts from the 1st chunk that is to be transferred to the UE (lines 2-3). If the chunk with the requested rate is in the cache, the chunk is brought from the cache and the access time is updated (lines 5-7). If the chunk with the exact rate is not available in the cache and a chunk with a higher rate is available, using a utility function it is decided whether to bring the video with the exact rate from the CDN or use the video processing resource available to transrate the video to a lower rate requested. If the method brings the chunk from the backhaul, it caches the chunk and otherwise if it uses processing resource, it updates the original chunk access time (lines 8-16). If none of the previous options are available, the example method brings the chunk through the backhaul and caches the chunk according to LRU policy. If neither backhaul bandwidth nor a higher rate chunk is available in the cache or (e)NodeB buffer, the UE buffer may be in danger of underflow and the example BiTRaS method may trigger a rate change, as explained above.

P-UPP proactively caches videos at a (e)NodeB according to the User Preference Profiles (UPP) of active video users in the (e)NodeB, demonstratively increasing the cache hit ratio of the (e)NodeB caches and the end-to-end video capacity. However, with ABR streaming, a video request cannot be served from the cache unless the right bit rate version is available. Hence, it is desirable for P-UPP to be able to estimate not only which videos will be requested (which it successfully does using the UPPs of the active users), but also what bit rate versions will be requested.

Consider how to predict what video bit rate may be used by the BiTRaS clients (mobile devices) for the next requests. The per user achieved rate within an (e)NodeB depends on the utilization of the (e)NodeB and channel condition of the user. Note that a user's achieved rate is the actual rate given to the user by the wireless network and it might be different from the requested rate as in some circumstances the network cannot sustain the requested rate. Different techniques can be potentially used to predict the achieved rate of a user, like SINR measured by mobile devices and reported back to (e)NodeBs, or by monitoring status of the UEs buffer. However, even if these estimation methods are accurate, the achieved throughput of a user may include other data traffic, like from other applications running in the background, and it may be difficult to predict the throughput due to the video request by itself.

Further example embodiments provide methods for estimating the probability that a bit rate is going to be requested by looking at the weighted bit rate versions of the ongoing chunk downloads and previous estimates. To predict the probability that video bit rate j is being requested at time t, R(t,j), one uses the exponential moving average (an IIR filter) as follows:

$$R(t, j) = (1 - \beta)R(t-1, j) + \frac{\beta R_{inst}(j)}{\sum_j R_{inst}(j)} \quad (12)$$

$$0 < \beta < 1$$

$$1 \leq j \leq M$$

where β is the smoothing factor, and R(t,j) is the request probability of the jth video bit rate at time t. The smoothed video rate probability R(t,j) is a simple weighted average of the current observation $R_{inst}$ and the previous smoothed statistic R (t−1,j). Larger values of β reduces the level of smoothing, and in the limiting case with β=1 the output is the same as the instantaneous rate (with lag of one time unit). Note that other sophisticated estimation methods can be used instead of the exponential moving average method to infer the requested video bit rate, such as exponential smoothing and chi-squared distribution.

The requested rate prediction technique is performed in the (e)NodeB, along with caching methods; it keeps track of the number of video requests with a given source video bit rate in each time interval, and using Eq. (13) below calculates distribution of the video rates for the next time interval.

An example ABR-P-UPP-P joint caching and processing policy, shown in FIG. 23, uses UPPs of active users in the cell, and their video request rate prediction, to cache videos with the rates that are most likely to be requested at each (e)NodeB. It is assumed that one knows the UPP of the users in the cell and one can infer the requested video bit rate through a set of measured bit rates as explained above.

As provided above, the probability that a video will be requested by the active user set (AUS) of an (e)NodeB can be calculated as follows:

$$P_R(v_i) = \sum_{k=1}^{|VC|} p(v_{i,k}) p_{AUS}(vc_k) \quad (13)$$

$P_R(v_i)$ is the probability that video i is requested, $P_{AUS}(vc_k)$ is the probability that active user set requests video category $vc_k$, $|VC|$ is the total number of video categories, and $p(v_i, k)$ is the probability of request of video i with video category k. $P_{AUS}(vc_k)$, is the weighted sum of probabilities that $vc_k$ is being selected by each user in the AUS, and is given by:

$$p_{AUS}(vc_k) = \sum_{j=1}^{|U|} p(u_j) p(vc_k | u_j) \quad (14)$$

In the above equation, $|U|$ is the cardinality of AUS (number of active users), and $p(u_j)$ is the probability that user, $u_j$, generates a video request. These terms can be calculated as described above. To calculate the probability $P_R(v_{ij})$ that a specific rate j of a video i is requested, one can use the following formulation:

$$P_R(v_{ij}) = R(j) \times P_R(v_i) \quad (15)$$

R(j) is the probability that rate j is requested and calculated using Eq. (13) (time t dropped for simplicity of notation). To maximize the cache hit ratio of future requests, the example ABR aware P-UPP policy can proactively cache videos i with rates k that have the highest values of $P_R(v_{ik})$. However, another objective should be to maximally utilize the transrating resource available to satisfy future requests for different bit rate versions than the ones available in the cache. Thus, an example ABR-P-UPP-P method aims to not only identify the set of videos with rates that result in higher cache hit ratio, but also to cache videos and rate versions that can be used later by the transrating resource available at the (e)NodeB to satisfy requests of lower bit rate versions. With the above dual objectives in mind, the proactive caching problem is formulated and solved as an Integer Linear Program as follows:

Maximize: (16)

$$\sum_{i=1}^{N} \sum_{j=1}^{M} \alpha_{ij} P_R(v_{ij}) + \sum_{i=1}^{N} \sum_{j=2}^{M} \beta_{ij} P_R(v_{ij})$$

Subject to:

$$\alpha_{ij}, \beta_{ij} \in \{0, 1\}$$

$$\sum_{i=1}^{N} \sum_{j=1}^{M} \alpha_{ij} MEM(v_{ij}) \leq cache_{total}$$

$$P\left(\sum_{i=1}^{N} \sum_{j=1}^{M} \beta_{ij} CPU(v_{ij}) > BW_{tr}\right) \leq \gamma$$

$$\alpha_{ij} + \beta_{ij} \leq 1$$

$$\{\forall \beta_{ij} = 1, \exists \alpha_{ik} \neq 0, \text{s.t. } k < j\}$$

$a_{ij}$ and $\beta_{ij}$ are the solutions to the optimization problem, having value either 0 or 1. If $a_{ij}=1$, the video $v_{ij}$ is proactively cached. If $\beta_{ij}=1$, then video $v_{ij}$ is not cached but rather considered candidate for transrating. In this case, one should ensure there exists at least one $a_{ik}$ with k<j such that a higher rate version of video $v_i$ is cached; the above is achieved by introducing the constraint $\{\forall \beta_{i,j}=1, \exists \alpha_{i,j}\neq 0, \text{s.t.} k<j\}$.

Since solving binary integer program is NP-complete, one first solves the linear relaxation of the problem, where $\alpha_{ij}$ and $\beta_{ij}$ obtain values between 0 and 1, and subsequently round them to either 0 or 1. The rounding of linear values to integer ones can be done using a technique known as randomized rounding. Randomized rounding will round $\alpha_{ij}$ and $\beta_{ij}$ to 1 with probability of $\alpha_{ij}$ and $\beta_{ij}$; this may result in both $\alpha_{ij}$ and $\beta_{ij}$ being rounded to 1, which is not desirable, as one does not want to cache a video that is selected for transrating. Thus, a deterministic approach can be used, as described below.

FIG. 24 provides an example method for rounding $\alpha_{ij}$ and $\beta_{ij}$ to integer values. First, $\alpha_{ij}$ and $\beta_{ij}$ are sorted in descending order and sorted lists $L_\alpha$ and $L_\beta$ is created (line 1). If one simply rounds $\alpha_{i,j}$ to 1 in the sorted order, one may miss rounding a lower valued $\alpha_{i,j}$ to 1 that may result in a higher cache hit ratio due to its transrating potential for other videos. Thus, one considers both $L_\alpha$ and $L_\beta$ when making rounding decisions as follows. For each $a_{ik}$ in list $L_\alpha$ starting from the first element in the sorted list and as long as it is not the end of the list or until the cache is full (lines 2 and 3), one sums up all the $\beta_{ij}$ with k<j that exist in list $L_\beta$ and assign the sum to $w_{ik}$ (lines 4 and 5). If $w_{ik}>0$, meaning there exist videos that can be transrated from $a_{ik}$, cache the video and round $a_{ik}$ to one (lines 7 to 9); otherwise add $a_{ik}$ to the candidate list and next time there is a video with no corresponding $\beta_{ij}$, cache that video if the difference between a values of any video in the candidate list and the current video is greater than a threshold $T_{e1}$. The use of candidate list is to avoid ignoring the videos that can result in high requests but are not candidate for being used for transrating. Further, as one rounds $a_{ij}$s to one, they are added to an MLR (Most Likely Requested) set. The addition is such that the first element of the set is most likely to be requested and is also the first element from $L_\alpha$ that is rounded to one. Following the same argument the LLR (Least Likely Requested) set is MLR set but sorted in ascending order for cached videos.

FIG. 23 shows the example ABR-P-UPP-P caching policy. At each time interval t, or when a new video request arrives, whichever is earlier, ABR-P-UPP-P calculates the distribution of video rates currently served (e.g., using equation (12) and uses smoothing to estimate R (j) as explained above (line 1). If either AUS or the video bit rate distribution change by greater than a threshold, ABR-P-UPP-P calculates the request probability of each video i based on the cell site UPP (lines 2-5). Regardless of a change in AUS, ABR-P-UPP-P updates the request probability of each video given the bit rate (line 6). Next, the ILP formulation (Eq. (16)) is solved, and the Most Likely Requested (MLR) and Least Likely Requested (LLR) sets are constructed as explained in the example rounding algorithm (line 8, FIG. 23). The cache is updated by the MLR videos that are not in the cache. More specifically, for each video $v_{ij}$ from the MLR set to be added to the cache, one calculates the difference between its $a_{ij}$ and $a_{ij}$ of the subset of LLR videos from the cache with least PR values that need to be evicted to free up space for the new video; only if the difference is greater than a threshold, $T_e$, does one effectuate the cache update (lines 9-13). $T_e$ is used to avoid unnecessary cache updates. Note that the algorithm can either make the caching decisions in granularity of a video chunk, multiples of a chunk, or a whole video.

In the event of a video request for video i with rate j, if the video is a cache hit, one downloads the video from the cache (lines 2-5). While delivering the video $v_{ij}$, one locks the current and later chunks of the video so that they are available in the cache and not evicted by an invocation of the proactive cache policy during the download. If a higher rate version is available and transrating resource is also available, one use the example resource allocation method described above to decide whether to fetch the video through the backhaul or transrate the video (line 7). If a higher rate version of the video is not in the cache, one fetches the video through the backhaul (line 9).

To show the effectiveness of example methods, they are compared with two alternative methods of supporting ABR streaming for caches: A) cache only the highest rate version of a video and use processing resource to transrate to the requested video bit rate, which can be expensive in terms of transrating resources, or B) static LRU caching policy, which brings all the available rates for a missed video/chunk from the Internet CDN instead of just the requested bit rate of the video, and hence can be expensive in terms of cache size.

The MATLAB Monte Carlo simulation framework described above was expanded to incorporate ABR streaming, including the example ABR rate selection method and example joint caching and processing methods. Again, one assumes a database of 20,000 videos following a Zipf popularity distribution with exponent value of −0.8. The video duration is exponentially distributed with mean of 8 minutes and truncated to a maximum of 30 minutes and a minimum of 2 minutes. It is assumed the videos are uniformly distributed between 200 kbps (QVGA quality) and 2 Mbps (HD quality), and that each video has four transrated variants that have relative bit rates of 0.75, 0.56, 0.42 and 0.32 of the original video bit rate. The simulation assumes a pool of 5000 potential users, and uses a Poisson model for arrival to and departure from a cell, with average user active time of 45 minutes and inter-arrival time depending on the specific simulation. Video requests are generated independently per active user and follow a Poisson process with mean of 8 minutes between requests. In terms of video QoE, the example methods set up a requirement of maximum acceptable initial delay of 10 s for each user, and one assumes acceptable VQM value was assumed of at least 0.65 for all bit rate versions of each video, where VQM value of 1 is the highest possible video frame quality. For the example ABR method, $D_{min}$=6 s was used.

In terms of resources, the example simulation used RAN cache size of up to 350 Gbits, and RAN video processing (transrating) capacity of up to 100 Mbps (e.g. 50 concurrent video requests with original video bit rate of 2 Mbps). Furthermore, 100 Mbps for backhaul bandwidth was assumed, and the wireless channel is modeled with parameters listed in table 4.

| Parameter | Distribution/Parameters Value |
| --- | --- |
| Total (e)NodeB Power | 43 dBm (in each of 3 sectors) |
| Channel BW | 20 MHz in each of 3 sectors |
| Thermal Noise at UE | −174 + 10log(20 MHz) dBm |
| Noise figure, Interference Margin | 7 dB, 5.5 dB |
| Cell Radius | 1.2 km |

Because variations in channel conditions lead to the need for ABR, experiments assess their impact on video bit rate distribution produced by BiTRaS, and the accuracy of an example video bit rate prediction method which will be used by example caching policies. The wireless channel is characterized by variations of the channel signal strength across time and frequency. These variations are divided into large-scale and small-scale fading.

The experiments again modeled small-scale fading using Rayleigh fading model and large-scale fading according to 3GPP TR 36.814 V0.4.1 Urban Macro (UMa) model. The final channel model is a superposition of small-scale and large-scale fading. A Rayleigh fading channel was generated using MATLAB, whose implementation is based on the Jakes' model. To model multipath fading and different temporal variations in users' wireless channel, two Rayleigh fading channels were used with Doppler frequency of $f_d$=3 Hz and 92 Hz respectively. $f_d$=3 Hz models the wireless channel for a pedestrian with speed of approximately 3 km/h, while $f_d$=92 Hz corresponds to a moving vehicle with speed of approximately 100 Km/h assuming a carrier frequency of 1 GHz.

Figure 25A:
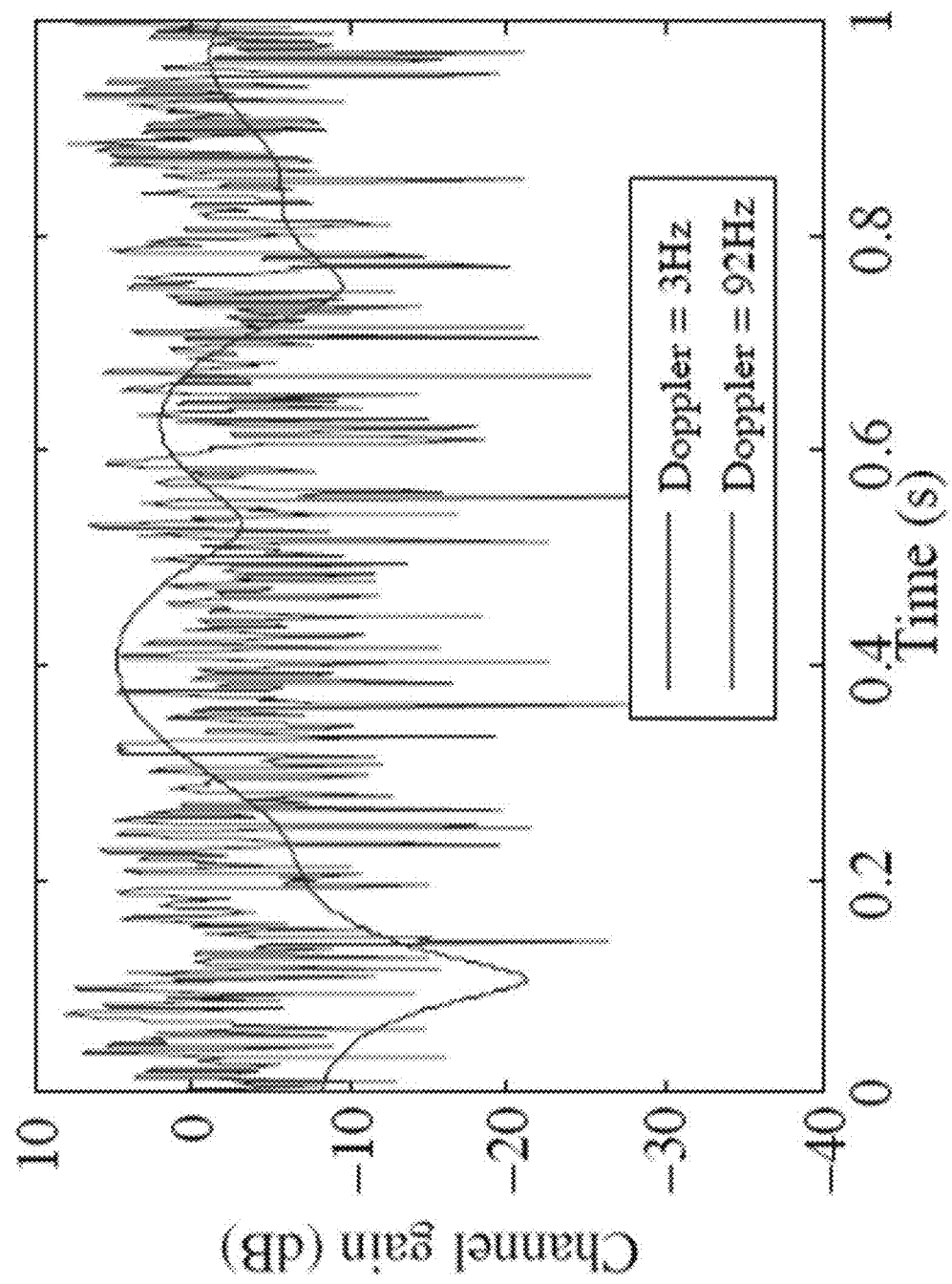
Figure 25B:
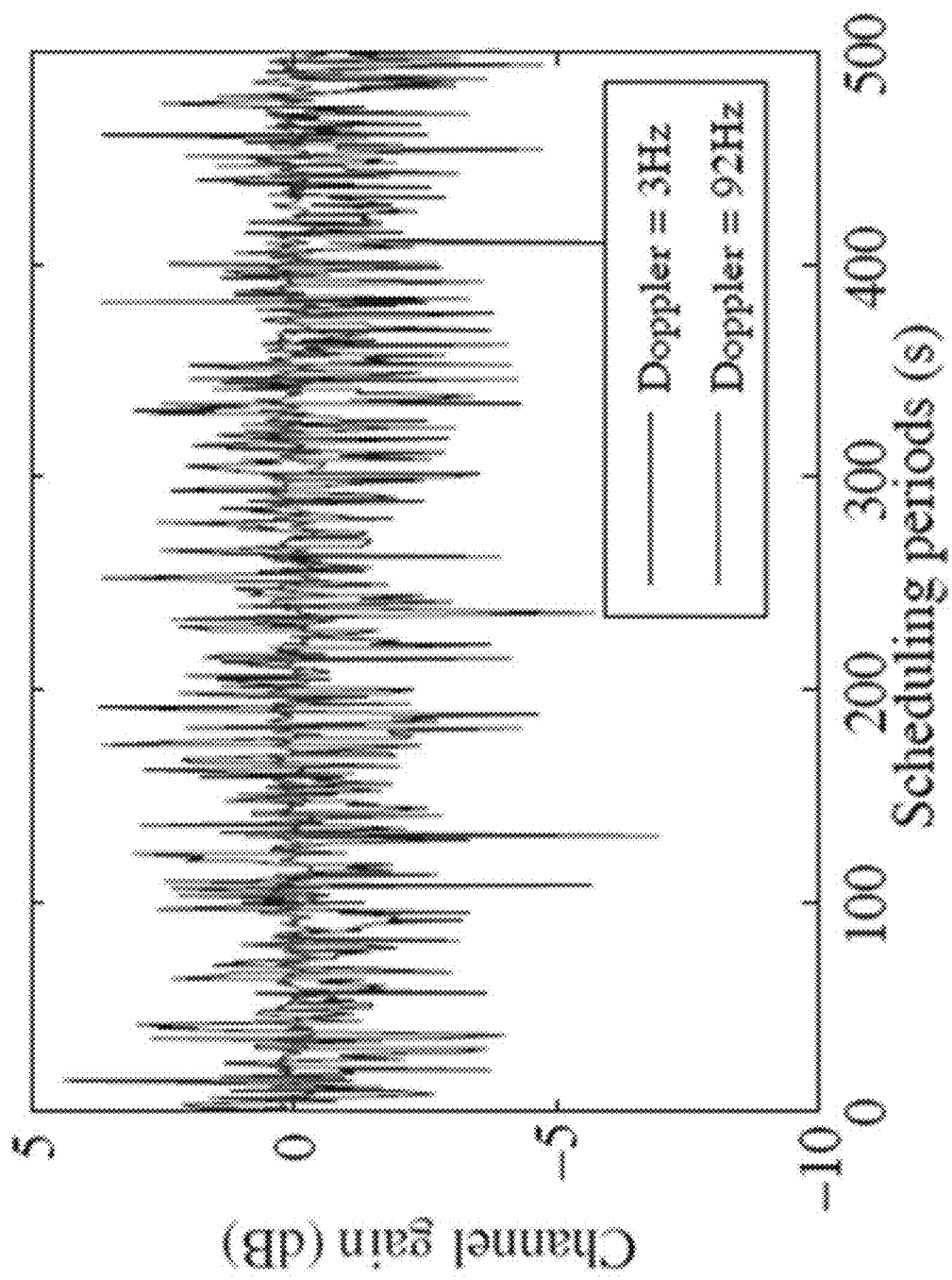

FIG. 25A shows an example of the channel gain experienced by one user during a period of one second (not including path loss). It can be seen that the rate at which the channels vary are different, but the magnitude of the variations is comparable. However, the example Video Aware Wireless Scheduler (VAWS) described above or any well designed scheduler typically operates at a time scale significantly larger than that of variations shown in FIG. 25A, so it averages the conditions over a scheduling period before making the scheduling decision. FIG. 25A shows the average channel gain in each scheduling interval of 1 s. As can be seen from the figure, the temporal variations in the magnitude of the channel, when considering averaging over each scheduling period, are much more pronounced with the pedestrian channel with $f_s$=3 Hz than with the channel with $f_d$=92 Hz. This is because with a slowly fading channel, a user may go into a fade and stay there during a scheduling interval and into another fade in another scheduling interval while with a fast fading channel on average the channel will go through many cycles within each scheduling period, so variations tend to average out more.

Figure 25C:
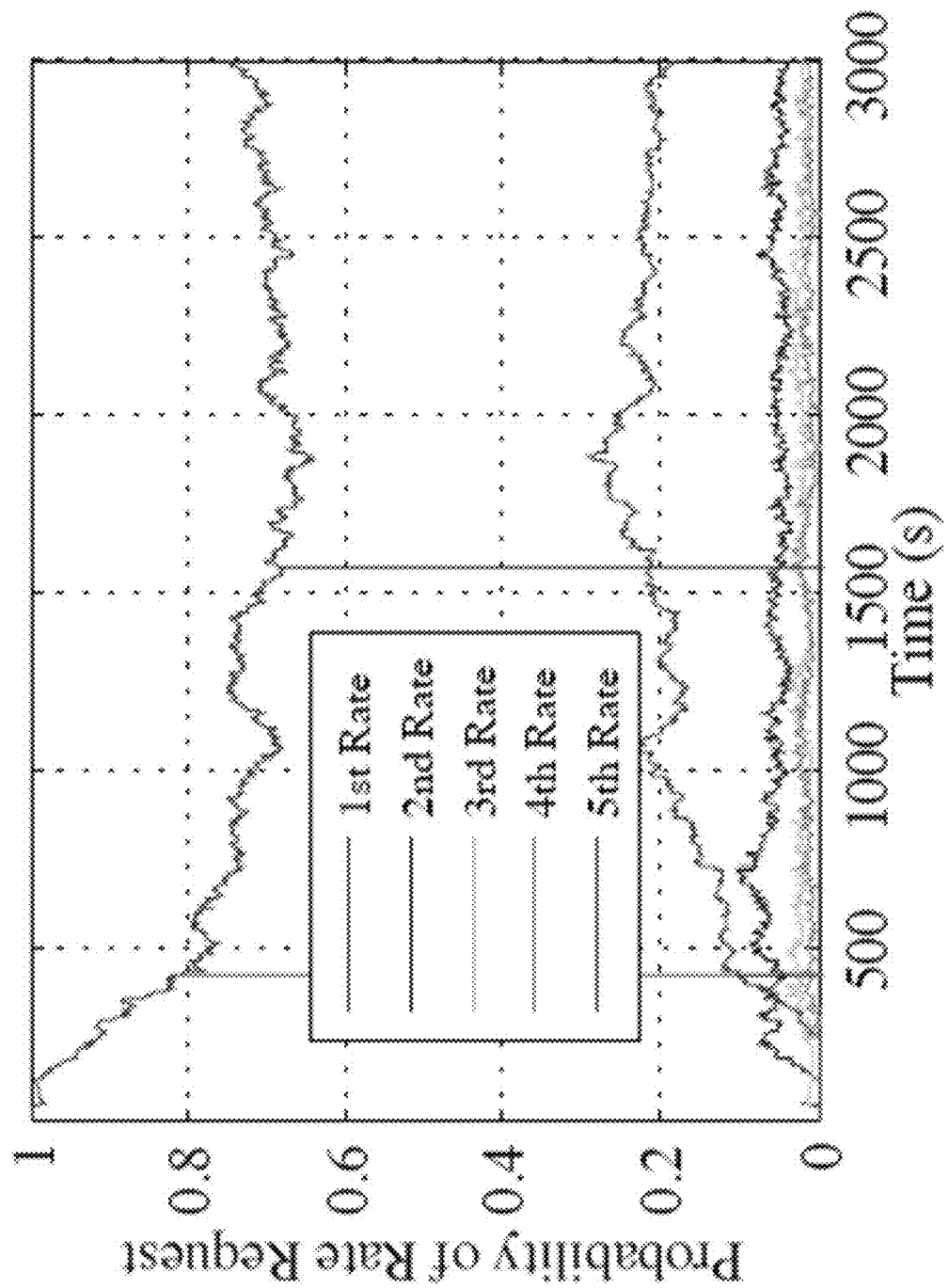

FIGS. 25C and 25D show the effect of the above channel variations on the video rates selected by an example BiTRaS method. FIG. 25C shows the probabilistic distribution of five different video bit rates used in an example ABR method when the Doppler frequency is 3 Hz, and FIG. 25D shows the same when some users experience 3 Hz Doppler frequency and some 92 Hz. As can be expected, one can observe from FIG. 25C that the example BiTRaS method resorts to using more bit rate adaptations for the case of 3 Hz frequency because of more variations experienced by the scheduler—for instance, at about 1500 s into the simulation, the probability that ABR uses the highest bit rate is 0.71 whereas the probability of using the second highest rate is 0.05. In contrast, it is observed from FIG. 25D that in the case of mixed frequency, the example ABR method does not have to adapt so much, with the probability of selecting the highest two rates being 0.97 and 0.02 respectively. From the above, one can conclude it will be more challenging to use Doppler frequency of 3 Hz to assess effectiveness.

To validate how well an example video bit rate prediction method predicts the distribution of rates requested by the example BiTRaS method shown in FIGS. 25C and 25D, statistical hypothesis testing is used, specifically using the chi square test. Based on chi square testing, with five different bit rates to predict, the degree of freedom is four and to get a 95% confidence interval from the chi distribution, one gets a value of eight for null hypothesis rejection threshold. Thus, if the difference between observed and estimated rate is below eight, then one cannot reject the null hypothesis that the predicted distribution is identical to the actual distribution of bit rates. The percentage of occurrences that the chi-squared statistics is above the null hypothesis rejection threshold is measured. Using these measurements, one get very low values of 2.8% and 2.6% for predictions made for the case of 3 Hz frequency (FIG. 25C) and mixed frequency (FIG. 25D) respectively, showing that most of the time the predicted rate distributions are accurate.

Using the simulation framework described above, one next quantifies the advantages of example methods—ABR streaming and joint caching and processing in the RAN—in terms of network capacity (number of concurrent video streams) and QoE (probability of stalling and VQM score). A baseline configuration of parameters is used (baseline case) that includes all the parameters described above, with 150 Gbits cache size, 12 Mbps transrating capacity, Doppler frequency of 3 Hz, and users uniformly distributed across a cell. Table 5, below, shows the capacity (number of concurrent video streams served), probability of stalling, and VQM, for different combinations of ABR usage and RAN cache usage and cache policy. The capacity numbers reported are where the blocking probability is exactly 0.01, which is achieved by changing the user inter-arrival rate such that the steady state target blocking rate is achieved and noting the number of concurrent video requests generated at that specific user inter-arrival rate.

Table 5 shows that using RAN cache by itself (no ABR) (line 2) or using an example BiTRaS method by itself (no RAN cache) (line 3) can improve the capacity by up to 55% and 21% respectively compared to not using either of RAN cache or ABR (line 1). However, the biggest gains in capacity come when using example joint RAN caching and processing policies together with an example BiTRaS method (lines 4 and 6). Using the example ABR-LRU-P joint caching and processing policy, the capacity improves by 63% compared to having ABR but no cache (comparing lines 3 and 4), by 118% compared with having no RAN cache and no ABR (comparing lines 1 and 4), and by 105% compared to using ABR with the static LRU caching policy (comparing lines 4 and 5). Furthermore, using the example ABR-P-UPP-P policy can further improve capacity by up to 17% compared with using an example ABR-LRU-P policy (comparing lines 4 and 6), and by 22.5% compared to using ABR with Highest Rate LRU policy that caches the highest rate and uses transrating capacity to transrate the videos to the desired video bit rate (comparing lines 4 and 7).

| ABR/Caching Policy | Capacity | P(stall) | VQM |
| --- | --- | --- | --- |
| 1. No ABR, No Cache | 99 | 0.010 | 1 |
| 2. No ABR, RAN Cache [LRU] | 148 | 0.012 | 1 |
| 3. ABR, No RAN Cache | 120 | 0.0002 | 0.89 |
| 4. ABR, RAN Cache [ABR-LRU-P] | 208 | 0.0041 | 0.88 |
| 5. ABR, RAN Cache [Static LRU] | 101 | 0.0114 | 0.77 |
| 6. ABR, RAN Cache [ABR-P-UPP-P] | 245 | 0.0075 | 0.90 |
| 7. ABR, RAN Cache [Highest Rate LRU] | 200 | 0.0072 | 0.80 |

The Probability of Stalling column in Table 5 shows the total number of stalls across all the video requests divided by the total number of video requests. From the results one can infer that using ABR without any caching can reduce the stalling probability significantly (comparing lines 1 and 3). This improvement in terms of capacity and stall probability comes with the cost of drop in VQM. On the other hand, adding RAN caching can increase the stalling probability (both lines 2 and 5), due to increased number of video requests supported. However, the results show that when example ABR aware joint caching and processing policies are used, the stalling probability can be reduced significantly (comparing lines 4 or 6 with lines 2 or 5), though the stalling probability is still higher than using ABR without caching (line 3), while achieving much higher capacity.

The VQM column in Table 5 shows the VQM of the watched videos depending on whether ABR is enabled or disabled. Here, without presence of ABR one gets VQM value of 1 which is the highest possible score, because videos are always delivered at the highest quality, but the lack of rate adaptation causes excessive stalling, as can be seen in the Probability of Stalling column in Table 5, which may be more detrimental to QoE than degraded VQM. When ABR is used without RAN caching, VQM degrades to 0.89 while stalling is almost eliminated. However, when ABR is used with RAN caching and processing with the example ABR-LRU-P or ABR-P-UPP-P policies, one observes very little further degradation in VQM score and similar stalling probability, while observing significant increase in capacity.

Figures 26A, 26B, 26C:
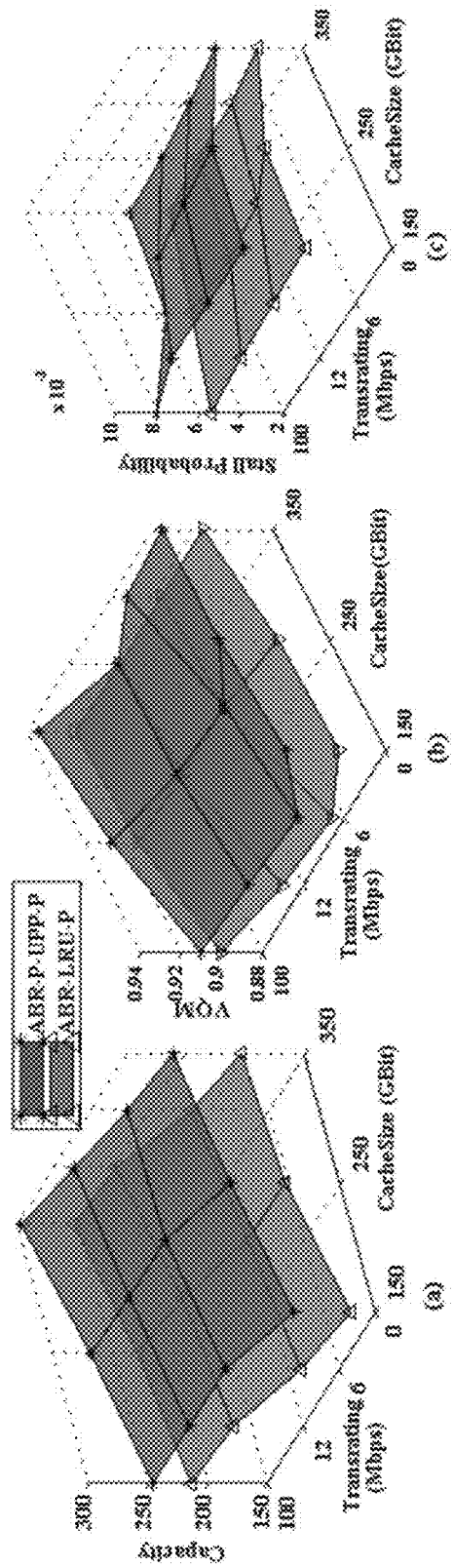
FIGS. 26A-26C show capacity vs. transrating and cache size (FIG. 26A), VQM vs. transrating and cache size (FIG. 26B), and stall probability vs. transrating and cache size (FIG. 26C).

Next the impact of cache size and transrating capacity is assessed on the performance of example joint caching and processing policies: ABR-P-UPP-P and ABR-RLRU-P. FIG. 26A shows the effect on capacity when increasing cache size from 150 Gbit to 350 Gbit and increasing the transrating capacity from 0 to 100 Mbps for each cache size, with the other parameters the same as the baseline configuration described above. From the figure, one can infer that as the cache size and transrating resource increase, the capacity achieved by both example policies increase. For the cache sizes in these experiments, increase in cache size always results in increase in capacity. For instance, from FIG. 26A it is apparent that when no transrating resource is available, the capacity achieved by ABR-P-UPP-P increases from 218 to 241 to 259 with cache size increasing from 150 Gbits to 250 Gbits to 350 Gbits respectively, an overall increase in 19% capacity.

Similarly, increasing transrating capacity also leads to increase in network capacity, although the increase depends on associated cache size, and may stop after a certain transrating capacity. For instance, FIG. 26A shows that for cache size of 150 Gbit, increasing transrating capacity from 0 Mbps to 6 Mbps increases the network capacity by 12% and 7% for ABR-P-UPP-P and ABR-LRU-P respectively; on the other hand, while increasing the transrating resource from 6 Mbps to 12 Mbps increases the network capacity by 14% using ABR-LRU-P, it does not further increase the capacity using ABR-P-UPP-P. However, for higher cache size of 350 Gbit, increasing transrating resource from 0 to 6 to 12 to 100 Mbps shows continuous increase in network capacity by ABR-P-UPP-P, for a total capacity increase of 14%, due to the availability of more videos with higher bit rate versions in the cache. Furthermore, one can conclude that ABR-P-UPP-P joint caching and processing policy can improve the capacity by 18% compared with ABR-LRU-P joint caching and processing policy when the cache size is 350 Gbit and transrating resource is 100 Mbps.

Next, the impact of cache size and transrating capacity on VQM using ABR-LRU-P and ABR-P-UPP-P policies are assessed. From FIG. 26B, one can infer that overall, regardless of the cache size and transrating resource available, VQM is greater than or equal to 0.9 for the ABR-P-UPP-P joint caching and processing policy. Similar trends holds for ABR-LRUP with VQM of equal or above 0.88. Furthermore, increase in cache size results in slight increase in VQM value. For instance, for transrating capacity of 6 Mbps, increasing the cache size from 150 to 250 to 350 Gbit shows a slight increase in VQM by ABR-P-UPP-P and ABR-LRU-P of about 3%.

The impact of cache size and transrating capacity on stalling probability using ABR-LRU-P and ABR-P-UPP-P policies are now assessed. From FIG. 26C, one can see that increasing cache size itself reduces stalling probability—for example, for transrating capacity of 12 Mbps, increasing cache size from 150 Gbit to 350 Gbit, reduces the stalling probability by 42% and 39% for ABR-P-UPP-P and ABR-LRU-P policies respectively. Similarly, increasing transrating capacity itself can reduce stalling probability—for example, for cache size of 350 Gbit, increasing transrating capacity from 0 to 100 Mbps reduces stalling probability by 22% and 24% for ABR-PUPP-P and ABR-LRU-P respectively. Finally, one can infer that increase in both cache size and transrating capacity can significantly improve the probability of stalling. For instance, increasing the transrating capacity from 0 Mbps to 100 Mbps and cache size of 150 Gbits to 350 Gbit improves the stalling probability by 44% and 49% for ABR-P-UPP-P and ABR-LRU-P policies respectively.

The impact of wireless channels and user distributions on the capacity and QoE obtained of the ABR-PUPP-P and ABR-LRU-P joint caching and processing policies is considered. As explained above, different types of channels and their variations impact the frequency of rate changes due to ABR and as a result they impact the performance of example joint caching and processing policies. Here, the impact of wireless channel variations on the capacity and QoE of the wireless network is quantified. Different distribution of users in the cell are also considered, as user locations also impact their channel conditions. Three different wireless channel and user configurations are studied: (a) baseline configuration (Doppler frequency of 3 Hz, and uniform user distribution) with cache size of 250 Gbit (modified baseline configuration), (b) modified baseline configuration with users uniformly distributed 0.7-1.2 km from cell center (biased configuration), and (c) modified baseline configuration with users' channels that follow mixed Doppler frequencies of 3 Hz and 92 Hz (FIG. 25D) (mixed configuration).

Table 6, below, shows the performance of the example methods in terms of video capacity and QoE under the three different configurations explained above. Since Highest Rate LRU policy performs the best for the base configuration, it is selected to compare the performance of example policies for the three different scenarios above.

From the figure, it can be seen that biased distribution of users within the cell site decreases capacity of ABR-P-UPP-P by 20% while it does not impact the capacity of ABR-LRU-P compared with the modified baseline configuration. This is due to the fact that ABR-P-UPP-P results in a higher number of concurrent users admitted than the other policies, and hence having more mobile users at the cell edge in the biased configuration results in higher (e)NodeB transmit power to admit the edge users and thus negatively impacts video capacity more than in the case of the other policies.

| ABR/Caching Policy | Capacity | P(stall) | VQM |
| --- | --- | --- | --- |
| No ABR, No RAN Cache (modified baseline configuration) | 99 | 0.010 | 1 |
| No ABR, No RAN Cache (biased configuration) | 99 | 0.015 | 1 |
| No ABR, No RAN Cache (mixed configuration) | 99 | 0.008 | 1 |
| ABR, RAN Cache [Highest Rate LRU] (modified baseline configuration) | 200 | 0.0087 | 0.80 |
| ABR, RAN Cache [Highest Rate LRU] (biased configuration) | 199 | 0.01 | 0.80 |
| ABR, RAN Cache [Highest Rate LRU] (mixed configuration) | 218 | 0.0084 | 0.80 |
| ABR, RAN Cache [ABR-LRU-P] (modified baseline configuration) | 221 | 0.0037 | 0.90 |
| ABR, RAN Cache [ABR-LRU-P] (biased configuration) | 205 | 0.0031 | 0.81 |
| ABR, RAN Cache [ABR-LRU-P] (mixed configuration) | 224 | 0.0023 | 0.86 |
| ABR, RAN Cache [ABR-P-UPP-P] (modified baseline configuration) | 265 | 0.0014 | 0.91 |
| ABR, RAN Cache [ABR-P-UPP-P] (biased configuration) | 221 | 0.00125 | 0.80 |
| ABR, RAN Cache [ABR-P-UPP-P] (mixed configuration) | 273 | 0.00164 | 0.92 |

It is also observed that mixed Doppler frequency results in 4.2% capacity improvement for ABR-P-UPP-P and 2.6% capacity improvement for ABR-LRU-P compared with the modified baseline configuration where all users have Doppler frequency of 3 Hz. This is to be expected from FIG. 10B, which shows that Doppler frequency of 92 Hz results in fewer variations at the scheduling intervals, and hence having such users besides those experiencing 3 Hz channel results in higher overall capacity as shown in Table 6.

Overall, the simulation results clearly show that example methods policies perform significantly better than not using ABR and RAN cache, and also far better than Highest Rate LRU caching policy, in any of the configurations considered. For instance, with biased configuration that negatively affects the capacity for all the caching policies, ABR-P-UPP-P performs better than Highest Rate LRU by 11%, and better than no ABR and no RAN cache by 123%. Table 6 shows that VQM for example caching policies is same or better than the VQM for the Highest Rate LRU across all the wireless channel configurations. For instance, for the mixed configuration, VQM is 0.80 for Highest Rate LRU, 0.86 for ABR-LRU-P and 0.92 for ABR-P-UPP-P policy.

Furthermore, Table 6 shows that the probability of stalling is significantly lower when using example methods for any of the configurations considered. For instance, when using biased configuration, ABR-LRU-P and ABR-P-UPP-P reduce probability of stalling by 69% and 87% respectively relative to Highest Rate LRU policy, and 79% and 91% respectively relative to using no ABR and no RAN caching.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. In a wireless network comprising a wireless carrier core network (CN), and a radio access network (RAN), a method for delivering video data from a server in a content delivery network (CDN), the method comprising:
    determining video preferences of active users of a cell;
    caching the video data at one or more base station nodes disposed in the RAN, wherein the video data is cached in a RAN cache comprising one or more micro-caches according to a caching policy that is based on the determined video preferences;
    receiving a request for video data;
    if the cached video data includes the requested video data, serving the cached video data from the RAN cache; and
    if the cached video data does not include the requested video data, fetching the requested video from the CDN according to a scheduling approach that considers Quality of Experience (QoE);
    wherein the caching policy comprises determining a popularity probability that each respective video in the RAN cache will be requested by the active users of the cell based on the determined video preferences;
    wherein said determining video preferences comprises determining a cell site user preference profile for active users of the cell; and
    wherein the caching policy comprises:
    determining a most likely requested (MLR) set of videos and a least likely requested (LLR) set of videos from among the videos in the RAN cache and at least one additional video to potentially be added to the RAN cache;
    determining an LLR subset of videos from the LLR set of videos having a lowest request probability that is necessary to be evicted from the RAN cache to fit a new video from the MLR set of videos that is to be added to the RAN cache; and
    if a request probability for the LLR subset of videos is lower than the request probability for the new video from the MLR set of videos by a threshold, updating the cache.

2. The method of claim 1, wherein determining video preferences comprises determining video category preferences of active users of the cell.

3. The method of claim 1, wherein quality of experience (QoE) includes an initial delay before a requested video starts playing, and a number of stalls during a video session.

4. The method of claim 1, wherein the scheduling approach comprises:
    sending a maximum delay to a client based on a current utilization state;
    receiving a transmission bit rate from the client that results in an initial delay just below a backhaul delay threshold; and
    if enough bandwidth is available, allocating a backhaul resource at the received transmission bit rate.

5. A wireless network configured to perform the method of claim 1.

6. A network node configured to perform the method of claim 1.

7. An apparatus comprising computer-readable instructions stored on a non-transitory medium that when executed cause a computer and/or network device to perform the method of claim 1.

8. A network node comprising:
    a processor configured to perform the method of claim 1; and,
    a hardware cache for storing the video data.

9. The network node of claim 8, wherein the hardware cache is configured to store on the order of thousands of videos.

10. The network node of claim 8, further comprising:
    the processor configured to transrate the video data.

11. In a wireless network comprising a wireless carrier core network (CN), and a radio access network (RAN), a method for delivering video data from a server in a CDN, the method comprising:
    determining video preferences of active users of a cell and for all active users for a plurality of cells connected to the CN;
    caching the video data at a higher level CN cache in the CN, and lower level caches in one or more RAN caches at one or more base station nodes at an edge of the RAN, according to a hierarchical hybrid and partially distributed caching policy that is based on the determined video preferences;
    receiving a request for video data;
    if the cached video data in an accessible RAN cache includes the requested video data, serving the cached video data from the RAN cache;
    if the cached video data in the accessible RAN cache does not include the requested video data, but the cached video data in the CN cache includes the requested video data, serving the cached video data from the CN cache;
    wherein the caching policy comprises, for caching at a respective one of the one or more RAN caches, determining a popularity probability that each respective video in the RAN cache will be requested by the active users of the cell based on the determined video preferences;
    wherein said determining video preferences comprises determining a cell site user preference profile for active users of the cell; and
    wherein the caching policy comprises:
    determining a most likely requested (MLR) set of videos and a least likely requested (LLR) set of videos from among the videos in the RAN cache and at least one additional video to potentially be added to the RAN cache;
    determining an LLR subset of videos from the LLR set of videos having a lowest request probability that is necessary to be evicted from the RAN cache to fit a new video from the MLR set of videos that is to be added to the RAN cache; and
    if a request probability for the LLR subset of videos is lower than the request probability for the new video from the MLR set of videos by a threshold, updating the cache.

12. The method of claim 11, wherein the caching policy is a proactive caching policy that pre-loads videos into one or more caches that are most likely to be requested given the determined cell site user preference profile.

* * * * *